United States Patent
Kusaka

(10) Patent No.: US 8,164,679 B2
(45) Date of Patent: Apr. 24, 2012

(54) IMAGE-CAPTURING DEVICE, CAMERA, METHOD FOR CONSTRUCTING IMAGE-CAPTURING DEVICE AND IMAGE-CAPTURING METHOD FOR EXECUTING DISPLAY OF A LIVE VIEW AND A FOCUS DETECTION OPERATION SIMULTANEOUSLY

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 640 days.

(21) Appl. No.: 12/285,008

(22) Filed: Sep. 26, 2008

(65) Prior Publication Data

US 2009/0096886 A1 Apr. 16, 2009

Related U.S. Application Data

(60) Provisional application No. 60/960,518, filed on Oct. 2, 2007.

(30) Foreign Application Priority Data

Oct. 1, 2007 (JP) ................................ 2007-257409

(51) Int. Cl.
*H04N 5/232* (2006.01)
*H04N 5/235* (2006.01)
*H04N 5/228* (2006.01)
*H04N 5/222* (2006.01)
*G03B 13/00* (2006.01)

(52) U.S. Cl. ................. 348/345; 348/222.1; 348/333.11

(58) Field of Classification Search ............... 348/222.1, 348/230.1, 267, 268, 272, 273, 278, 279, 348/280
See application file for complete search history.

(56) References Cited

U.S. PATENT DOCUMENTS

| | | | |
|---|---|---|---|
| 6,661,451 B1 * | 12/2003 | Kijima et al. | 348/220.1 |
| 6,781,632 B1 | 8/2004 | Ide | |
| 7,154,075 B2 * | 12/2006 | Krymski | 250/208.1 |
| 7,319,218 B2 * | 1/2008 | Krymski | 250/208.1 |

(Continued)

FOREIGN PATENT DOCUMENTS

JP A-2000-305010 11/2000

(Continued)

OTHER PUBLICATIONS

Jan. 31, 2012 Notification of Reasons for Refusal issued in Japanese Application No. 2007-257409 with English-language translation.

*Primary Examiner* — Nicholas Giles
(74) *Attorney, Agent, or Firm* — Oliff & Berridge, PLC

(57) ABSTRACT

An image-capturing device includes: a plurality of first pixels disposed along a first direction; a plurality of second pixels different from the first pixels disposed along the first direction in admixture with the plurality of first pixels; and an adder that adds a plurality of outputs provided by a plurality of first selected pixels selected from the plurality of first pixels to each other and a plurality of outputs provided by a plurality of second selected pixels selected from the plurality of second pixels to each other in such a manner that outputs provided by the first pixels and outputs provided by the second pixels are not added one to another. Disposition of the plurality of second pixels conforms to positional relationship of the plurality of first selected pixels in the plurality of first pixels.

21 Claims, 37 Drawing Sheets

U.S. PATENT DOCUMENTS

| | | |
|---|---|---|
| 7,656,455 B2 | 2/2010 | Hatano |
| 7,804,540 B2 * | 9/2010 | Yanai ............................. 348/319 |
| 2002/0154347 A1 * | 10/2002 | Funakoshi et al. ............ 358/513 |
| 2003/0133625 A1 * | 7/2003 | Pain et al. ..................... 382/288 |
| 2004/0125223 A1 * | 7/2004 | Iizuka ............................ 348/272 |
| 2007/0126909 A1 * | 6/2007 | Kuruma .................... 348/333.01 |
| 2008/0204586 A1 * | 8/2008 | Parks ............................ 348/311 |

FOREIGN PATENT DOCUMENTS

| | | |
|---|---|---|
| JP | A-2002-314062 | 10/2002 |
| JP | A-2003-244712 | 8/2003 |
| JP | A-2004-023747 | 1/2004 |
| JP | A-2005-354154 | 12/2005 |
| JP | A-2007-155929 | 6/2007 |

* cited by examiner

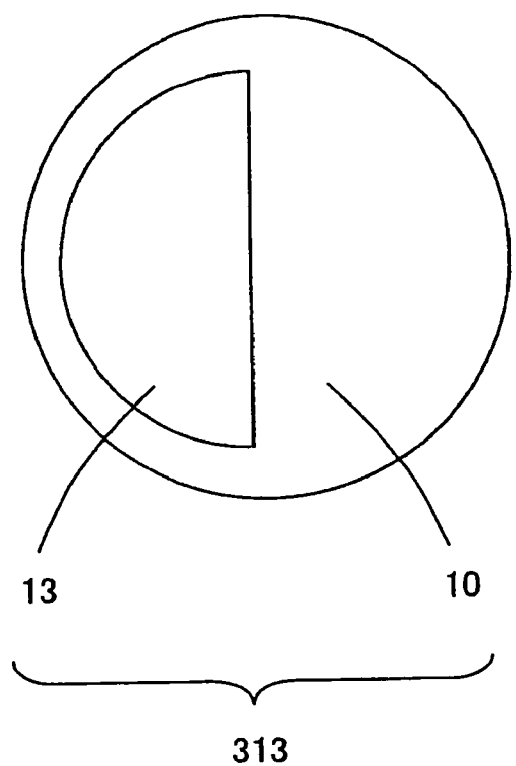
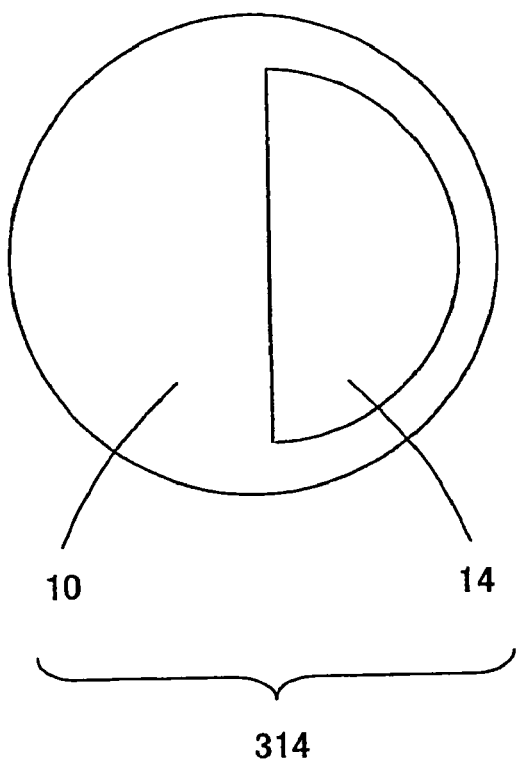

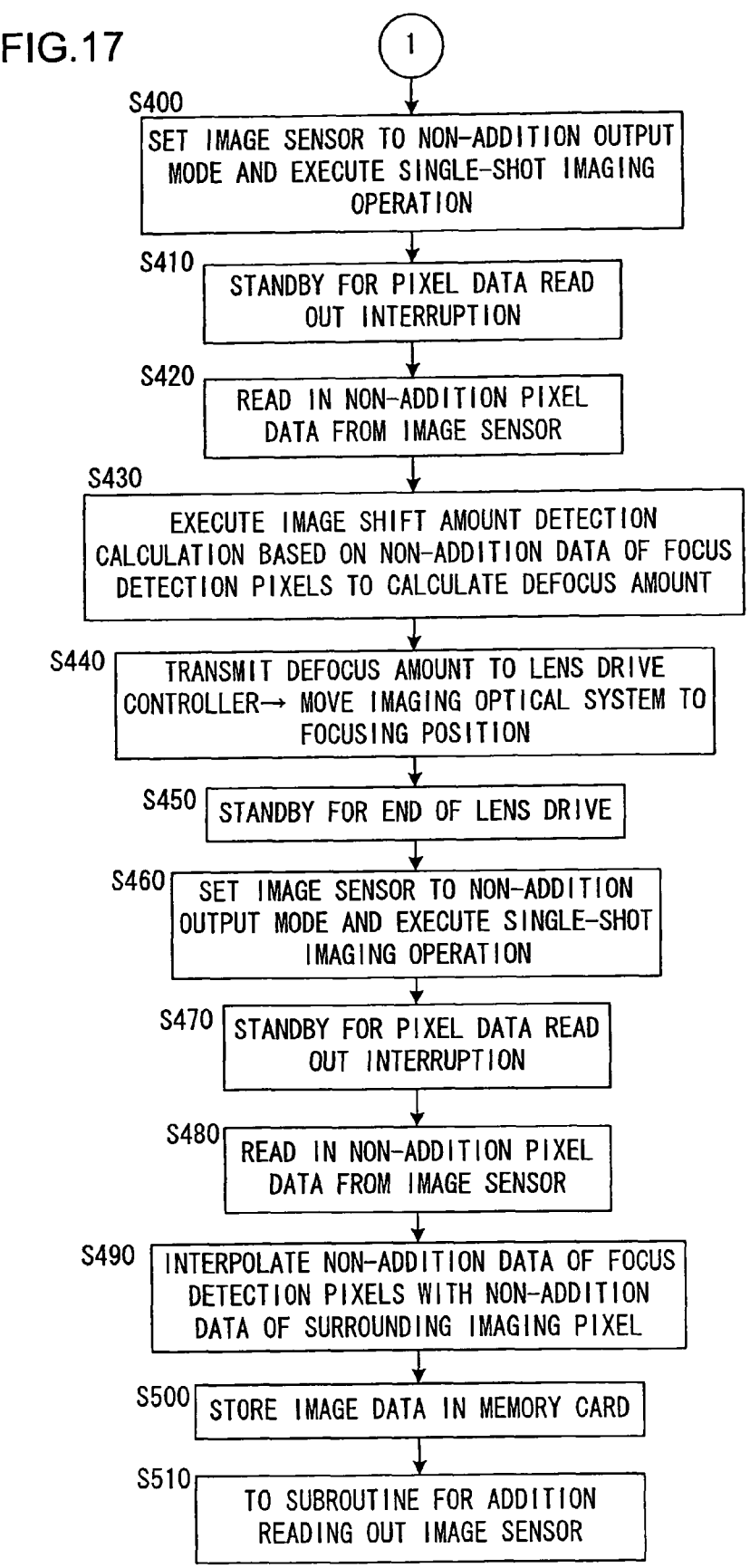

IMAGE-CAPTURING DEVICE, CAMERA, METHOD FOR CONSTRUCTING IMAGE-CAPTURING DEVICE AND IMAGE-CAPTURING METHOD FOR EXECUTING DISPLAY OF A LIVE VIEW AND A FOCUS DETECTION OPERATION SIMULTANEOUSLY

INCORPORATION BY REFERENCE

The disclosures of the following priority applications are herein incorporated by reference: Japanese Patent Application No. 2007-257409 filed Oct. 1, 2007, and U.S. Provisional Patent Application No. 60/960,518, Oct. 2, 2007.

BACKGROUND OF THE INVENTION

1. Field of the Invention

The present invention relates to an image-capturing device, camera, method for constructing image-capturing device and image-capturing method.

2. Description of Related Art

Japanese Laid Open Patent Application No. 2007-155929 discloses an imaging device that includes an image sensor having two-dimensionally arrayed imaging pixels a portion of which is substituted by one or more focus detection pixels, the image sensor being used to perform imaging and focus detection.

There is an imaging apparatus known in the art that displays a live view by repeating operations of adding outputs of imaging pixels and displaying the result as an output of display pixel on a display periodically in short intervals. Note that the outputs of the imaging pixels are added in order to reduce data in the outputs of display pixels, thereby speeding up output of the display pixels.

SUMMARY OF THE INVENTION

However, when the display of live view and the focus detection operation are executed simultaneously by the above-mentioned conventional imaging apparatus, there is the possibility that outputs of different types of pixels will be mixed at the time of addition. If the outputs of the imaging pixels and the focus detection pixels are mixed at the time of addition, or outputs of different types of imaging pixels are mixed at the time of addition, there is the possibility that quality of the displayed image based on the added pixel data will be deteriorated. Further, if the outputs of different types of focus detection pixels are mixed at the time of addition, there is the possibility that focus detection using added pixel data cannot be executed.

According to the 1st aspect of the present invention, an image-capturing device comprises: a plurality of first pixels disposed along a first direction; a plurality of second pixels different from the first pixels disposed along the first direction in admixture with the plurality of first pixels; and an adder that adds a plurality of outputs provided by a plurality of first selected pixels selected from the plurality of first pixels to each other and a plurality of outputs provided by a plurality of second selected pixels selected from the plurality of second pixels to each other in such a manner that outputs provided by the first pixels and outputs provided by the second pixels are not added one to another. Disposition of the plurality of second pixels conforms to positional relationship of the plurality of first selected pixels in the plurality of first pixels.

According to the 2nd aspect of the present invention, in the image-capturing device according to the 1st aspect, it is preferred that the plurality of first pixels includes a plurality of types of pixels having spectral sensitivity characteristics different from each other, and the adder selects only pixels of the same type from among the plurality of types of pixels as the plurality of first selected pixels and adds a plurality of outputs provided by the plurality of first selected pixels to each other.

According to the 3rd aspect of the present invention, in the image-capturing device according to the 1st aspect, it is preferred that the plurality of first pixels and the plurality of second pixels provides a first pixel disposition, and that the image-capturing device further comprises a second pixel disposition including a plurality of first pixels disposed in parallel to the first pixel disposition. The adder adds outputs provided by the first pixels in the second pixel disposition based on the positional relationship of the plurality of first selected pixels in the first pixel disposition.

According to the 4th aspect of the present invention, in the image-capturing device according to the 1st aspect, it is preferred that the plurality of second pixels includes a plurality of types of pixels from which a pair of outputs different from each other is provided, and the adder selects only pixels of the same type from among the plurality of types of pixels as the plurality of second selected pixels and adds a plurality of outputs provided by the plurality of second selected pixels to each other.

According to the 5th aspect of the present invention, in the image-capturing device according to the 4th aspect, it is preferred that the first pixels each receive a light flux corresponding to an image formed by an optical system on the image-capturing device, and the second pixels each include a first focus detection pixel that receives one of a pair of light fluxes passing through the optical system and a second focus detection pixel that receives the other of the pair of light fluxes.

According to the 6th aspect of the present invention, in the image-capturing device according to the 1st aspect, it is preferred that the first pixels each include a first micro-lens and a first photoelectric converter disposed corresponding to the first micro-lens; and the second pixels each include a second micro-lens and a second photoelectric converter disposed corresponding to the second micro-lens, the second photoelectric converter being different from the first photoelectric converter.

According to the 7th aspect of the present invention, in the image-capturing device according to the 4th aspect, it is preferred that the plurality of second pixels include a plurality of types of photoelectric converters disposed corresponding to the micro-lenses, wherein the pair of outputs different from each other is provided by the plurality types of photoelectric converters.

According to the 8th aspect of the present invention, an image-capturing device comprises a plurality of first pixels disposed along a first direction; a plurality of second pixels different from the first pixels disposed along the first direction in admixture with the plurality of first pixels; and an adder that adds a plurality of outputs provided by a plurality of first selected pixels selected from the plurality of first pixels to each other and a plurality of outputs provided by a plurality of second selected pixels selected from the plurality of second pixels to each other in such a manner that outputs provided by the first pixels and outputs provided by the second pixels are not added one to another. The plurality of first pixels and the plurality of second pixels are disposed based on positional relationship of the plurality of second selected pixels, of which outputs are added by the adder, from among the plurality of second pixels.

According to the 9th aspect of the present invention, in the image-capturing device according to the 8th aspect, it is preferred that the disposition of the plurality of first pixels conforms to the positional relationship of the plurality of the second pixels selected referring to a pixel at an end of the plurality of second pixels as a reference.

According to the 10th aspect of the present invention, in the image-capturing device according to the 8th aspect, it is preferred that the plurality of second pixels includes a plurality of types of pixels, from which a pair of outputs different from each other is provided, and the adder adds a plurality of outputs provided by only pixels of the same type from among the plurality of types of pixels to each other.

According to the 11th aspect of the present invention, in the image-capturing device according to the 10th aspect, it is preferred that the first pixels each receive a light flux corresponding to an image formed by an optical system on the image-capturing device, and the second pixels each include a first focus detection pixel that receives one of a pair of light fluxes passing through the optical system and a second focus detection pixel that receives the other of the pair of light fluxes.

According to the 12th aspect of the present invention, in the image-capturing device according to the 8th aspect, it is preferred that the first pixels each include a first micro-lens and a first photoelectric converter disposed corresponding to the first micro-lens; the second pixels each include a second micro-lens and a second photoelectric converter disposed corresponding to the second micro-lens, the second photoelectric converter being different from the first photoelectric converter.

According to the 13th aspect of the present invention, in the image-capturing device according to the 10th aspect, it is preferred that the plurality of second pixels include a plurality of types of photoelectric converters disposed corresponding to the micro-lenses, wherein the pair of outputs different from each other is provided by the plurality types of photoelectric converters.

According to the 14th aspect of the present invention, a camera comprises: an image-capturing device according to the 1st aspect that receives a light flux through an optical system; a display device that displays an image formed by the optical system based on outputs provided by the first selected pixels; and a focus detector that detects a focus adjusting state of the optical system based on outputs provided by the second selected pixels.

According to the 15th aspect of the present invention, in the camera according to the 14th aspect, it is preferred that the camera further comprises: a controller that periodically controls an addition operation by the adder and updates display of the image by the display device and detection of the focus adjusting state by the focus detector in synchronization with each other.

According to the 16th aspect of the present invention, in the camera according to the 14th aspect, it is preferred that the camera further comprises: a controller that prohibits an addition operation by the adder and causes outputs provided by the plurality of first pixels to be output to the image-capturing device.

According to the 17th aspect of the present invention, in the camera according to the 14th aspect, it is preferred that the camera further comprises: a focus adjuster that performs focus adjustment of the optical system based on a result of detection by the focus detector.

According to the 18th aspect of the present invention, in the camera according to the 14th aspect, it is preferred that the camera further comprises: an interpolator that obtains by interpolation outputs that correspond to outputs of the first pixels at positions of the plurality of second pixels based on the outputs from the plurality of first pixels.

According to the 19th aspect of the present invention, a camera comprises: an image-capturing device according to the 8th aspect that receives a light flux through an optical system; a display device that displays an image formed by the optical system based on outputs provided by the first selected pixels; and a focus detector that detects a focus adjusting state of the optical system based on outputs provided by the second selected pixels.

According to the 20th aspect of the present invention, in the camera according to the 19th aspect, it is preferred that the camera further comprises: a controller that periodically controls an addition operation by the adder and updates display of the image by the display device and detection of the focus adjusting state by the focus detector in synchronization with each other.

According to the 21st aspect of the present invention, in the camera according to the 19th aspect, it is preferred that the camera further comprises: a controller that prohibits an addition operation by the adder and causes outputs provided by the plurality of first pixels to be output to the image-capturing device.

According to the 22nd aspect of the present invention, in the camera according to the 19th aspect, it is preferred that the camera further comprises: a focus adjuster that performs focus adjustment of the optical system based on a result of detection by the focus detector.

According to the 23rd aspect of the present invention, in the camera according to the 19th aspect, it is preferred that the camera further comprises: an interpolator that obtains by interpolation outputs that correspond to outputs of the first pixels at positions of the plurality of second pixels based on the outputs from the plurality of first pixels.

According to the 24th aspect of the present invention, a method for constructing an image-capturing device comprises: providing an image sensor including a plurality of first pixels disposed along a first direction and a plurality of second pixels different from the first pixels disposed along the first direction in admixture with the plurality of first pixels; providing an adder that adds a plurality of outputs provided by a plurality of first selected pixels selected from the plurality of first pixels to each other and a plurality of outputs provided by a plurality of second selected pixels selected from the plurality of second pixels to each other in such a manner that outputs provided by the first pixels and outputs provided by the second pixels are not added one to another. Disposition of the plurality of second pixels is conformed to positional relationship of the plurality of first selected pixels in the plurality of first pixels.

According to the 25th aspect of the present invention, in the method for constructing an image-capturing device according to the 24th aspect, it is preferred that the method further comprises: providing as the plurality of first pixels a plurality of types of pixels having spectral sensitivity characteristics different from each other, and selecting only pixels of the same type from among the plurality of types of pixels as the plurality of first selected pixels.

According to the 26th aspect of the present invention, in the method for constructing an image-capturing device according to the 24th aspect, it is preferred that the plurality of first pixels and the plurality of second pixels provides a first pixel disposition, and that the method further comprises: providing a second pixel disposition including a plurality of first pixels disposed in parallel to the first pixel disposition; and adding outputs provided by the first pixels in the second pixel disposition based on the positional relationship of the plurality of first selected pixels in the first pixel disposition.

According to the 27th aspect of the present invention, in the method for constructing an image-capturing device according to the 24th aspect, it is preferred that the method further comprises: providing, as the plurality of second pixels, a plurality of types of pixels, from which a pair of outputs different from each other is provided, and selecting only pixels of the same type from among the plurality of types of pixels as the plurality of second selected pixels.

According to the 28th aspect of the present invention, in the method for constructing an image-capturing device according to the 27th aspect, it is preferred that the method further comprises: receiving by the first pixels a light flux corresponding to an image formed by an optical system on the image-capturing device; and providing, as the second pixels, first focus detection pixels that receive one of a pair of light fluxes passing through the optical system and second focus detection pixels that receive the other of the pair of light fluxes.

According to the 29th aspect of the present invention, in the method for constructing an image-capturing device according to the 24th aspect, it is preferred that the method further comprises; providing in each of the first pixels a first microlens and a first photoelectric converter disposed corresponding to the first micro-lens; and providing in each of the second pixels a second micro-lens and a second photoelectric converter disposed corresponding to the second micro-lens, the second photoelectric converter being different from the first photoelectric converter.

According to the 30th aspect of the present invention, in the method for constructing an image-capturing device according to the 27th aspect, the method further comprises: providing in the plurality of second pixels a plurality of types of photoelectric converters disposed corresponding to the micro-lenses to provide the pair of outputs different from each other by the plurality types of photoelectric converters.

According to the 31st aspect of the present invention, a method for constructing an image-capturing device comprises: providing an image sensor including a plurality of first pixels disposed along a first direction and a plurality of second pixels different from the first pixels disposed along the first direction in admixture with the plurality of first pixels; providing an adder that adds a plurality of outputs provided by a plurality of first selected pixels selected from the plurality of first pixels to each other and a plurality of outputs provided by a plurality of second selected pixels selected from the plurality of second pixels to each other in such a manner that outputs provided by the first pixels and outputs provided by the second pixels are not added one to another. The plurality of first pixels and the plurality of second pixels are disposed based on positional relationship of the plurality of second selected pixels, of which outputs are added by the adder, from among the plurality of second pixels.

According to the 32nd aspect of the present invention, in the method for constructing an image-capturing device according to the 31st aspect, it is preferred that the method further comprises: conforming the disposition of the plurality of first pixels to the positional relationship of the plurality of the second pixels selected referring to a pixel at an end of the plurality of second pixels as a reference.

According to the 33rd aspect of the present invention, in the method for constructing an image-capturing device according to the 31st aspect, it is preferred that the method further comprises: providing, as the plurality of second pixels, a plurality of types of pixels, from which a pair of outputs different from each other is provided, and selecting only pixels of the same type from among the plurality of types of pixels as the plurality of second selected pixels.

According to the 34th aspect of the present invention, in the method for constructing an image-capturing device according to the 33rd aspect, the method further comprises: receiving, by the first pixels, a light flux corresponding to an image formed by an optical system on the image-capturing device; and providing, as the second pixels, first focus detection pixels that receive one of a pair of light fluxes passing through the optical system and second focus detection pixels that receive the other of the pair of light fluxes.

According to the 35th aspect of the present invention, in the method for constructing an image-capturing device according to the 31st aspect, the method further comprises: providing in each of the first pixels a first micro-lens and a first photoelectric converter disposed corresponding to the first micro-lens; and providing in each of the second pixels a second micro-lens and a second photoelectric converter disposed corresponding to the second micro-lens, the second photoelectric converter being different from the first photoelectric converter.

According to the 36th aspect of the present invention, in the method for constructing an image-capturing device according to the 33rd aspect, the method further comprises: providing, in the plurality of second pixels, a plurality of types of photoelectric converters disposed corresponding to the micro-lenses to provide the pair of outputs different from each other by the plurality types of photoelectric converters.

According to the 37th aspect of the present invention, an imaging method comprises: receiving a light flux through an optical system by an image-capturing device according to the 1st aspect; displaying an image formed by the optical system based on outputs provided by the first selected pixels; and detecting a focus adjusting state of the optical system based on outputs provided by the second selected pixels.

According to the 38th aspect of the present invention, in the imaging method according to the 37th aspect, it is preferred that the method further comprises: periodically performing an operation of addition of outputs obtained by the plurality of first pixels and the plurality of second pixels to update display of the image by the display device and detection of the focus adjusting state in synchronization with each other.

According to the 39th aspect of the present invention, in the imaging method according to the 37th aspect, it is preferred that the method further comprises: prohibiting an operation of addition of the outputs from the plurality of first pixels and the outputs from the plurality of second pixels and outputting the outputs provided by the plurality of the first pixels.

According to the 40th aspect of the present invention, in the imaging method according to the 37th aspect, it is preferred that the method further comprises: performing focus adjustment of the optical system based on a result of detection of the focus adjusting state.

According to the 41st aspect of the present invention, in the imaging method according to the 37th aspect, it is preferred that the method further comprises: obtaining by interpolation outputs that correspond to outputs of the first pixels at positions of the plurality of second pixels based on the outputs from the plurality of first pixels.

According to the 42nd aspect of the present invention, an imaging method comprises: receiving a light flux through an optical system by an image-capturing device according to the 8th aspect: displaying an image formed by the optical system based on outputs provided by the first selected pixels; and detecting a focus adjusting state of the optical system based on outputs provided by the second selected pixels.

According to the 43th aspect of the present invention, in the imaging method according to the 42nd aspect, it is preferred that the method further comprises: periodically performing an operation of addition of outputs provided by the plurality of first pixels and the plurality of second pixels to update display of the image by the display device and detection of the focus adjusting state in synchronization with each other.

According to the 44th aspect of the present invention, in the imaging method according to the 42nd aspect, it is preferred that the method further comprises: prohibiting an operation of addition of the outputs from the plurality of first pixels and the outputs from the plurality of second pixels and outputting the outputs provided by the plurality of the first pixels.

According to the 45th aspect of the present invention, in the imaging method according to the 42nd method, it is preferred that the method further comprises: performing focus adjustment of the optical system based on a result of detection of the focus adjusting state.

According to the 46th aspect of the present invention, in the imaging method according to the 42nd aspect, it is preferred that the method further comprises: obtaining by interpolation outputs that correspond to outputs of the first pixels at positions of the plurality of second pixels based on the outputs from the plurality of first pixels.

BRIEF DESCRIPTION OF THE DRAWINGS

FIGS. 5A and 5B each are a front view of a focus detection pixel;

FIGS. 14 through 17 present each a flowchart of the operations executed in the digital still camera (imaging apparatus) in an embodiment;

DESCRIPTION OF PREFERRED EMBODIMENTS

First Embodiment

Figure 1:
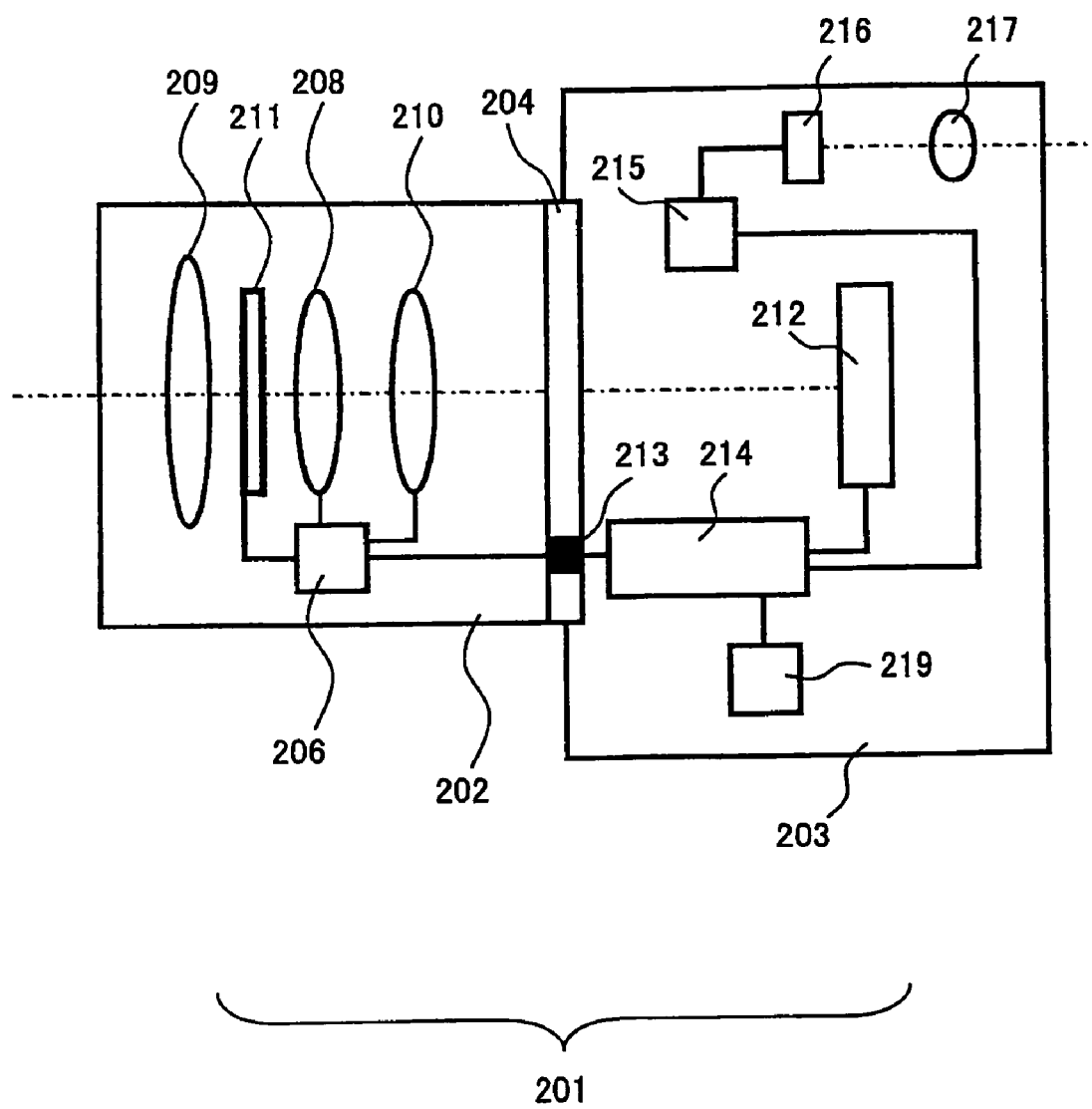
FIG. 1 is a lateral sectional view of the structure adopted in the camera achieved in an embodiment of the present invention.

A digital still camera used in conjunction with exchangeable lenses, representing an example of an imaging apparatus equipped with the focus detector achieved in an embodiment of the present invention is now explained. FIG. 1 is a lateral sectional view of the structure adopted in the camera in the embodiment. A digital still camera 201 achieved in the embodiment includes an exchangeable lens 202 and a camera body 203. The exchangeable lens 202 is mounted at the camera body 203 via a mount unit 204.

The exchangeable lens 202 includes a lens 209, a zooming lens 208, a focusing lens 210, an aperture 211, a lens drive controller 206 and the like. The lens drive controller 206 is constituted with a microcomputer, a memory, a drive control circuit and the like (not shown). The lens drive controller 206 engages in communication with a body drive controller 214 to be detailed later to transmit lens information to the body drive controller 214 and receive camera information from the body drive controller 214, as well as executing drive control to adjust the focus of the focusing lens 210 and adjust the opening diameter at the aperture 211 and detecting the states of the zooming lens 208, the focusing lens 210 and the aperture 211. The aperture 211 forms an opening with an adjustable diameter centered on the optical axis in order to adjust the light quantity and the extent of blur.

The camera body 203 includes an image sensor 212, a body drive controller 214, a liquid crystal display drive circuit 215, a liquid crystal display element 216, an eyepiece 217, and a memory card 219. The image sensor 212 has two-dimensionally arrayed imaging pixels in which focus detection pixels are incorporated in a portion corresponding to the focus detection positions.

The body drive controller 214 includes a microcomputer, a memory, a drive control circuit and the like. The body drive controller 214 repeatedly executes drive control of the image sensor 212, reads out image signals and focus detection signals, executes focus detection calculation based upon the focus detection signals, and adjusts the focus of the exchangeable lens 202. It also processes the image signals, records the processed image signals, controls camera operations and the like. In addition, the body drive controller 214 engages in communication with the lens drive controller 206 via an electrical contact point 213 to receive the lens information and transmit the camera information (indicating the defocus amount, the aperture value and the like).

The liquid crystal display element 216 functions as a liquid crystal viewfinder (EVF: electronic viewfinder). A through image provided by the image sensor 212, brought up on display at the liquid crystal display element 216 by the liquid crystal display element drive circuit 215, can be observed by the photographer via the eyepiece lens 217. The memory card 219 is an image storage medium in which an image captured by the image sensor 212 is stored.

A subject image is formed on the light receiving surface of the image sensor 212 with a light flux having passed through the exchangeable lens 202. The subject image undergoes photoelectric conversion at the image sensor 212 and subsequently, image signals and focus detection signals are transmitted to the body drive controller 214.

The body drive controller 214 calculates the defocus amount indicating the extent of defocusing based upon focus detection signals output from the focus detection pixels at the image sensor 212 and transmits this defocus amount to the lens drive controller 206. In addition, the body drive controller 214 processes the image signals provided from the image sensor 212 and stores the processed image signals into the memory card 219. It also provides through image signals from the image sensor 212 to the liquid crystal display element drive circuit 215 so as to bring up a through image on display at the liquid crystal display element 216. Moreover, the body drive controller 214 provides aperture control information to the lens drive controller 206 to enable control of the opening of the aperture 211 to be achieved.

The lens drive controller 206 adjusts the lens information in correspondence to the current focusing state, zooming state and aperture setting state, the full-aperture and the like. More specifically, the lens drive controller 206 detects the positions of the zooming lens 208 and the focusing lens 210 and the aperture value set for the aperture 211, and calculates correct lens information based upon the lens positions and the aperture value. Alternatively, it may select the lens information corresponding to the lens positions and the aperture value from a lookup table prepared in advance.

In addition, the lens drive controller 206 calculates a lens drive amount indicating the extent to which the lens is to be driven based upon the defocus amount having been received and drives the focusing lens 210 to a focusing position based upon the lens drive amount. In addition, the lens drive controller 206 drives the aperture 211 in correspondence to the aperture value it has received.

Exchangeable lenses 202 equipped with various imaging optical systems can be mounted at the camera body 203 via the mount unit 204 and the camera body 203 detects the state of focus adjustment of the exchangeable lens 202 currently mounted there at based upon the output from the focus detection pixels built into the image sensor 212.

Figure 2:
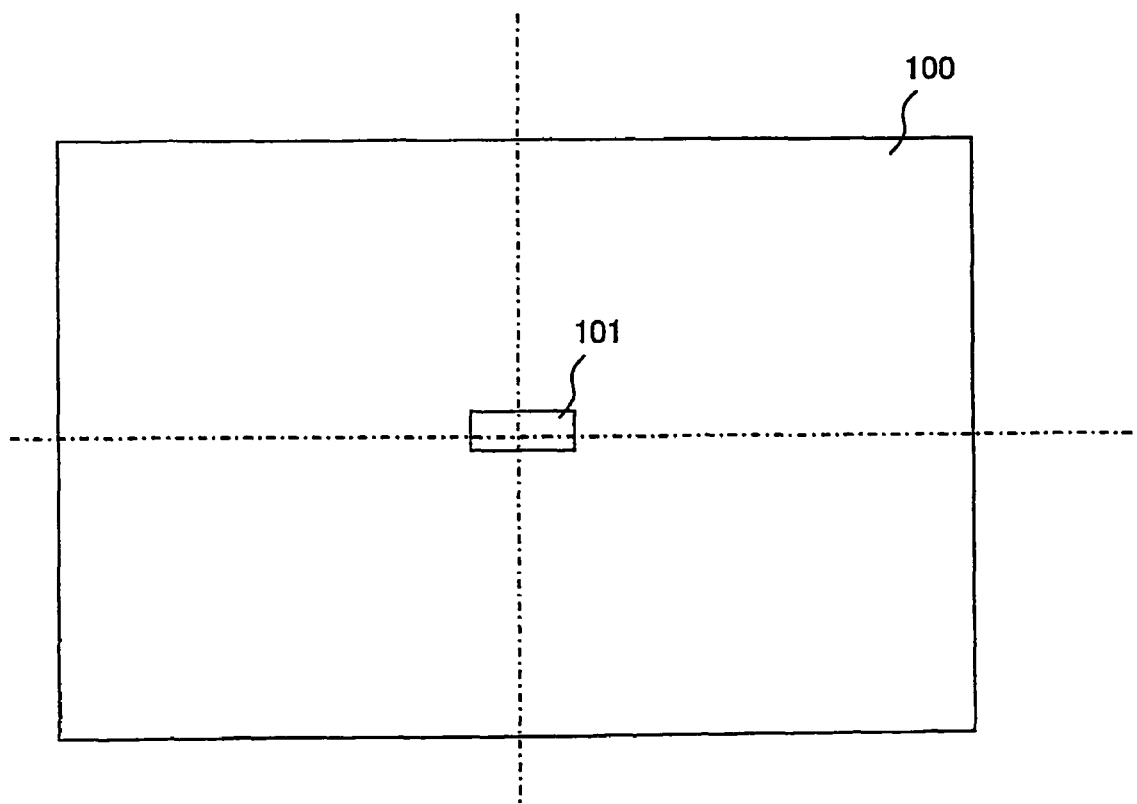
FIG. 2 shows the focus detection points set on the photographic image plane in the embodiment.

FIG. 2 shows a focus detection point set on the photographic image plane, indicating an example of an area (focus detection area or a focus detection point) at which an image is sampled on the photographic image plane along a focus detection pixel row for purposes of focus detection. In the present embodiment, a focus detection areas 101 is set at the center of a rectangular photographic image plane 100. Focus detection pixels are arrayed along a straight line along the longer side of the focus detection area 101 indicated as a rectangular area. The photographer manually selects a single focus detection area among the plurality of focus detection areas in correspondence to the image composition.

Figure 3:
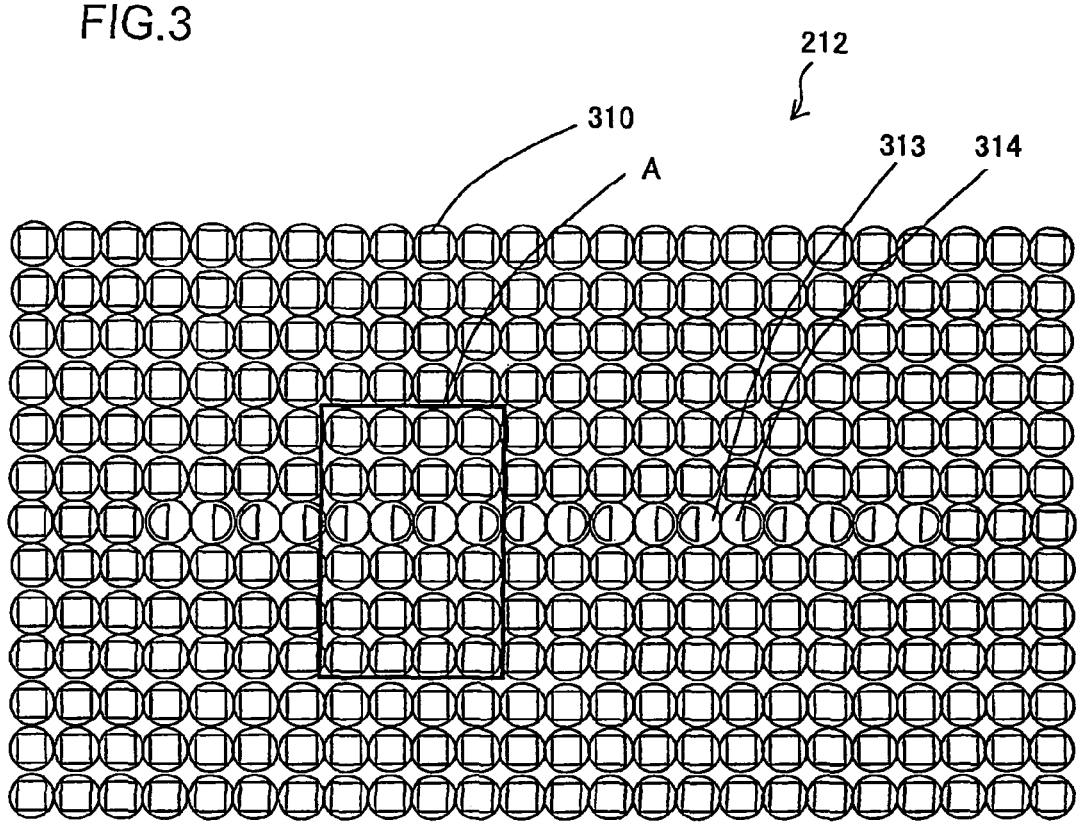
FIG. 3 is a front view showing the structure of the image sensor in detail.

FIG. 3 is a front view showing in detail the structure adopted in the image sensor 212, in an enlargement of the vicinity of one of the focus detection areas 101 on the image sensor 212. The image sensor 212 is constituted with imaging pixels 310 and focus detection pixels 313 and 314. The imaging pixels 310 are arranged two-dimensionally along the horizontal and vertical directions to form a square lattice array. On the other hand, the focus detection pixels 313 and 314 are disposed along the horizontal direction.

Figure 4:
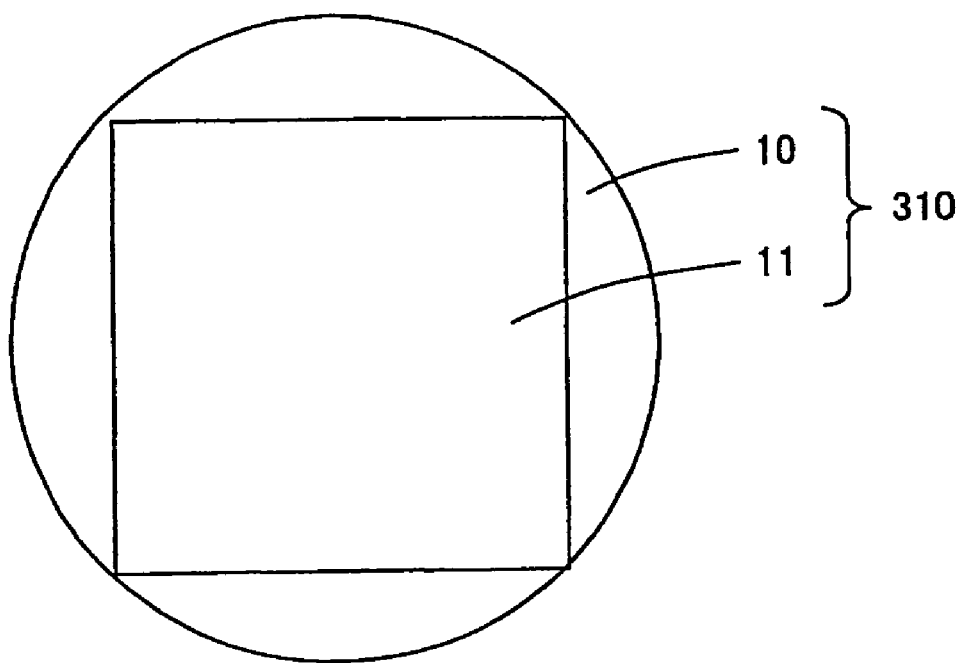
FIG. 4 is a front view of an imaging pixel.

As shown in FIG. 4, the focus detection pixels 310 each include a micro-lens 10 and a photoelectric converter 11. As shown in FIG. 5A, the focus detection pixels 313 each include a micro-lens 10 and a photoelectric converter 13. The photoelectric converter 13 assumes the shape of a left half circle, the right side of which is substantially in contact with the vertical bisector extending along the diameter of the micro-lens 10. Further, as shown in FIG. 5B, the focus detection pixels 314 each include the micro-lens 10 and a photoelectric converter 14. The photoelectric converter which is substantially in contact with the vertical bisector extending along the diameter of the micro-lens 10.

Figure 6:
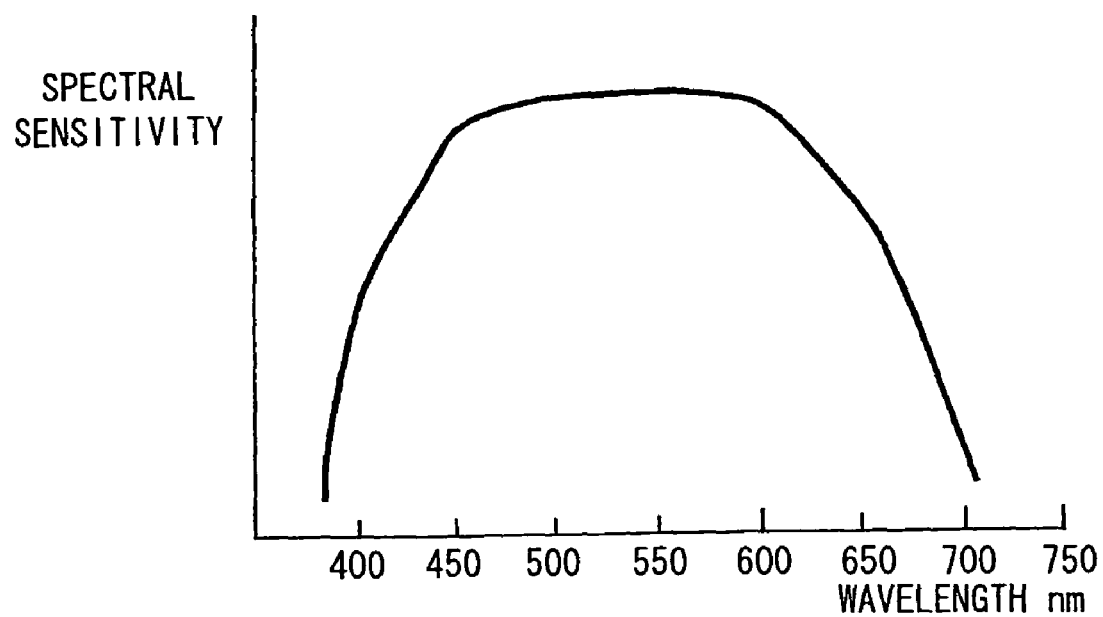
FIG. 6 shows the spectral sensitivity characteristics of the focus detection pixels.

When their micro-lenses 10 are aligned, the photoelectric converter 13 and 14 assume side-by-side positions, one taking up a right-side position and the other taking up a left-side position along the horizontal direction in the figures. The photoelectric converter 13 and 14 are symmetrical with each other relative to the vertical bisector extending along the diameter of the micro-lenses 10. The focus detection pixels 313 and the focus detection pixels 314 are disposed alternately along the horizontal direction in the figures, i.e., along the direction in which the photoelectric converter 13 and 14 are set next to each other. FIG. 6 shows the spectral sensitivity characteristics of the imaging pixels 310 and the focus detection pixels 313 and 314.

Figure 7:
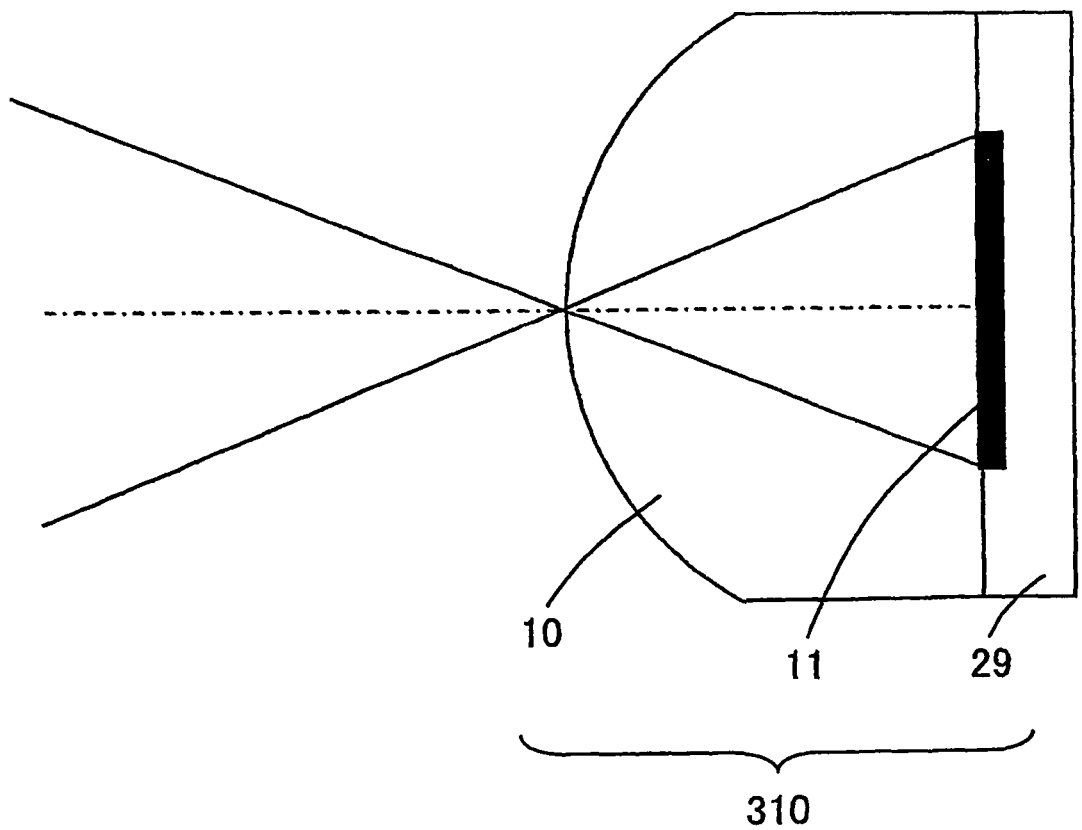
FIG. 7 is a sectional view of an imaging pixel.

FIG. 7 is a sectional view of an imaging pixel 310. The micro-lens 10 is set to the front of the imaging photoelectric converter 11 at the imaging pixel 310 and, as a result, an image of the photoelectric converter 11 is projected frontward via the micro-lens 10. The photoelectric converter 11 is formed on a semiconductor circuit substrate 29.

Figure 8A:
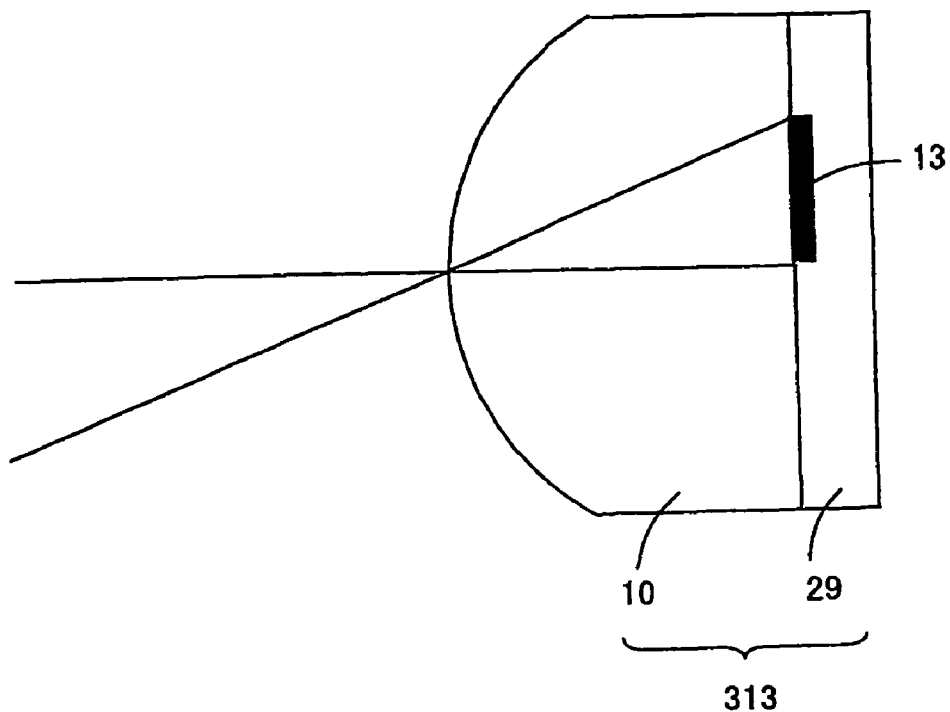
FIGS. 8A and 8B each are a sectional view of a focus detection pixel.

FIG. 8A presents a sectional view of a focus detection pixel 313. The micro-lens 10 is disposed to the front of the focus detection photoelectric converter 13 at the focus detection pixel 313 so as to project the photoelectric converter 13 along the frontward direction via the micro-lens 10. The photoelectric converter 13 is formed on the semiconductor circuit substrate 29. The micro-lens 10 is formed thereon as a fixed, integral part through a semiconductor image sensor manufacturing process. The photoelectric converter 13 is disposed on one side of the optical axis of the micro-lens 10.

Figure 8B:
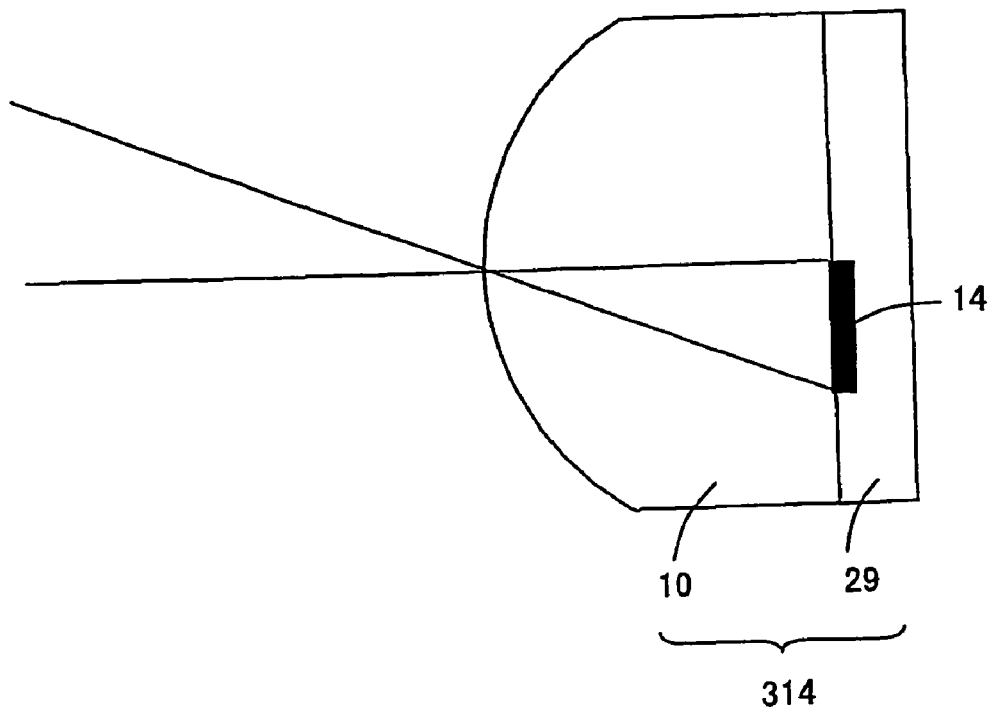

FIG. 8B presents a sectional view of a focus detection pixel 314. The micro-lens 10 is disposed to the front of the focus detection photoelectric converter 14 at the focus detection pixel 314 so as to project the photoelectric converter 14 along the frontward direction via the micro-lens 10. The photoelectric converter 14 is formed on the semiconductor circuit substrate 29. The micro-lens 10 is formed thereon as a fixed, integral part through a semiconductor image sensor manufacturing process. The photoelectric converter 14 is disposed on one side of the optical axis of the micro-lens 10 and on the side opposite to the photoelectric converter 13.

Figure 9:
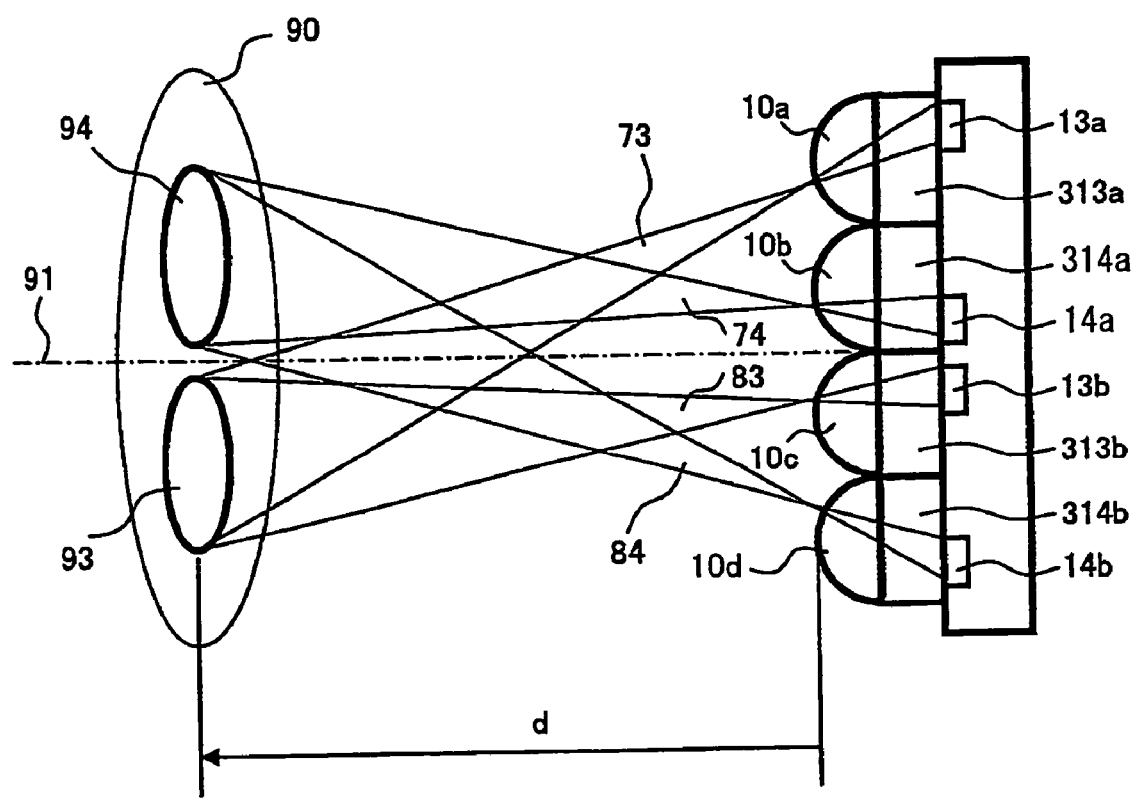
FIG. 9 shows the structure of a focus detection optical system used to detect the focus state through a split-pupil phase difference detection by using micro-lenses.

Focus detection adopting a split-pupil phase difference detection method, executed by using micro-lenses, is now described in reference to FIG. 9. Reference numeral 90 indicates the exit pupil set over a distance d along the frontward direction from the micro-lenses disposed near the predetermined imaging plane of the exchangeable lens 202 (see FIG. 1). The distance d is determined in correspondence to the curvature of the micro-lenses, the refractive index of the micro-lenses, the distance between the micro-lenses and the photoelectric converters and the like, and is referred to as a distance of pupil for focus detection in this description. Reference numeral 91 indicates the optical axis of the exchangeable lens, reference numerals 10a through 10d each indicate a micro-lens, reference numerals 13a, 13b, 14a, and 14b each indicate a photoelectric converter, reference numerals 313a, 313b, 314a, and 314b each indicate a focus detection pixel, and reference numerals 73, 74, 83, and 84 each indicate a focus detection light flux.

Reference numeral 93 indicates an area defined by the photoelectric converters 13a and 13b projected via the micro-lenses 10a and 10c, and this area is hereafter referred to as a pupil for focus detection in the description. While the area is shown as an elliptical area so as to simplify the illustration in the drawing, the area actually has a shape corresponding to an enlarged projection of the shape of the photoelectric converter. Similarly, reference numeral 94 indicates an area defined by the photoelectric converters 10b and 10d projected via the micro-lenses 14a and 14b and this area is hereafter referred to as a pupil for focus detection in the description. While the area is shown as an elliptical area so as to simplify the illustration in the drawing, the area actually has a shape corresponding to an enlarged projection of the shape of the photoelectric converter.

While FIG. 9 schematically shows four focus detection pixels 3131, 313b, 314a, and 314b disposed in sequence next to each other, the photoelectric converters of other focus detection pixels, too, receive light fluxes arriving at their micro-lenses from the respective pupils for focus detection. The focus detection pixels are arrayed in a direction matching the direction in which the pair of pupils for focus detection is set side-by-side, that is, in a direction matching the direction in which the pair of photoelectric converters is set side-by-side.

The micro-lenses 10a through 10d are disposed near the predetermined imaging plane of the exchangeable lens 202 (see FIG. 1), and as the shapes of the photoelectric converters 13a, 13b, 14a and 14b disposed behind the micro-lenses 10a through 10d are projected onto the exit pupil 90 distanced from the micro-lenses 10a through 10d by the distance of pupil for focus detection d, the projected shapes define the pupils for focus detection 93 and 94. In other words, the directions along which the photoelectric converters at individual pixels are projected are determined so that the projected shapes (pupils for focus detection 93 and 94) of the photoelectric converters at the individual pixels are overlapped on the exit pupil 90 set apart by the projection distance d.

The photoelectric converter 13a outputs a signal corresponding to the intensity of an image formed on the micro-lens 10a with the light flux 73 having passed through the pupil for focus detection 93 and having advanced toward the micro-lens 10a. The photoelectric converter 13b outputs a signal corresponding to the intensity of an image formed on the micro-lens 10c with the light flux 83 having passed through the pupil for focus detection 93 and having advanced toward the micro-lens 10c. The photoelectric converter 14a outputs a signal corresponding to the intensity of an image formed on the micro-lens 10b with the light flux 74 having passed through the pupil for focus detection 94 and having advanced toward the micro-lens 10b. The photoelectric converter 14b outputs a signal corresponding to the intensity of an image formed on the micro-lens 10d with the light flux 84 having passed through the pupil for focus detection 94 and having advanced toward the micro-lens 10d.

By linearly disposing a large number of focus detection pixels each structured as described above and integrating the outputs from the photoelectric converters at the individual focus detection pixels into output groups each corresponding to one of the two pupils for focus detection 93 and 94, information related to the intensity distribution of the pair of images formed on the focus detection pixel row with the individual focus detection light fluxes passing through the pupil for focus detection 93 and the pupil for focus detection 94, is obtained. Image shift detection arithmetic processing (correlation arithmetic processing, phase difference detection processing), to be detailed later, is subsequently executed by using the information thus obtained so as to detect the extent of image shift manifested by the pair of images through the split-pupil phase difference detection method. Then, by executing a conversion operation on the image shift amount in correspondence to the distance between the centers of gravity of the pair of pupils for focus detection, the deviation (defocus amount) of the current image forming plane (the image forming plane at the focus detection position corresponding to the position assumed by the micro-lens array on the predetermined imaging plane) relative to the predetermined imaging plane is calculated.

Figure 10:
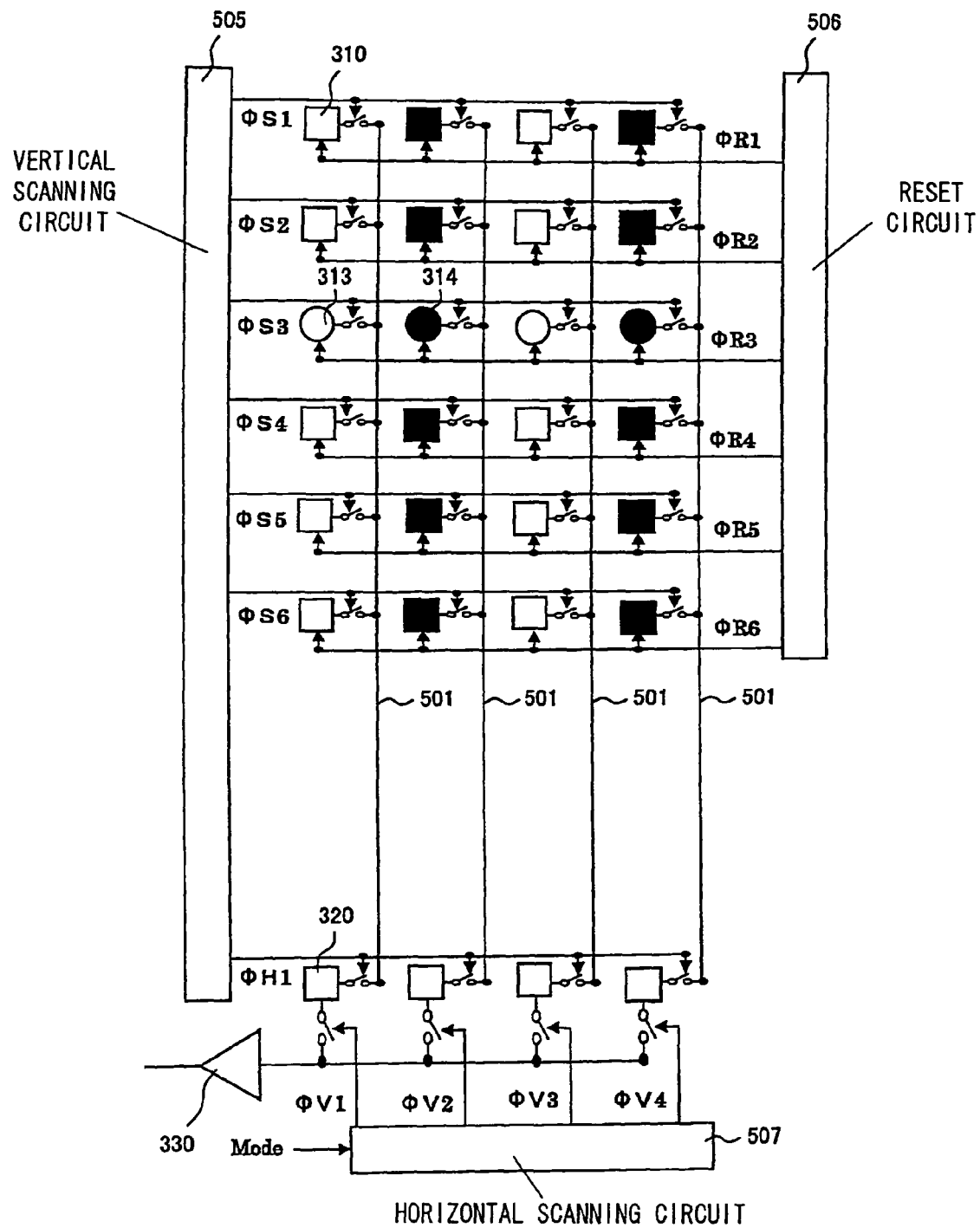
FIG. 10 is a conceptual diagram showing the circuit structure adopted in the image sensor in the embodiment.

FIG. 10 is a conceptual diagram showing the circuit structure of the image sensor 212. The image sensor 212 (see FIGS. 1 and 3) is constituted as a CMOS image sensor. In order to make it easier to understand the circuit structure of the image sensor 212, it is assumed that the image sensor 212 in FIG. 10 includes 4×6 pixels (four rows by six columns) as a layout corresponding to the rectangular area A shown in FIG. 3. The imaging pixels 310 (indicated by white and black square marks in the figure) are arranged at each row except for the third row and focus detection pixels 313 (indicated by white circle marks in the figure) and 314 (indicated by black circle marks in the figure) are alternately arranged.

In FIG. 10, line memories 320 each constitute a buffer where the pixel signals from the pixels in a given row are temporarily held, after the pixel signals output to vertical signal lines 501 are latched in response to a control signal ΦH1 generated from a vertical scanning circuit 505. Electrical charge storage at the imaging pixels 310 and at the focus detection pixels 313 and 314 is controlled in units of the individual rows independently of one another based upon control signals (ΦR1, ..., ΦR6) generated by a reset circuit 506. The pixel signal output from the imaging pixels 310 and the focus detection pixels 313 and 314 are controlled in units of the individual rows independently of one another based upon control signals (ΦS1, ..., ΦS6) generated by the vertical scanning circuit 505. The pixel signal at a pixel selected based upon a control signal is output to the corresponding vertical signal line 501.

The pixel signals held in the line memories 320 are sequentially transferred to an output circuit 330 in response to control signals (ΦV1, ..., ΦV4) generated by a horizontal scanning circuit 507 and the transferred signals are then amplified to a specific preset degree at the output circuit 330, from which they are output to the outside. Mode signals for switching the operation modes from one to another are supplied to the horizontal scanning circuit 507 from the outside to change the pixel selection pattern at the control signals (ΦV1, ..., ΦV4) in response to the signal level (high level or low level), thus switching the modes between an ordinary pixel signal output operation and an operation in which the pixel signals are added and output one to another.

Figure 11:
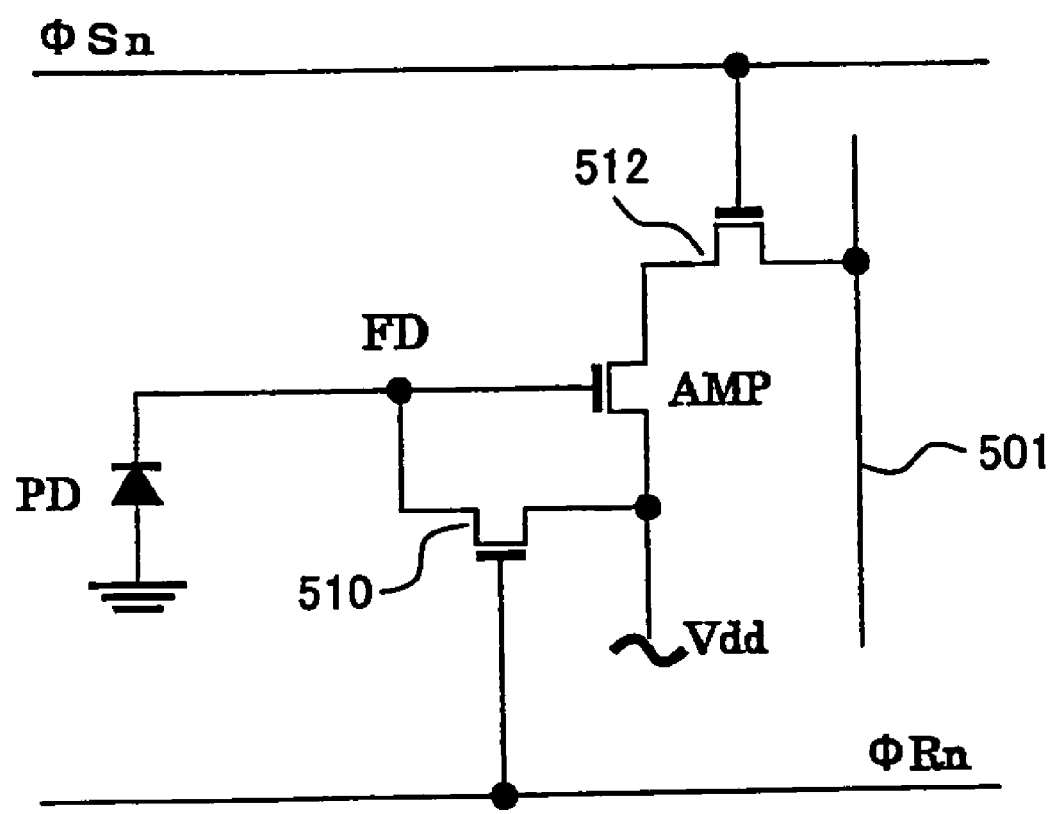
FIG. 11 is a detailed circuit diagram pertaining to the imaging pixels and the focus detection pixels shown in FIG. 10.

FIG. 11 is a detailed circuit diagram pertaining to the imaging pixels 310 and the focus detection pixels 313 and 314 shown in FIG. 10. The photoelectric converters 11, 13, and 14 (see FIGS. 7 and 8) each are constituted with a photodiode (PD). The electrical charge stored at the PD is accumulated in a floating diffusion (FD) layer. The FD is connected to the gate of an amplifier MOS transistor (AMP), and the AMP generates a signal corresponding to the quantity of electrical charge accumulated in the FD.

The FD is connected to a source voltage Vdd via a reset MOS transistor 510 and as the reset MOS transistor 510 is turned on by a control signal ΦRn (ΦV1, ..., ΦV6), the electrical charge having been collected in the FD and the PD is cleared, thereby resetting the FD and the PD. The output from the AMP is connected to the vertical output line 501 via a row selector MOS transistor 512, and as the row selector MOS transistor 512 is turned on by a control signal ΦSn (ΦS1, ..., ΦDS6), the output from the AMP is output into the vertical output line 501.

Figure 12:
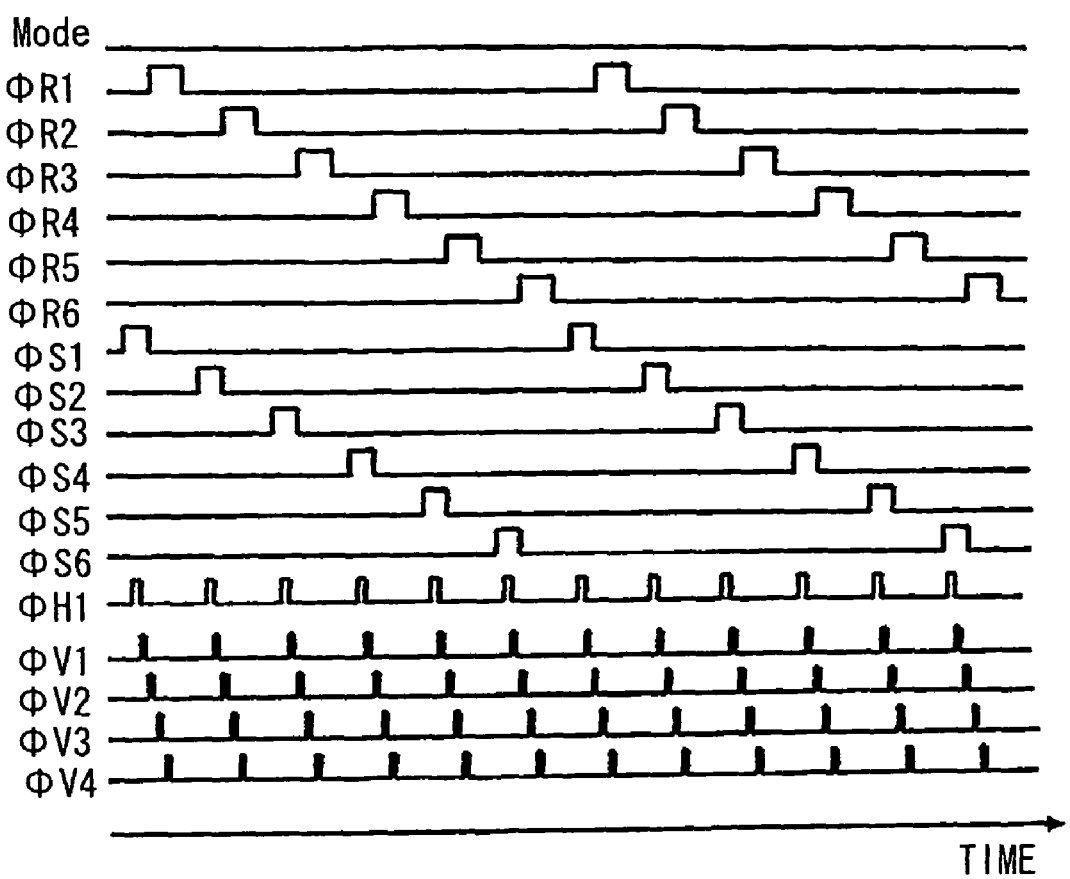
FIG. 12 is an operation timing chart pertaining to the image sensor in an ordinary operation mode.

FIG. 12 is a timing chart of the operation executed in the image sensor 212 in an ordinary operation mode. When the external signal Mode is at the low level, an ordinary operation mode (non-addition output mode) is executed. The imaging pixels 310 in the first row are selected by the control signal ΦS1 generated by the vertical scanning circuit 505 and the pixel signals from the selected imaging pixels 310 are output to the vertical signal lines 501. The pixel signals from the imaging pixels in the first row, having been output to the vertical signal lines 501, are temporarily held in the line memories 320 based upon a control signal ΦH1 provided in synchronization with the control signal ΦS1. The pixel signals from the imaging pixels 310 in the first row held in the line memories 320 are transferred to the output circuit 330 in response to the control signals ΦV1, ..., ΦV4 issued sequentially from the horizontal scanning circuit 507. They are then amplified to the specific preset extent at the output circuit 330 before they can be output to the outside.

As the transfer of the pixel signals at the imaging pixels 310 in the first row to line memory 320 ends, the imaging pixels 310 in the first row are reset in response to the control signal ΦR1 issued by the reset circuit 506 and the subsequent charge storage starts at the imaging pixels 310 in the first row at the trailing edge of the control signal ΦR1. As the output circuit 330 ends the output of the pixel signals from the imaging pixels 310 in the first row, the imaging pixels 310 in the second row are selected by the control signal ΦS2 issued by the vertical scanning circuit 505 and the pixel signals from the selected imaging pixels 310 are output to the vertical signal lines 501.

Similarly to th above, the pixel signals from the imaging pixels 310 in the second row are held, the imaging pixels 310 in the second row are reset, the pixel signals are output, and next accumulation of charge is started. Subsequently, the pixel signals from the focus detection pixels 313 and 314 in the third row are held, the imaging pixels 310 in the third row are reset, the pixel signals from the imaging pixels 310 and the focus detection pixels 313 and 314 are output, and next charge accumulation is started. Then, the pixel signals from the imaging pixels 310 in the fourth through sixth rows are held, the imaging pixels 310 are reset, the pixel signals from the imaging pixels 310 in the fourth through sixth rows are output, and next charge accumulation is started When output of the pixel signals from all the pixels ends, the imaging pixels in the first row are selected again and the operation described above is repeated.

By adjusting the pulse width of the control signals ΦR1 through ΦR6, the charge storage time (exposure time) at the imaging pixels 310 and the focus detection pixels 313 and 314 can be controlled. FIG. 12 presents a timing chart according to which electric charge storage and pixel signal output from the first row through the sixth row are periodically repeated. However, only one cycle of electric charge storage and pixel signal output may be performed one-time. Such an ordinary operation mode (non-addition output mode) is executed upon imaging.

Figure 13:
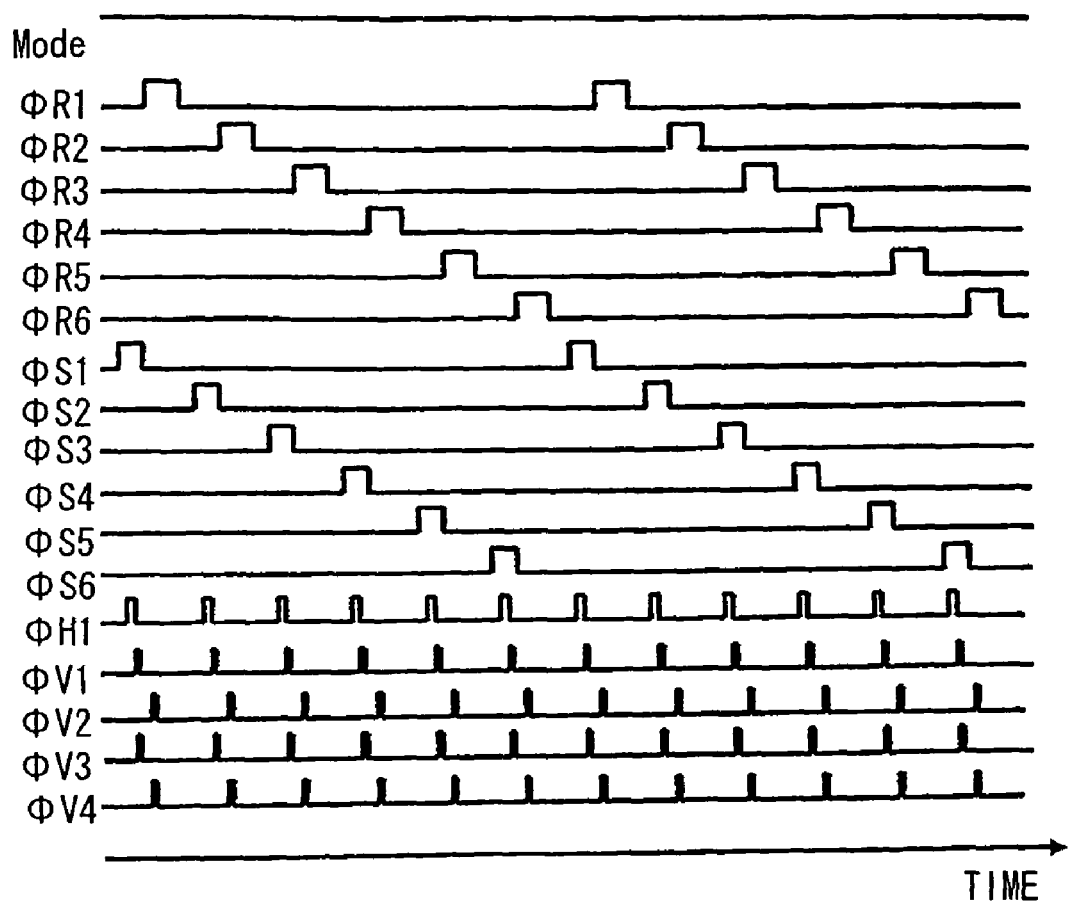
FIG. 13 is an operation timing chart pertaining to the image sensor in an addition output mode.
Figure 14:
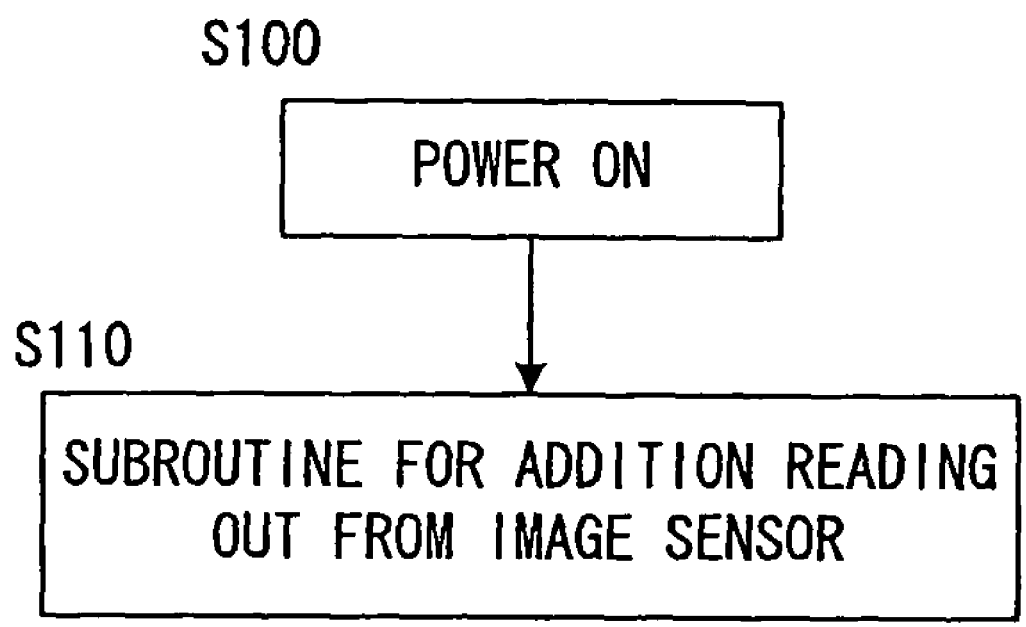

FIG. 13 is a timing chart of the operation executed in the image sensor 212 in an addition output mode. When the external signal Mode is at the high level, the addition operation mode is executed. The imaging pixels 310 in the first row are selected by the control signal ΦS1 generated by the vertical scanning circuit 505 and the pixel signals from the selected imaging pixels 310 are output to the vertical signal lines 501. The pixel signals from the imaging pixels in the first row, having been output to the vertical signal lines 501, are temporarily held in the line memories 320 based upon the control signal ΦH1 generated in synchronization with the control signal ΦS1. The pixel signals from the imaging pixels 310 in the first row held in the line memories 320 are transferred to the output circuit 330 in response to the control signals ΦV1 through ΦV4 generated sequentially from the horizontal scanning circuit 507. They are then amplified to the specific preset extent at the output circuit 330 before they can be output to the outside.

In the addition output mode, the control signals ΦV1 and ΦV3 are first generated simultaneously and subsequently the control signals ΦV2 and ΦV4 are generated simultaneously. As a result, the signals held by the line memories 320 at the first row and the third row (output signals from the imaging pixels 31 indicated by white square marks in FIG. 10) are added and output to the output circuit 330. Then the signals held by the line memories 320 at the second row and the fourth row (signals from the imaging pixels 310 indicated by black square marks in FIG. 10) are added and output to the output circuit 330.

As the transfer of the pixel signals at the imaging pixels 310 in the first row to the line memories 320 ends, the imaging pixels 310 in the first row are reset in response to the control signal ΦR1 generated by the reset circuit 506, and the subsequent charge storage starts at the imaging pixels 310 in the first row at the trailing edge of the control signal ΦR1. As the output circuit 330 ends the output of the pixel signals from the imaging pixels 310 in the first row, the imaging pixels 310 in the second row are selected by the control signal ΦS2 generated by the vertical scanning circuit 505 and the pixel signals from the selected imaging pixels 310 are output to the vertical signal lines 501. Subsequently, the pixel signals from the imaging pixels 310 in the second row are held, the imaging pixels 310 in the second row are reset, the pixel signals are output after addition, and next charge storage is started in a manner similar to that described above.

The focus detection pixels 313 and 314 in the third row are selected by the control signal ΦS3 generated by the vertical scanning circuit 505 and the pixel signals from the selected focus detection pixels 313 and 314 are output to the vertical signal lines 501. The pixel signals from the third row, having been output to the vertical signal lines 501, are temporarily held in the line memories 320 based upon the control signal ΦH1 generated in synchronization with the control signal ΦS3. The pixel signals from the focus detection pixels 313 and 314 in the third row held in the line memories 320 are output as follows. First, the pixel signals from the focus detection pixels 313 in the first row and the pixel signals from the focus detection pixels 313 in the third row are added to each other and the result is output from the output circuit 330 in response to the control signals ΦV1 and ΦV3 generated simultaneously from the horizontal scanning circuit 507. Subsequently, the pixel signals from the focus detection pixels 314 in the second row and the pixel signals from the focus detection pixels 314 in the fourth row are added to each other and the result is output from the output circuit 330 in response to the control signals ΦV2 and ΦV4 generated simultaneously from the horizontal scanning circuit 507.

Subsequently, similarly to the above, the pixel signals from the imaging pixels 310 in the fourth to sixth rows are held, the imaging pixels 310 are reset, the pixel signals from the imaging pixels 310 are output after addition, and next charge storage is started. When the output of the pixel signals from all the pixels ends, the operation is returned to the first row and the operation described above is repeated periodically.

As described above, the pixel signals from every another pixel in the same row are added before they can be output in the addition output mode, so that the pixel outputs from the two types of focus detection pixels do not mix with each other upon addition and the focus detection can be executed by using added signals of the focus detection pixels 313 and 314 and an image can be displayed in the viewfinder by using the added output of the imaging pixels 310. The operation of the addition output mode is performed when display of an image on the liquid crystal display and focus detection operation are performed concomitantly.

In FIGS. 12 and 13, the horizontal axis indicates time scale, which is shown such that the time intervals of output cycles from the first row through the sixth row in the ordinary operation mode and the addition output mode become the same. In actuality, however, the number of outputs of pixel signal in the addition output mode in one cycle is half the number of outputs of pixel signal in the ordinary operation mode. Therefore, if the image sensor is operated in such a manner that the number of outputs of pixel signal per unit time is the same, it can output images in a double cycle number for the same time period in the addition output mode as compared with the ordinary operation mode. This enables increasing speed of updating display and performing high quality image display.

FIGS. 14 through 17 each are flowchart illustrating the operation of the digital still camera (imaging apparatus) shown in FIG. 1. The operation is executed by the body drive controller 214 and started when the power of the camera is turned on in a step S100. In a step S110 after the power is turned on, the operation is jumped to a subroutine for image sensor addition read-out shown in FIG. 15.

Figure 15:
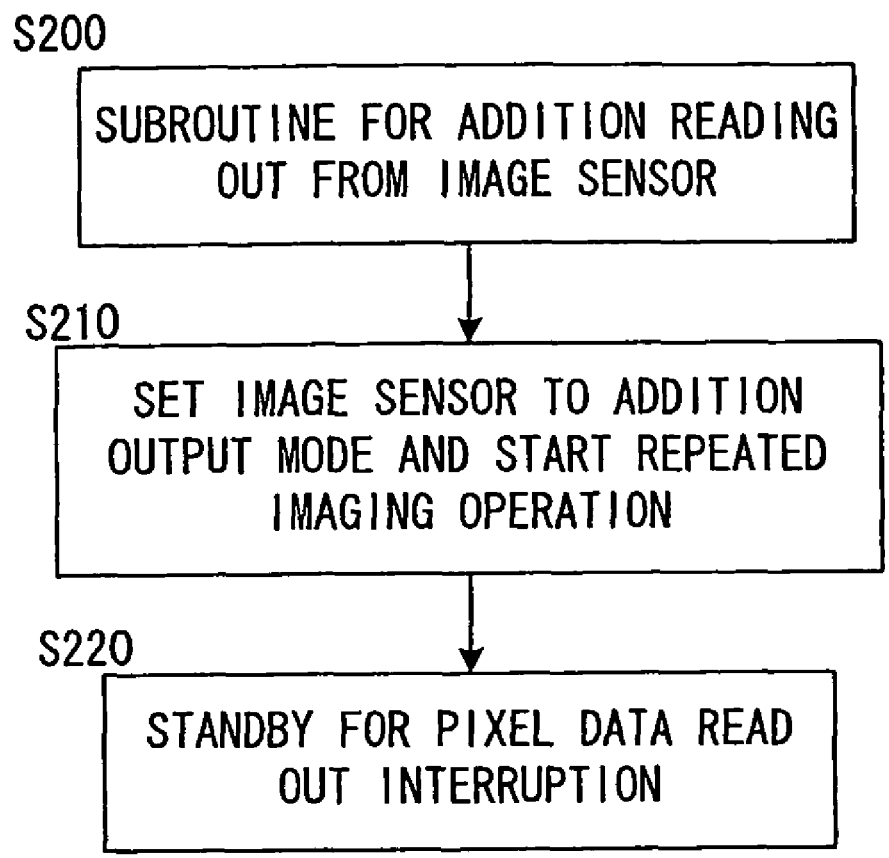

FIG. 15 is a flowchart of the operation of the subroutine for image sensor addition read-out. In a step S200, the image sensor addition read-out subroutine starts. In a subsequent step S210, the image sensor 212 is set to the addition output mode and repeated imaging operation (periodical operation) in this mode is started. In a step S220, occurrence of pixel data read-out interruption is on standby.

Figure 16:
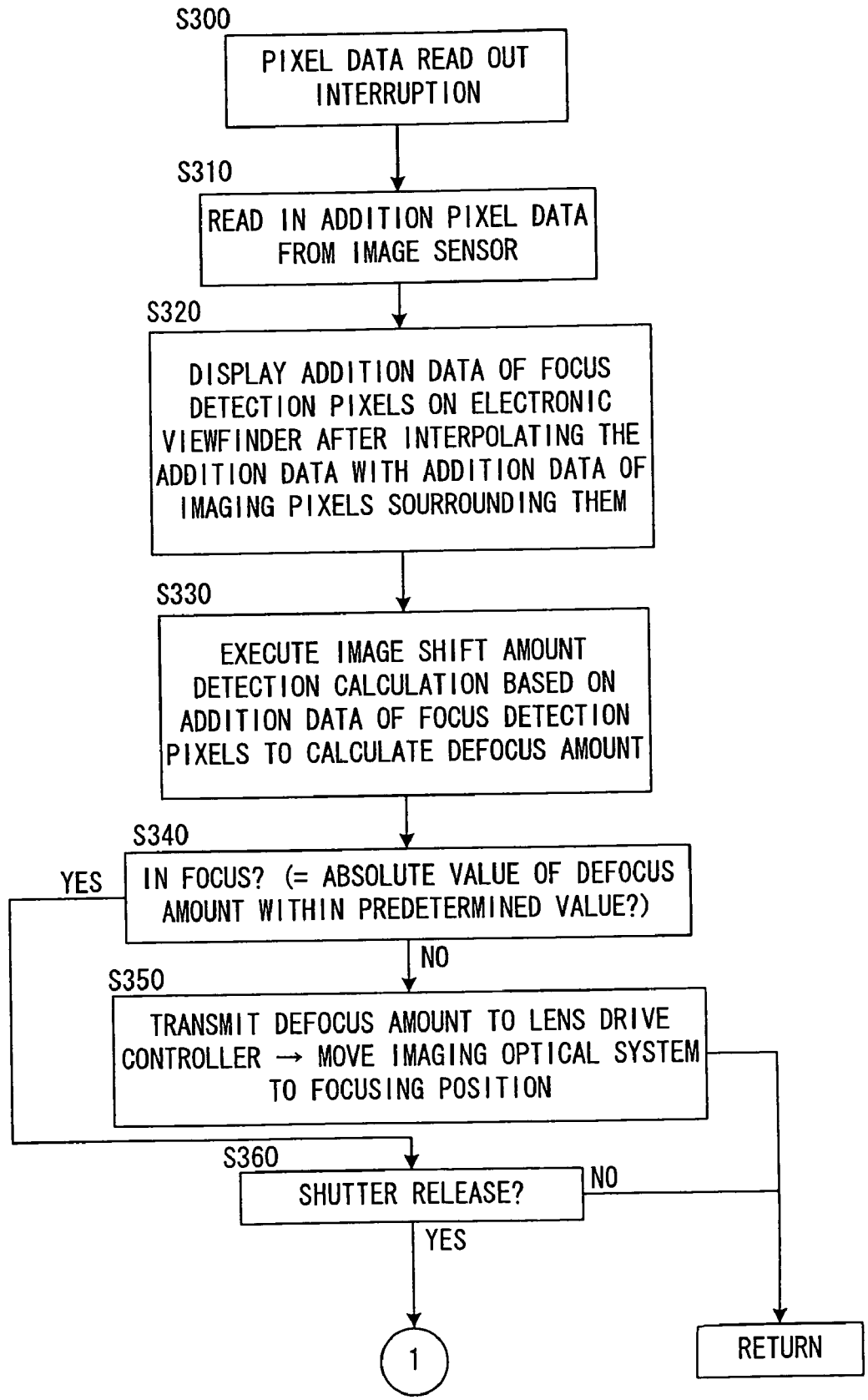

FIG. 16 is a flowchart illustrating pixel data read-out interruption processing. When the pixel data read-out interruption occurs in the step S220 in FIG. 15, the processing is started from a step S300 in FIG. 16. When the image sensor 212 outputs pixel signals, the image sensor 212 issues a notice of pixel data read-out interruption to the body drive controller 214 immediately before it outputs the first pixel signal. When the image sensor 212 executes a periodical operation, the interruption occurs periodically. The body drive controller 214 starts pixel data read-out interruption processing in response to the interruption. Note that the interruption processing in FIG. 16 starts only when the image sensor 212 operates periodically in the addition output mode.

In a step S310, the body drive controller 214 reads in the addition pixel data output from the image sensor 212. In a step S320, the body drive controller 214 interpolates the addition data of a focus detection pixel with the addition data of imaging pixels surrounding the focus detection pixel, generates an image based on the addition data of the imaging pixels and the interpolated data and displays the image on the liquid crystal display element 216 (live view display). In a step S330, the body drive controller 214 executes image shift detection calculation processing (correlation arithmetic processing) to be detailed later based on the data sequence of a pair of focus detection pixels in the focus detection area 101, that is, the addition data sequence of the focus detection pixels indicated with white circle marks and addition data sequence of the focus detection pixels indicated by black circle marks in FIG. 10 to calculate an image shift amount in the focus detection area 101, and converts the image shift amount into a defocus amount.

In a step S340, a decision is made as to whether or not the current condition is approximately in focus, i.e., whether or not the absolute value of the defocus amount having been calculated is equal to or less than a predetermined value. If it is decided that the current condition is not approximately in focus, the operation proceeds to a step S350 to transmit the calculated defocus amount to the lens drive controller 206 and the operation proceeds to a step S370. The lens drive controller 206 drives the focusing lens 210 at the exchangeable lens 202 to the focusing position based on the defocus amount. It is to be noted that the operation also branches to this step if focus detection is not possible to transmit a scan drive instruction to the lens drive controller 206. In response, the lens drive controller 206 drives the focusing lens 210 at the exchangeable lens 202 to scan between the infinity position and the close-up position. Subsequently, the operation proceeds to a step S370. In the step S370, the operation returns from the pixel data read-out interruption processing to the step S220 for the image sensor addition read-out subroutine shown in FIG. 15 and the operation waits in standby for the occurrence of pixel data read-out interruption in a next period.

If, on the other hand, it is decided that the current condition is approximately in focus, the operation proceeds to a step S360 to make a decision as to whether or not a shutter release has occurred in response to an operation of the shutter release button (not shown). If it is decided that a shutter release has not yet occurred, the operation proceeds to a step S370, in which the operation returns from the pixel data read-out interruption processing to the step S220 for the image sensor addition read-out subroutine shown in FIG. 15 and the operation waits in standby for the occurrence of pixel data read-out interruption in a next period. Note that the processing time for the steps S300 to S360 for the pixel data read-out interruption processing is shorter than the period of occurrence of the pixel data read-out interruption.

If it is decided that a shutter release has occurred, the body drive controller 214 executes the operation of release sequence shown in FIG. 17. In a step S400, the body drive controller 214 sets the image sensor 212 to the ordinary operation mode (non-addition output mode) and executes a single-shot imaging operation in this mode. In a step S410, the operation waits in standby for the occurrence of pixel data read-out interruption. In a step S420, the body drive controller

214 reads in the non-addition pixel data output from the image sensor 212 when the pixel data read-out interruption occurs.

In a step S430, the body drive controller 214 executes image shift detection calculation processing (correlation arithmetic processing) to be detailed later based on the data sequence of a pair of focus detection pixels in the focus detection area 101, that is, the addition data sequence of the focus detection pixels indicated with white circle marks and addition data sequence of the focus detection pixels indicated by black circle marks in FIG. 10 to calculate an image shift amount in the focus detection area 101, and converts the image shift amount into a defocus amount.

In a step S440, the body drive controller 214 transmits the calculated defocus amount to the lens drive control device 206 to drive the focusing lens 210 at the exchangeable lens 202 to the focusing position. It is to be noted that if focus detection is not possible, the operation proceeds to a step S460 directly. Here, the condition of being approximately in focus is achieved before the operation of the release by focus detection based on the addition data of the focus detection pixels and the focus adjustment. However, high precision focus detection based on the non-addition data of the focus detection pixels (which increases image shift detection accuracy-due to the addition data) may be executed again to execute focus adjustment, thereby increasing the accuracy of focusing.

In a step S450, the operation waits in standby for the end of lens drive. Since the lens has been approximately in focus from the beginning, time required for focusing can be shortened. Subsequently, in a step S460, the body drive controller 214 sets the image sensor 212 to the ordinary operation mode (non-addition output mode), executes a single-shot imaging operation in this mode. In a step S470, the operation waits in standby for the occurrence of pixel data read-out interruption. In a subsequent step S480, the body drive controller 214 reads in the non-addition pixel data output from the image sensor 212 when the pixel data read-out interruption occurs.

In a step S490, the body drive controller 214 interpolates the non-addition data of a focus detection pixel with the non-addition data of imaging pixels surrounding the focus detection pixel. In a step S500, the body drive controller 214 stores the addition data of the imaging pixels and the interpolated data as image data in the memory card 219. In a step S510, the operation jumps to the image sensor addition read-out subroutine shown in FIG. 15 and the body drive controller 214 sets the image sensor 212 again to the addition output mode and starts repeated imaging operation in this mode.

Next, the image shift detection arithmetic processing (correlation calculation processing) executed in the step S330 in FIG. 16 and the step S430 in FIG. 17 is explained in detail. Since an imbalance may have occurred with regard to the quantities of light in the pair of images detected via the focus detection pixels due to vignetting of the pupil for focus detection by the aperture opening of the lens, a specific type of correlation calculation which assures a satisfactory level of image shift detection accuracy even in the event of an imbalance in the light quantities needs to be executed.

The correlation calculation expressed in expression (1) is executed on a pair of data strings $(A1_1 \sim A1_M, A2_1, \ldots, A2_M;$ M indicates the number of sets of data) read out from the focus detection pixel row so as to calculate correlation quantity C(k). Note that $A1_1, \ldots, A1_M$, and $A2_1, \ldots, A2_M$ indicate addition data in the addition read-out mode and non-addition data in the ordinary operation mode.

$$C(k) = \Sigma |A1_n * A2_{n+1+k} - A2_{n+k} * A1_{n+1}| \quad (1)$$

In expression (1), the E operation is cumulatively executed with regard to n and the range assumed for n is limited to the range over which the data $A1_n, A1_{n+1}, A2_{n+k}$ and $A2_{n+1+k}$ exist in correspondence to the shift quantity k. In addition, the shift quantity k is an integer which represents a relative shift quantity assuming a value taken in units matching the data interval with which the data in the data strings are sampled.

Figure 18A:
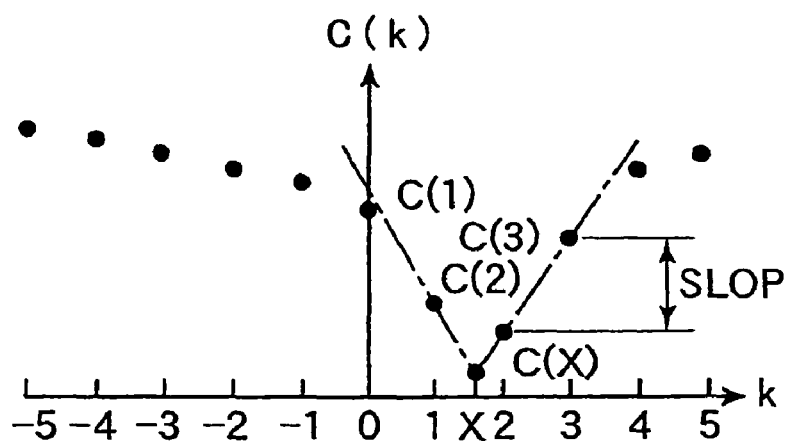
FIGS. 18A, 18B and 18C are diagrams illustrating reliability of results of focus detection.

The results of the arithmetic operation executed as expressed in expression (1) may indicate as shown in FIG. 18A that the correlation quantity C(k) assumes the minimum value (the smaller the value, the higher the correlation level) at the shift quantity at which the pair of sets of data achieve a high level of correlation (when $k = k_j = 2$ in FIG. 18A). The shift quantity x, which gives the minimum value C(x) in the continuous correlation quantity graph, is determined by adopting a three-point interpolation method expressed in (2) through (5) below.

$$x = k_j + D/\text{SLOP} \quad (2)$$

$$C(x) = C(k_j) - |D| \quad (3)$$

$$D = \{C(k_j - 1) - C(k_j + 1)\}/2 \quad (4)$$

$$\text{SLOP} = \text{MAX}\{C(k_j + 1) - C(k_j), C(k_j - 1) - C(k_j)\} \quad (5)$$

Figure 18B:
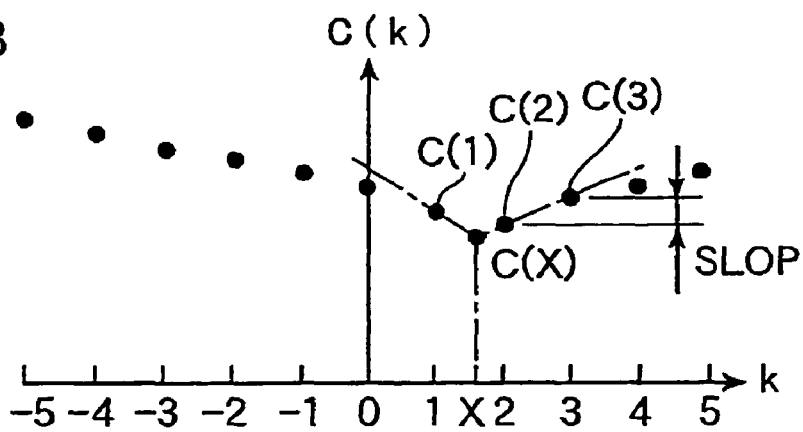

The judgment as to whether or not the shift quantity x calculated as expressed in expression (2) is reliable is made as follows. As shown in FIG. 18B, the interpolated minimum value C(x) of the correlation quantity increases when the level of correlation between the pair of sets of data is low. Accordingly, if C(x) is equal to or greater than a predetermined threshold value, the shift quantity is judged to be less reliable and the calculated shift quantity x is canceled. Alternatively, C(x) may be standardized with regard to the data contrast, and in such a case, if the value obtained by dividing C(x) by SLOP indicating a value in proportion to the contrast is equal to or greater than a predetermined value, the calculated shift quantity should be judged to be not reliable and accordingly, the calculated shift quantity x is canceled. As a further alternative, if SLOP indicating the value in proportion to the contrast is equal to or less than a predetermined value, the subject should be judged to be a low-contrast subject and, accordingly, the reliability of the calculated shift quantity should be judged to be low and accordingly, the calculated shift quantity x is canceled.

Figure 18C:
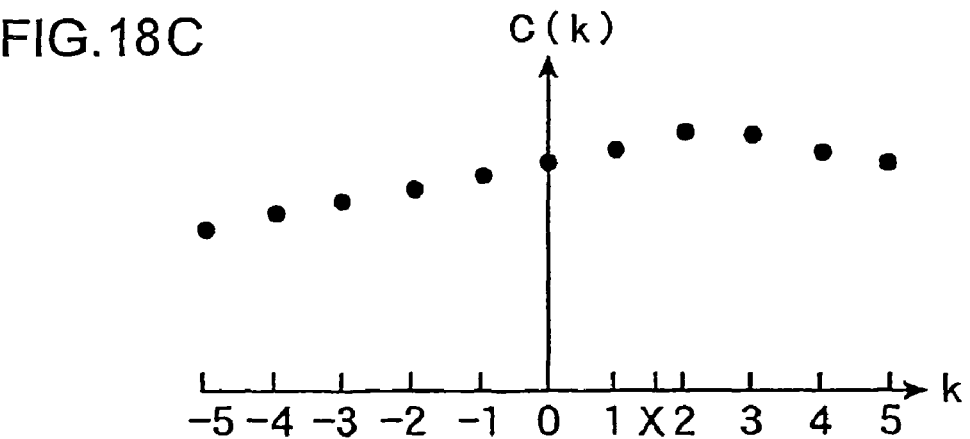

If the level of correlation between the pair of sets of data is low and the correlation quantity C(k) does not dip at all over the shift range $k_{min}$ to $k_{max}$ as shown in FIG. 18C, the minimum value C(x) cannot be determined. In this case, it is decided that focus detection cannot be executed.

Note that the correlation calculation expression is not limited to the above-mentioned expression (1). Any correlation calculation expression may be used as far as it is of the type that can assure image shift detection accuracy even when there is imbalance in light quantity between a pair of images detected via the focus detection pixels.

If the shift quantity x having been calculated is judged to be reliable, the shift quantity is then converted to an image shift amount shft as expressed in (6) below.

$$\text{shft} = PY \cdot X \quad (6)$$

In expression (6), PY represents the detection pitch (the pitch at which the focus detection pixels are arrayed). The pitches PY differ between the addition output mode and the ordinary operation mode even they are for the Same types of focus detection pixels. The shift amount shft calculated according to the expression (6) is multiplied by a predetermined conversion coefficient k and is thus converted to a defocus amount def as expressed in expression (7).

$$def = k \cdot shift \qquad (7)$$

Second Embodiment

According to the First Embodiment, as shown in FIG. 3, the two types of focus detection pixels 313 and 314 are disposed alternately along the direction of row. The pixel addition operation is executed by adding signals from two pixels, i.e., every other pixels s in the same row so as to prevent mixing of signals from the two types of the focus detection pixels 313 and 314 at the time of pixel addition, thus enabling the addition pixel signals to be used in focus detection calculation. The positional relationship between the pattern in which the focus detection pixels are disposed and the plurality of pixels used for the addition of pixels (addition pattern) is not limited to the one described in the First Embodiment and various modifications can be conceived.

Figure 19:
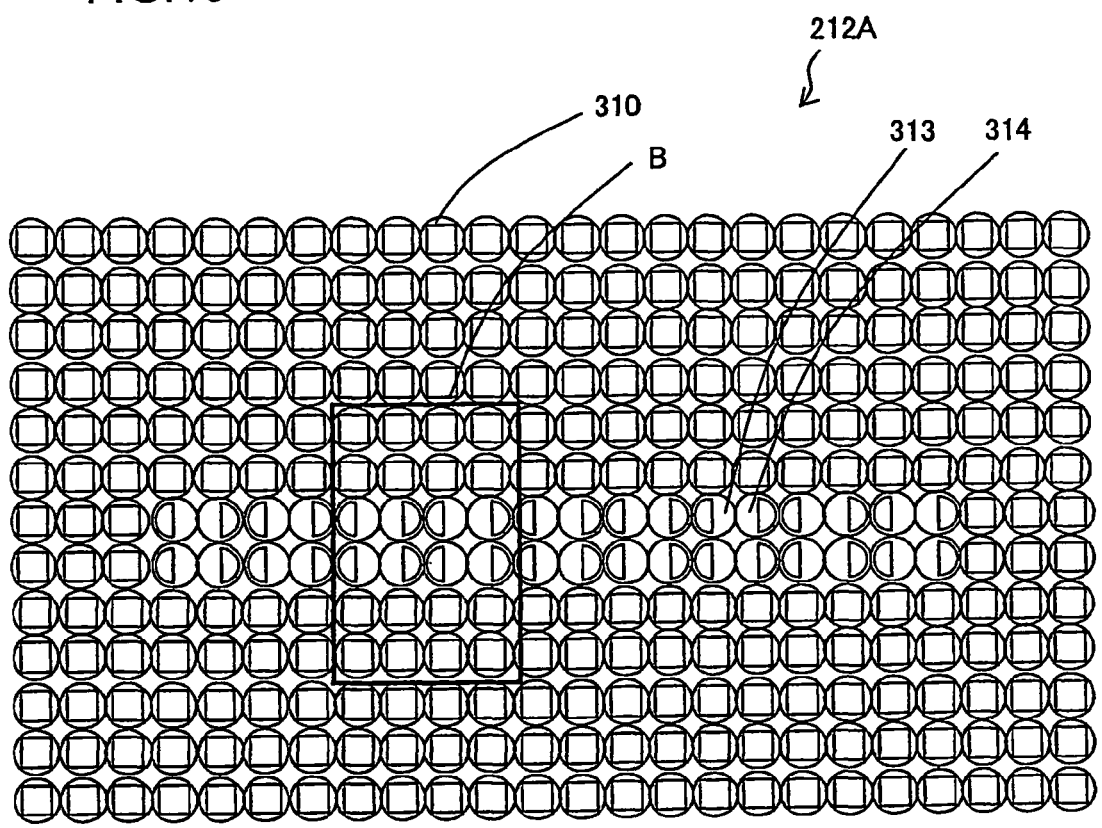
FIG. 19 is a detailed front view of the structure of an image sensor achieved in a variation.

FIG. 19 is a front view showing in detail the structure adopted in an image sensor 212A achieved in a variation. It is to be noted that FIG. 19 shows the vicinity of the focus detection area 100 set on the image sensor 212A. The image sensor 212A includes the imaging pixels 310 and the focus detection pixels 313 and 314. The imaging pixels 310 are disposed in a two-dimensional square array along the horizontal and vertical directions while the focus detection pixels 313 and 314 disposed along the horizontal direction in two rows adjacent to each other.

Figure 20:
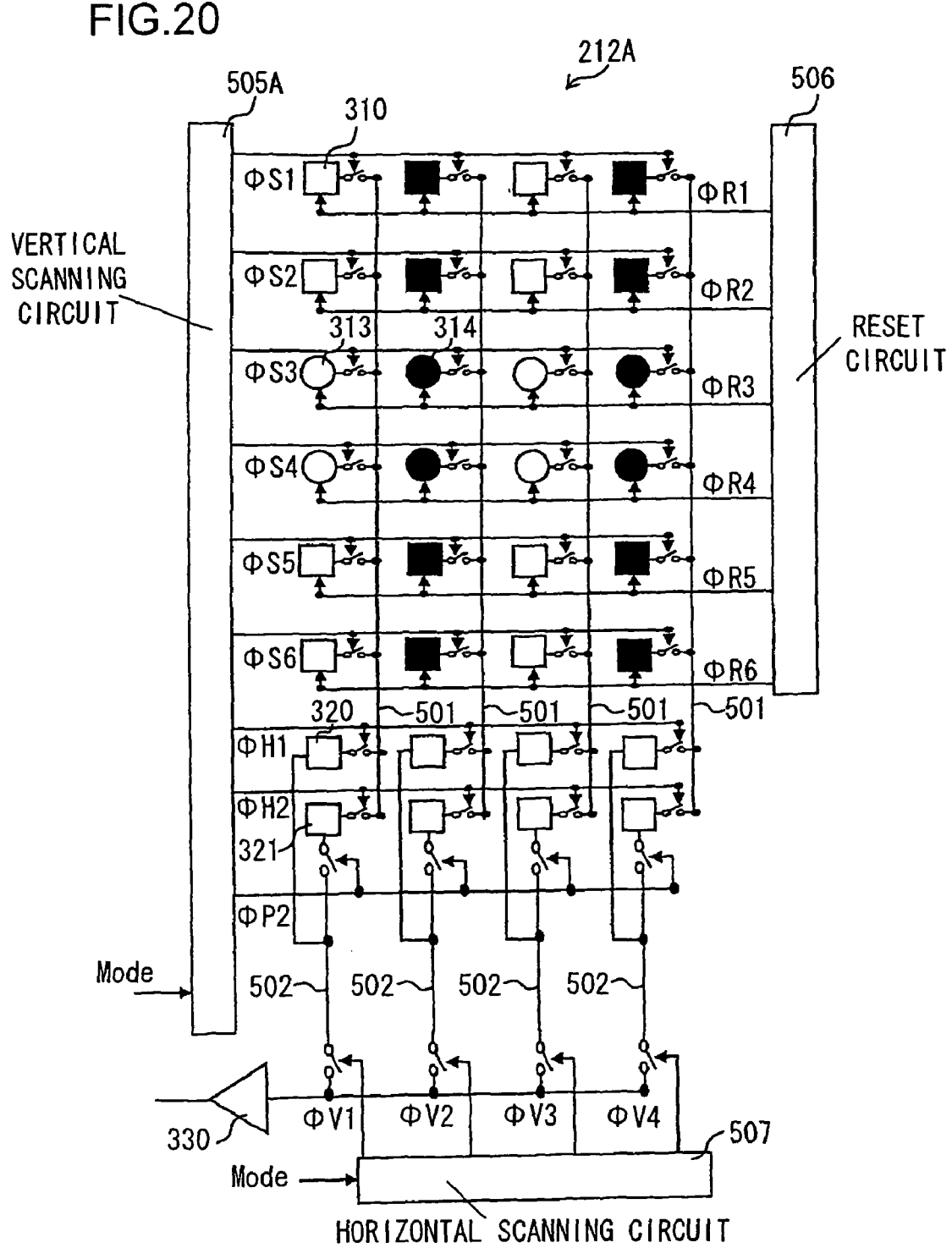
FIG. 20 is a conceptual diagram of the circuit structure adopted in the image sensor in the variation shown in FIG. 19.

FIG. 20 is a conceptual diagram showing the circuit structure adopted in the variation of the image sensor 212A shown in FIG. 19. The image sensor 212A in the conceptual diagram presented in FIG. 19 is constituted as a CMOS image sensor. To make the explanation simpler, the circuit structure of the image sensor 212A in FIG. 20 is explained to be in a layout of four pixels along the horizontal direction and six pixels along the vertical direction corresponding to the rectangular area B shown in FIG. 19. In each of the rows except for the third and fourth rows, imaging pixels 310 (indicated by white and black square marks in FIG. 20) are disposed and the focus detection pixels 313 (indicated by white circle marks in FIG. 20) and the focus detection pixels 314 (indicated by black circle marks in FIG. 20) are alternately disposed in the third and fourth rows.

In FIG. 20, the line memories 320 and 321 each include a buffer that temporarily holds pixel signals for two rows. In the buffer, the pixel signals from the pixels in a given row are temporarily held, after the pixel signals output to vertical signal lines 501 are latched in response to control signals ΦH1 and ΦH2 generated from a vertical scanning circuit 505A. The outputs of the line memories 320 are directly connected to the signal lines 502 and the outputs of the line memories 321 are selectively connected to the signal lines 502 in response to the control signal ΦP2.

Electrical charge storage at the imaging pixels 310 and at the focus detection pixels 313 and 314 is controlled in units of the individual rows independently of one another based upon control signals (ΦR1, ..., ΦR6) generated by a reset circuit 506. The pixel signals output from the imaging pixels 310 and the focus detection pixels 313 and 314 are controlled in units of the individual rows independently of one another based upon control signals (ΦS1, ..., ΦS6) generated by the vertical scanning circuit 505A. The pixel signal at a pixel selected based upon a control signal is output to the corresponding vertical signal line 501. The pixel signals output to the signal line 502 are sequentially transferred to the output circuit 330 in response to control signals (ΦV1, ... ΦV4) generated by the horizontal scanning circuit 507 and the transferred signals are then amplified to a specific preset degree at the output circuit 330 from which they are output to the outside.

Mode signals for switching the operation modes are supplied to the vertical scanning circuit 505A and the horizontal scanning circuit 507 from the outside to change generation patterns of the control signals (ΦH1, ΦH2, ΦP2, ΦV1, ..., ΦV4) in response to the signal level (high level or low level) of the Mode signals, thus switching the modes between an ordinary pixel signal output operation and an operation in which the pixel signals are added and output.

When the Mode signal of a low level is supplied from the outside, the ordinary operation mode (non-addition output mode) is executed. On this occasion, the control signals ΦH2 and ΦP2 are always at the low level and the signals from the pixel pixels in the first to sixth rows each are output without addition according to a timing chart similar to the timing chart shown in FIG. 12.

Figure 21:
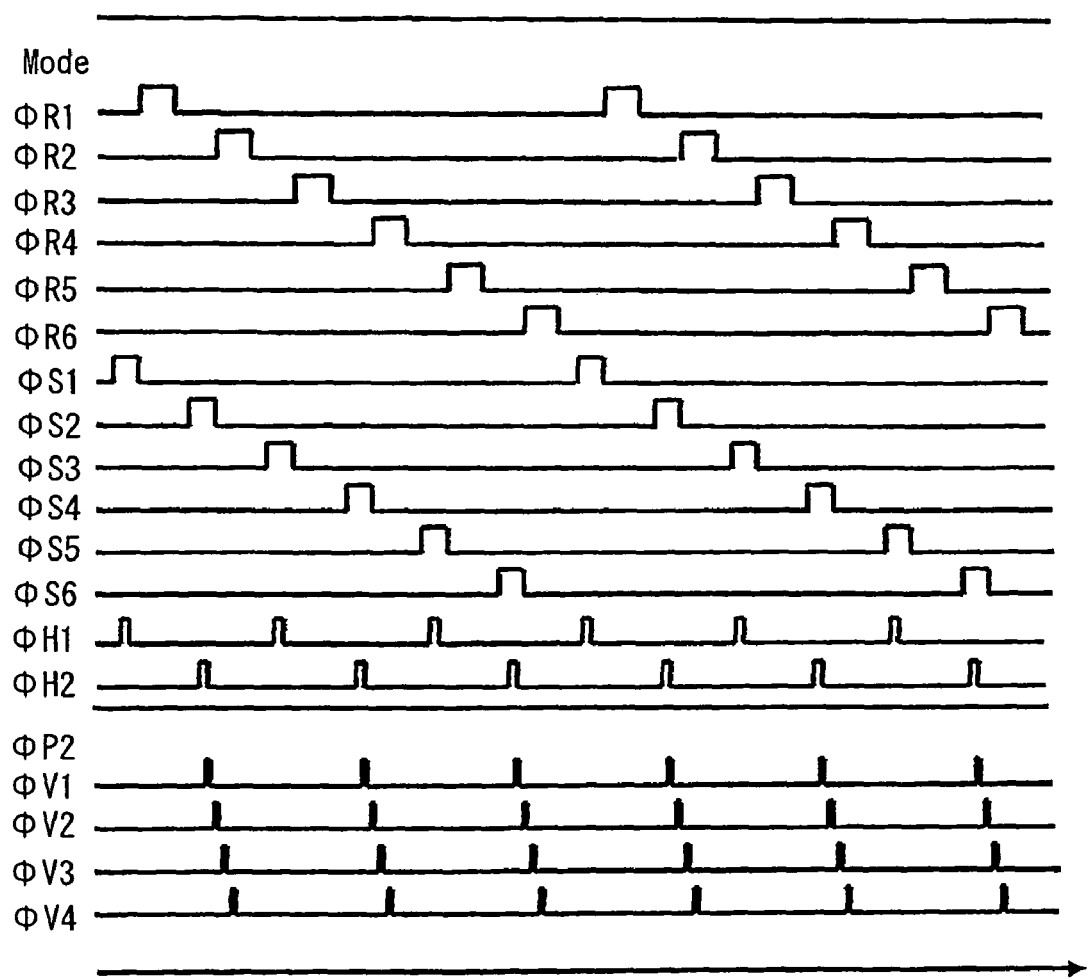
FIG. 21 is an operation timing chart pertaining to the image sensor in an addition output mode.

FIG. 21 presents a timing chart of the operation executed in the image sensor 212A shown in FIGS. 19 and 20 in an addition output mode. When the external signal Mode is at the high level, the addition output mode is executed. In this addition output mode, the control signal ΦP2 is always at the high level and the outputs of the line memories 321 are always connected to the signal lines 502. The imaging pixels 310 in the first row are selected by the control signal ΦS1 generated by the vertical scanning circuit 505A and the pixel signals from the selected imaging pixels 310 are output to the vertical signal lines 501.

The pixel signals from the imaging pixels in the first row, having been output to the vertical signal lines 501, are temporarily held in the line memories 320 based upon the control signal ΦH1 generated in synchronization with the control signal ΦS1. Then, the imaging pixels 310 in the second row are selected by the control signal ΦS2 generated by the vertical scanning circuit 505A and the pixel signals from the selected imaging pixels 310 are output to the vertical signal lines 501. The pixel signals from the imaging pixels 310 in the second row, having been output to the vertical signal lines 501, are temporarily held in the line memories 321 based upon the control signal ΦH2 generated in synchronization with the control signal ΦS2.

Then, the pixel signals of the imaging pixels in the first row held in the line memories 320 and the pixel signals of the imaging pixels in the second row held in the line memories 321 are added to each other via the signal lines 502 and transferred to the output circuit 330 in response to the control signals ΦV1 to ΦV4 generated sequentially from the horizontal scanning circuit 507. They are then amplified to the specific preset extent at the output circuit 330 and output to the outside.

As a result, among the pixel signals from the imaging pixels 310 in the first row held in the line memories 320 and the pixel signals from the imaging pixels 310 in the second row held in the line memories 321, the pixel signals of the imaging pixels indicated by white square marks in FIG. 20 are added to each other at the timing of the control signals ΦV1 and ΦV3 while the pixel signals of the imaging pixels 310 indicated by the black square marks in FIG. 20 are added to each other at the timing of the control signals ΦV2 and ΦV4. The added pixel signals are sequentially output from the output circuit 330.

As the transfer of the pixel signals at the imaging pixels 310 in the first row to the line memories 320 ends, the imaging pixels 310 in the first row are reset in response to the control signal ΦR1 generated by the reset circuit 506, and the subsequent charge storage starts at the imaging pixels 310 in the first row at the trailing edge of the control signal ΦR1. As the transfer of the pixel signals at the imaging pixels 310 in the second row to the line memories 321 ends, the imaging pixels 310 in the second row are reset by the control signal ΦR2 generated by the reset circuit 506 and the subsequent charge storage starts at the imaging pixels 310 in the second row at the trailing edge of the control signal ΦR2.

As the output of the added signals of the pixel signals from the imaging pixels 310 in the first and second rows from the output circuit 330 ends, the focus detection pixels 313 and 314 in the third row are selected by the control signal ΦS3 generated by the vertical scanning circuit 505A and the pixel signals from the selected focus detection pixels 313 and 314 are output to the vertical signal lines 501. The pixel signals from the third row, having been output to the vertical signal lines 501, are temporarily held in the line memories 320 based upon the control signal ΦH1 generated in synchronization with the control signal ΦS3.

Subsequently, the focus detection pixels 313 and 314 in the fourth row are selected by the control signal ΦS4 generated by the vertical scanning circuit 505A and the pixel signals from the selected focus detection pixels 313 and 314 are output to the vertical signal lines 501. The pixel signals from the fourth row, having been output to the vertical signal lines 501, are temporarily held in the line memories 321 based upon the control signal ΦH2 generated in synchronization with the control signal ΦS4.

Then, the pixel signals from the focus detection pixels 313 and 314 in the third row held in the line memories 320 and the pixel signals from the focus detection pixels 313 and 314 in the fourth row held in the line memories 321 are added to each other via the signal lines 502 and transferred to the output circuit 330 in response to the control signals ΦV1 to ΦV4 generated sequentially from the horizontal scanning circuit 507. They are then amplified to the specific preset extent at the output circuit 330 and output to the outside.

As a result, among the pixel signals from the focus detection pixels 313 and 314 in the third row held in the line memories 320 and the pixel signals from the focus detection pixels 313 and 314 in the fourth row held in the line memories 321, the pixel signals of the focus detection pixels indicated by white square marks in FIG. 20 are added to each other at the timing of the control signals ΦV1 and ΦV3 while the pixel signals of the focus detection pixels 313 and 314 indicated by the black square marks in FIG. 20 are added to each other at the timing of the control signals ΦV2 and ΦV4. The added pixel signals are sequentially output from the output circuit 330.

As the transfer of the focus detection signals at the focus detection pixels 313 and 314 in the third row to the line memories 320 ends, the focus detection pixels 313 and 314 in the third row are reset in response to the control signal ΦR3 generated by the reset circuit 506, and the subsequent charge storage starts at the focus detection pixels 313 and 314 in the third row at the trailing edge of the control signal ΦR3. Similarly, as the transfer of the focus detection signals 313 and 314 at the focus detection pixels 313 and 314 in the fourth row to the line memories 321 ends, the focus detection pixels 313 and 314 in the fourth row are reset by the control signal ΦR4 generated by the reset circuit 506 and the subsequent charge storage starts at the focus detection pixels 313 and 314 in the fourth row at the trailing edge of the control signal ΦR4.

Subsequently, similarly to the above, the pixel signals from the imaging pixels 310 in the fifth and sixth rows are held, the imaging pixels 310 are reset, the pixel signals from the imaging pixels 310 are output after addition, and next charge storage is started. When output of the pixel signals from all the pixels ends, the operation is returned to the first row and the operation described above is repeated periodically.

As described above, pixel signals from pixels in adjacent rows and in the same column are added before they can be output in the addition output mode. Therefore, the pixel signals from the imaging pixels 310 do not mix with the pixel signals from the focus detection pixels 313 and 314 or the pixel signals from the two types of focus detection pixels 313 and 314 do not mix with each other at the time of addition, so that focus detection can be executed by using the added signals from the focus detection pixels 313 and 314 and also an image can be displayed on the liquid crystal display element 216 by using the outputs from the imaging pixels 310 being added to each other.

Figure 22:
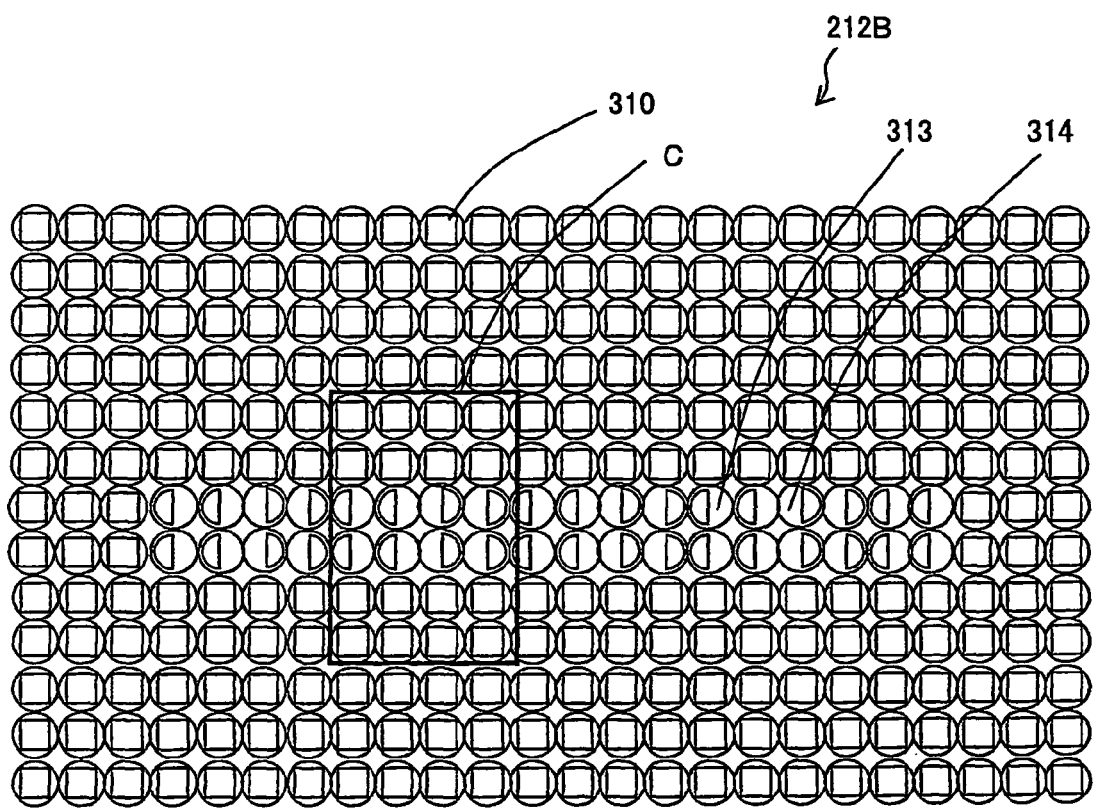
FIG. 22 is a detailed front view of the structure of an image sensor achieved in another variation.

FIG. 22 is a front view showing in detail the structure adopted in an image sensor 212B achieved in another variation. It is to be noted that FIG. 22 shows the vicinity of the focus detection area 100 set on the image sensor 212B. The image sensor 212B includes the imaging pixels 310 and the focus detection pixels 313 and 314. The imaging pixels 310 are disposed in a two-dimensional square array along the horizontal and vertical directions while the focus detection pixels 313 and 314 are disposed such that two each of them are disposed alternately along the horizontal direction in two rows adjacent to each other.

Figure 23:
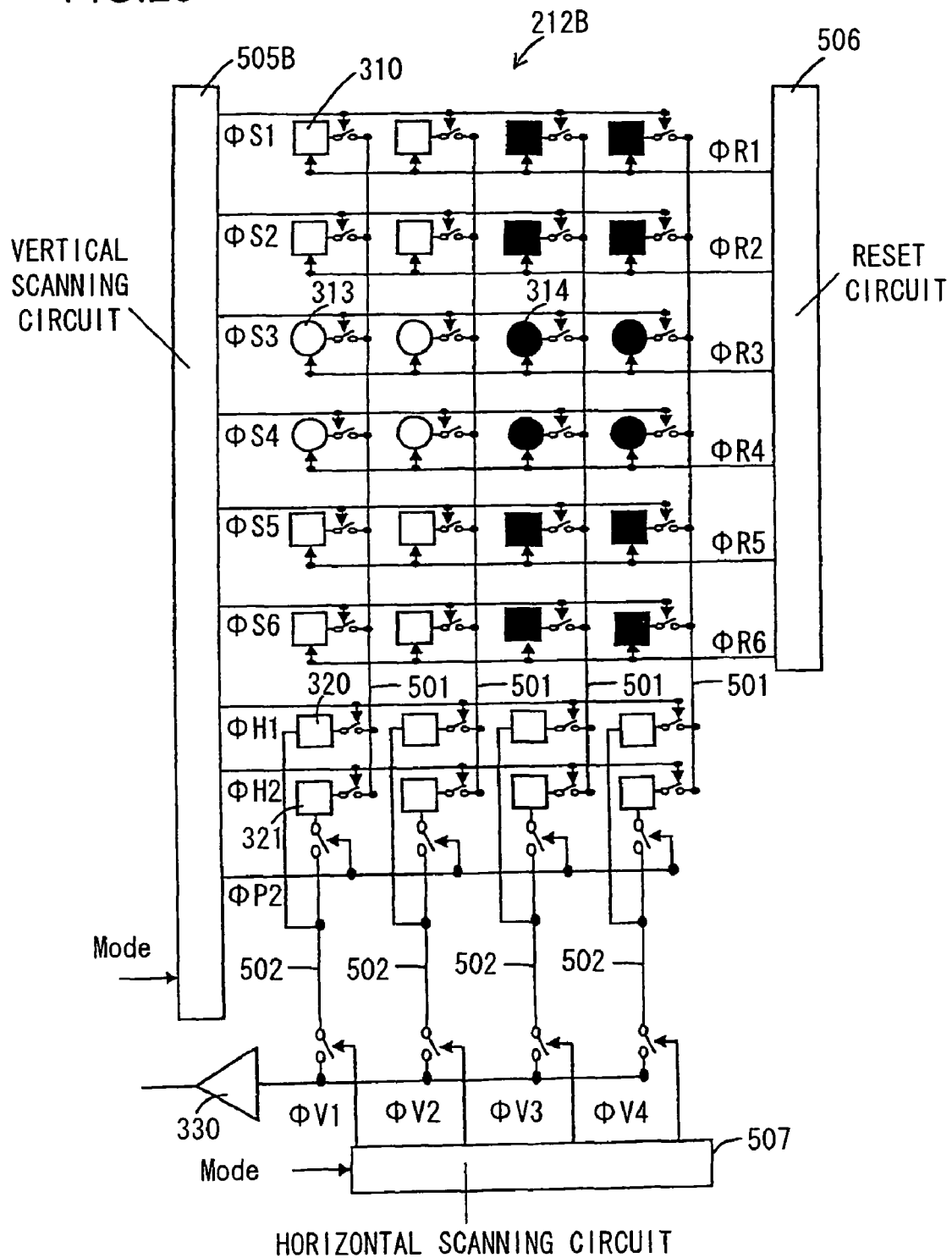
FIG. 23 is a conceptual diagram of the circuit structure adopted in the image sensor in the variation shown in FIG. 22.

FIG. 23 is a conceptual diagram showing the circuit structure adopted in the variation of the image sensor 212B shown in FIG. 22. The circuit structure of the image sensor 212B shown in FIG. 22 has the same structure as the circuit structure of the image sensor 212B shown in FIG. 20 except for the arrangements of the focus detection pixels 313 and 314, which are different from each other. The image sensor 212B in the conceptual diagram presented in FIG. 23 is constituted as a CMOS image sensor. To make the explanation simpler, the circuit structure of the image sensor 212B in FIG. 23 is explained to be in a layout of four pixels along the horizontal direction and six pixels along the vertical direction corresponding to the rectangular area C shown in FIG. 22. In each of the rows except for the third and fourth rows, the imaging pixels 310 (indicated by white and black square marks in FIG. 23) are disposed. Two of the focus detection pixels 313 (indicated by white circle marks in FIG. 23) are continuously disposed and thereafter two focus detection pixels 314 (indicated by black circle marks in FIG. 23) are continuously disposed in each of the third and fourth rows.

In FIG. 23, the line memories 320 and 321 each include a buffer that temporarily holds pixel signals for two rows. In the buffer, the pixel signals from the pixels in a given row are temporarily held, after the pixel signals output to vertical signal lines 501 are latched in response to control signals ΦHL and ΦH2 generated from a vertical scanning circuit 505B. The outputs of the line memories 320 are directly connected to the signal lines 502 and the outputs of the line memories 321 are selectively connected to the signal lines 502 in response to the control signal ΦP2.

Electrical charge storage at the imaging pixels 310 and at the focus detection pixels 313 and 314 is controlled in units of the individual rows independently of one another based upon control signals (ΦR1, ..., ΦR6) generated by a reset circuit 506. The pixel signals output from the imaging pixels 310 and the focus detection pixels 313 and 314 are controlled in units of the individual rows independently of one another based upon control signals (ΦS1, ..., ΦS6) generated by the vertical scanning circuit 505B. The pixel signal at a pixel selected based upon a control signal is output to the corresponding vertical signal line 501. The pixel signals output to the signal lines 502 are sequentially transferred to the output circuit 330 in response to control signals (ΦV1, ..., ΦV4) generated by the horizontal scanning circuit 507 and the transferred signals are then amplified to a specific preset degree at the output circuit 330 from which they are output to the outside.

Mode signals for switching the operation modes are supplied to the vertical scanning circuit 505B and the horizontal scanning circuit 507 from the outside to change generation patterns of the control signals (ΦH1, ΦH2, ΦP2, ΦV1, ..., ΦV4) in response to the signal level (high level or low level) of the Mode signals, thus switching the modes between an ordinary pixel signal output operation and an operation in which the pixel signals are added and output.

When the Mode signal of a low level is supplied from the outside, the ordinary operation mode (non-addition output mode) is executed. In this mode, the control signals ΦH2 and ΦP2 each are always on a low level and the signals from the pixels in the first to sixth rows each are output without addition according to a timing chart similar to the timing chart shown in FIG. 12.

Figure 24:
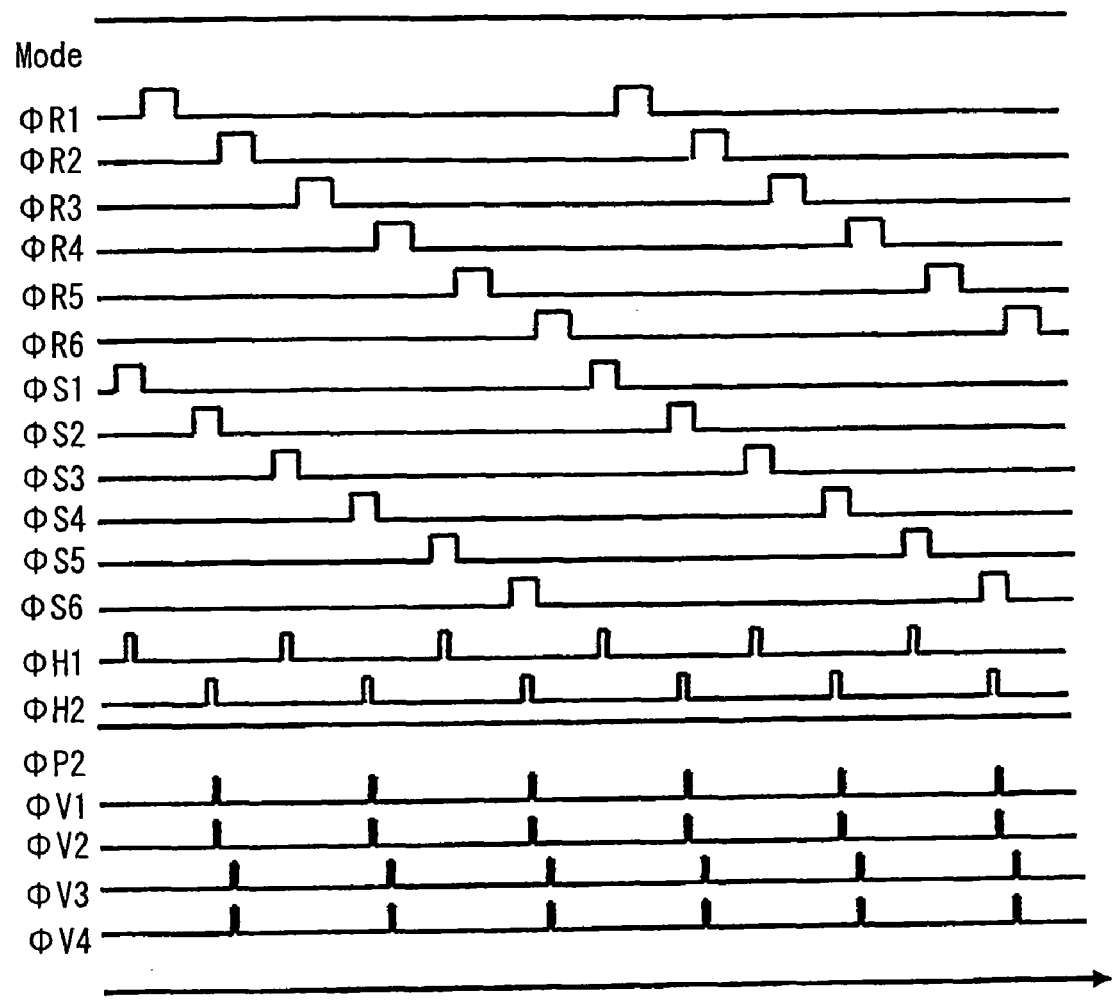
FIG. 24 is an operation timing chart pertaining to the image sensor shown in FIGS. 22 and 23 in an addition output mode.

FIG. 24 presents a timing chart of the operation executed in the image sensors 212B shown in FIGS. 22 and 23 in an addition output mode. When the external signal Mode is at the high level, the addition output mode is set. In this addition output mode, the four imaging pixels 310 disposed adjacent to each other indicated by the white square marks, the four imaging pixels 310 disposed adjacent to each other and indicated by the black square marks, the four imaging pixels 310 disposed adjacent to each other indicated by the white circle marks, and the four imaging pixels 310 disposed adjacent to each other indicated by the black circle marks in FIG. 23 are added to each others respectively.

The control signals ΦP2 are always at a high level and the outputs from the line memories 321 are always connected to the signal lines 502. The imaging pixels 310 in the first row are selected by the control signal ΦS1 generated by the vertical scanning circuit 505B and the pixels signals from the selected imaging pixels 310 are output to the vertical signal lines 501. The pixel signals from the imaging pixels 310 in the first row, having been output to the vertical signal lines 501, are temporarily held in the line memories 320 based upon the control signal ΦH1 generated in synchronization with the control signal ΦS1.

Then, the pixel signals of the imaging pixels 310 in the second row are selected by the control signal ΦS2 generated by the vertical scanning circuit 505B and the pixel signals from the selected imaging pixels 310 are output via the vertical signal lines 501. The pixel signals from the imaging pixels 310 in the second row, having been output to the vertical signal lines 501 in response to the control signal ΦH2 generated in synchronization with the control signal ΦS2 are temporarily held in the line memories 321.

Then, the pixel signals from the imaging pixels 310 in the first row held in the line memories 320 and the pixel signals from the imaging pixels 310 in the second row held in the line memories 321 are added via the signal lines 502 and are transferred to the output circuit 330 in response to the control signals ΦV1 through ΦV4 generated in a predetermined pattern by the horizontal scanning circuit 507. They are then amplified to the specific preset extent at the output circuit 330 and output to the outside. In the addition output mode, first the control signals ΦV1 and ΦV2 are generated simultaneously and subsequently the control signals ΦV3 and ΦV4 are generated simultaneously.

As a result, first the pixel signals from the imaging pixels 310 at the first and second columns in the first row held in the line memories 320 and the pixel signals from the imaging pixels 310 at the first and second columns in the first row held in the line memories 321 (i.e., the pixel signals from the four imaging pixels indicated in FIG. 23 by the white square marks disposed adjacent to each other) are added to each other at the timing of the control signals ΦV1 and ΦV2 generated simultaneously and are output from the output circuit 330.

Thereafter, the pixel signals from the imaging pixels 310 at the third and fourth columns in the first row held in the line memories 320 and the pixel signals from the imaging pixels 310 at the third and fourth columns in the second row held in the line memories 321 (i.e., the pixel signals from the four imaging pixels indicated by the black square marks in FIG. 23 disposed adjacent to each other), respectively, are added to each other at the timing of the control signals ΦV3 and ΦV4, respectively, generated simultaneously and are output from the output circuit 330.

As the transfer of the pixel signals at the imaging pixels 310 in the first row to the line memories 320 ends, the imaging pixels 310 in the first row are reset in response to the control signal ΦR1 generated by the reset circuit 506, and the subsequent charge storage starts at the imaging pixels 310 in the first row at the trailing edge of the control signal ΦR1. As the transfer of the pixel signals at the imaging pixels 310 in the second row to the line memories 321 ends, the imaging pixels 310 in the second row are reset by the control signal ΦR2 generated by the reset circuit 506 and the subsequent charge storage starts at the imaging pixels 310 in the second row at the trailing edge of the control signal ΦR2.

As the output of the added signals of the pixel signals from the imaging pixels 310 in the first and second rows ends, the focus detection pixels 313 and 314 in the third row are selected by the control signal ΦS3 generated by the vertical scanning circuit 505B and the pixel signals from the selected focus detection pixels 313 and 314 are output to the vertical signal lines 501. The pixel signals from the focus detection pixels 313 and 314 in the third row, having been output to the vertical signal lines 501, are temporarily held in the line memories 320 based upon the control signal ΦH1 generated in synchronization with the control signal ΦS3.

Similarly, the focus detection pixels 313 and 314 in the fourth row are selected by the control signal ΦS4 generated by the vertical scanning circuit 505B and the pixel signals from the selected focus detection pixels 313 and 314 are output to the vertical signal lines 501. The pixel signals from the fourth row, having been output to the vertical signal lines 501, are temporarily held in the line memories 321 based upon the control signal ΦH2 generated in synchronization with the control signal ΦS4.

Then, the pixel signals of the focus detection pixels 313 and 314 in the third row held in the line memories 320 and the pixel signals of the focus detection pixels 313 and 314 in the fourth row held in the line memories 321 are added to each other via the signal lines 502 and transferred to the output circuit 330 in response to the control signals ΦV1 through ΦV4 generated in a predetermined pattern by the horizontal scanning circuit 507. They are then amplified to the specific preset extent at the output circuit 330 and output to the outside. In the addition output mode, first the control signals ΦV1 and ΦV2 are generated simultaneously and subsequently the control signals ΦV3 and ΦV4 are generated simultaneously.

As a result, first the pixel signals from the focus detection pixels 313 at the first and second columns in the third row held in the line memories 320 and the pixel signals from the focus detection pixels 313 at the first and second columns in the fourth row held in the line memories 321 (i.e., the pixel signals from the four focus detection pixels 313 indicated in FIG. 23 by the white square marks disposed adjacent to each other) are added to each other at the timing of the control signals ΦV1 and ΦV2 generated simultaneously and are output from the output circuit 330. Thereafter, the pixel signals from the focus detection pixels 314 at the third and fourth columns in the third row held in the line memories 320 and the pixel signals from the focus detection pixels 314 at the third and fourth columns in the fourth row held in the line memories 321 (i.e., the pixel signals from the four focus detection pixels 314 indicated by the black square marks in FIG. 23 disposed adjacent to each other) are added to each other at the timing of the control signals ΦV3 and ΦV4 generated simultaneously and are output from the output circuit 330.

As the transfer of the pixel signals at the focus detection pixels 313 and 314 in the third row to the line memories 320 ends, the focus detection pixels 313 and 314 in the third row are reset in response to the control signal ΦR3 generated by the reset circuit 506, and the subsequent charge storage starts at the focus detection pixels 313 and 314 in the third row at the trailing edge of the control signal ΦR3. As the transfer of the pixel signals at the focus detection pixels 314 in the fourth row to the line memories 321 ends, the focus detection pixels 313 and 314 in the fourth row are reset by the control signal ΦR4 generated by the reset circuit 506 and the subsequent charge storage starts at the focus detection pixels 313 and 314 in the fourth row at the trailing edge of the control signal ΦR4.

Subsequently, similarly to the above, the pixel signals from the imaging pixels 310 in the fifth and sixth rows are held, the imaging pixels 310 are reset, the pixel signals from the imaging pixels 310 are output after addition, and next charge storage is started. When output of the pixel signals from all the pixels ends, the operation is returned to the first row and the operation described above is repeated periodically.

As described above, pixel signals from pixels disposed in the same pattern as the pattern in which the focus detection pixel s 313 and 314 are disposed (pattern of pixel addition consisting of four pixels in rows and column adjacent to each other) are added before they can be output in the addition output mode. Therefore, the pixel signals from the imaging pixels 310 do not mix with the pixel signals from the focus detection pixels 313 and 314 or the pixel signals from the two types of focus detection pixels 313 and 314 do not mix with each other at the time of addition, so that focus detection can be executed by using the added signals from the focus detection pixels and also an image can be displayed on the liquid crystal display element 216 by using the outputs from the imaging pixels 310 being added to each other.

Figure 25:
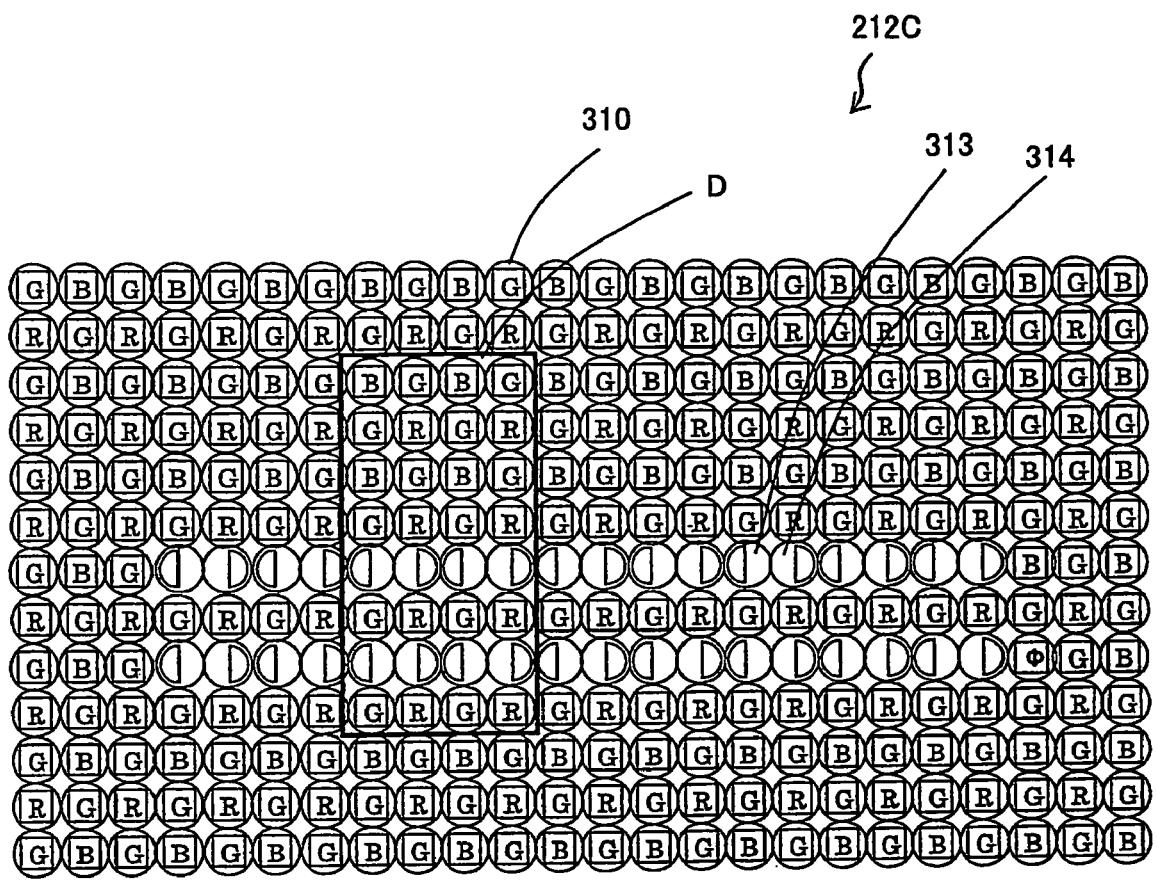
FIG. 25 is a detailed front view of the structure of an image sensor achieved in another variation.
Figure 26:
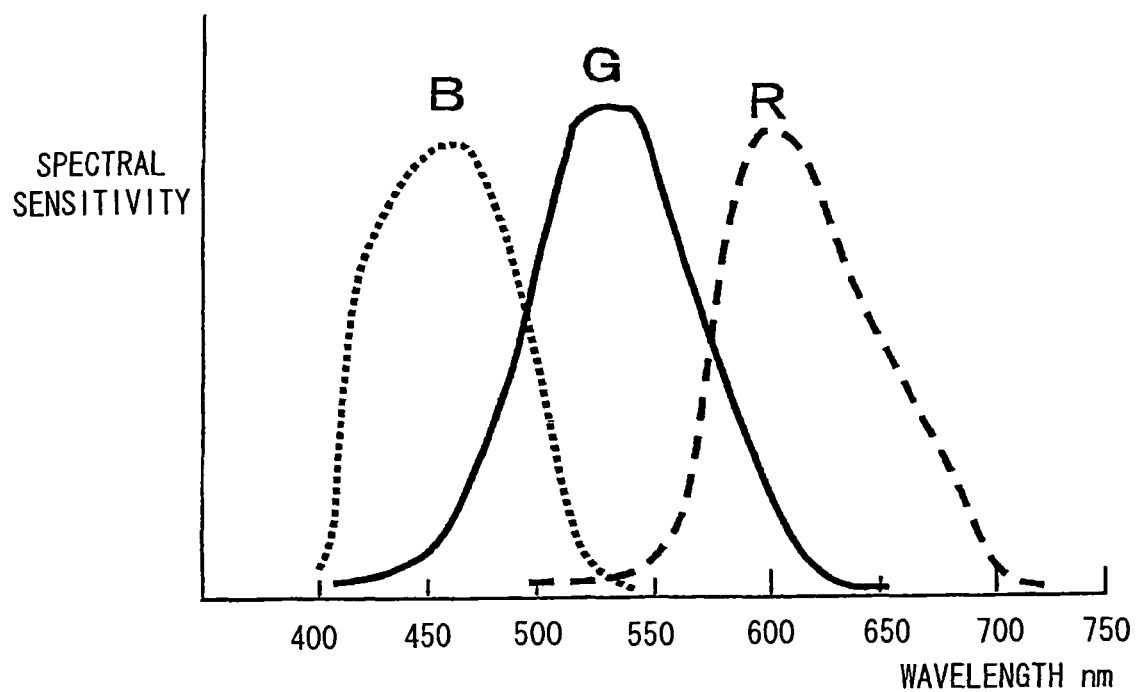
FIG. 26 shows the spectral characteristics of the imaging pixels.

FIG. 25 is a front view showing in detail the structure adopted in an image sensor 212C achieved in still another variation. It is to be noted that FIG. 25 shows the vicinity of the focus detection area 100 set on the image sensor 212C. The image sensor 212C includes the imaging pixels 310 and the focus detection pixels 313 and 314. The imaging pixels 310 are disposed in a two-dimensional square array along the horizontal and vertical directions. The imaging pixels 310 each include three types of pixels, i.e., a red pixel (R), a green pixel (G), and a blue pixel (B) equipped with respective color filters (red, green, and blue) having the spectral sensitivity characteristics shown in FIG. 26. The three types of pixels are arranged in a Bayer array. The focus detection pixels 313 and 314 are alternately disposed along the horizontal direction in the rows at the pixel points that would otherwise be occupied by the blue pixels and green pixels in the imaging pixels 310 and in two rows sandwiching a row consisting of green pixels and red pixels.

Figure 27:
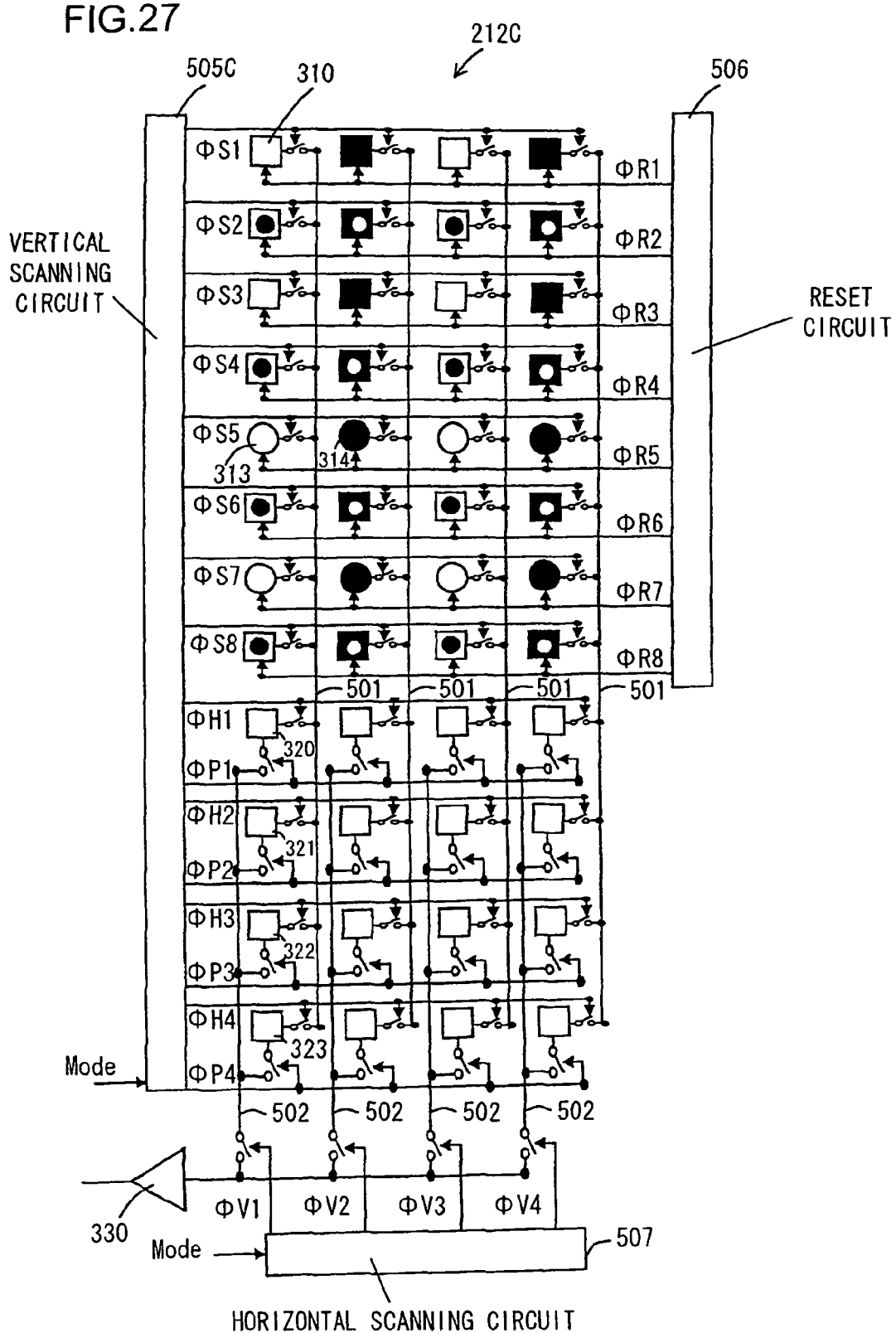
FIG. 27 is a conceptual diagram of the circuit structure adopted in the image sensor in the variation shown in FIG. 25.

FIG. 27 is a conceptual diagram showing the circuit structure adopted in the variation of the image sensor 212C shown in FIG. 25. The image sensor 2120 is constituted as a CMOS image sensor. To make the explanation of the circuit structure simpler, the circuit structure of the image sensor 212C is explained to be of a layout of four pixels along the horizontal direction and eight pixels along the vertical direction corresponding to the rectangular area D shown in FIG. 25. As shown in FIG. 27, in each of the rows except for the fifth and seventh rows, imaging pixels 310 (white square marks: blue pixels, black square marks: green pixels, white square marks each with a small black circle mark therein: green pixels, and black square marks each with a small white circle mark therein: red pixels) are disposed. The focus detection pixels 313 (white circle marks) and the focus detection pixels 314 (black circle marks) are alternately disposed in each of the fifth and seventh rows.

In FIG. 27, the line memories 320, 321, 322, and 323 include respective buffers that temporarily hold pixel signals for four rows. In the buffers, the pixel signals from the pixels in a given row are temporarily held, after the pixel signals output to vertical signal lines 501 are latched in response to control signals ΦH1, ΦH2, ΦH3 and ΦH4 generated by a vertical scanning circuit 505C. The outputs of the line memories 320 are selectively connected to the signal lines 502 in response to the control signal ΦP1. The outputs of the line memories 321 are selectively connected to the signal lines 502 in response to the control signal ΦP2. The outputs of the line memories 322 are selectively connected to the signal lines 502 in response to the control signal ΦP3. The outputs of the line memories 323 are selectively connected to the signal lines 502 in response to the control signal ΦP4.

Electrical charge storage at the imaging pixels 310 and at the focus detection pixels 313 and 314 is controlled in units of the individual rows independently of one another based upon control signals (ΦR1, . . . , ΦR8) generated by the reset circuit 506. Output of the pixel signals from the imaging pixels 310 and the focus detection pixels 313 and 314 is controlled in units of the individual rows independently of one another based upon control signals (ΦS1, . . . , ΦS8) generated by the vertical scanning circuit 505C. The pixel signal at a pixel selected based upon a control signal is output to the corresponding vertical signal line 501.

The pixel signals output to the signal lines 502 are sequentially transferred to the output circuit 330 in response to the control signals (ΦV1, . . . , ΦV4) generated by the horizontal scanning circuit 507 and the transferred signals are then amplified to a specific preset degree at the output circuit 330, from which they are output to the outside.

Mode signals for switching the operation modes are supplied to the vertical scanning circuit 505C and the horizontal scanning circuit 506 from the outside to change generation patterns of the control signals (ΦH1, . . . , ΦH4, ΦP1, . . . , ΦP4, ΦV1, . . . , ΦV4) in response to the signal level (high level or low level) of the Mode signals, thus switching the modes between an ordinary pixel signal output operation and an operation in which the pixel signals are added and output.

Figure 28:
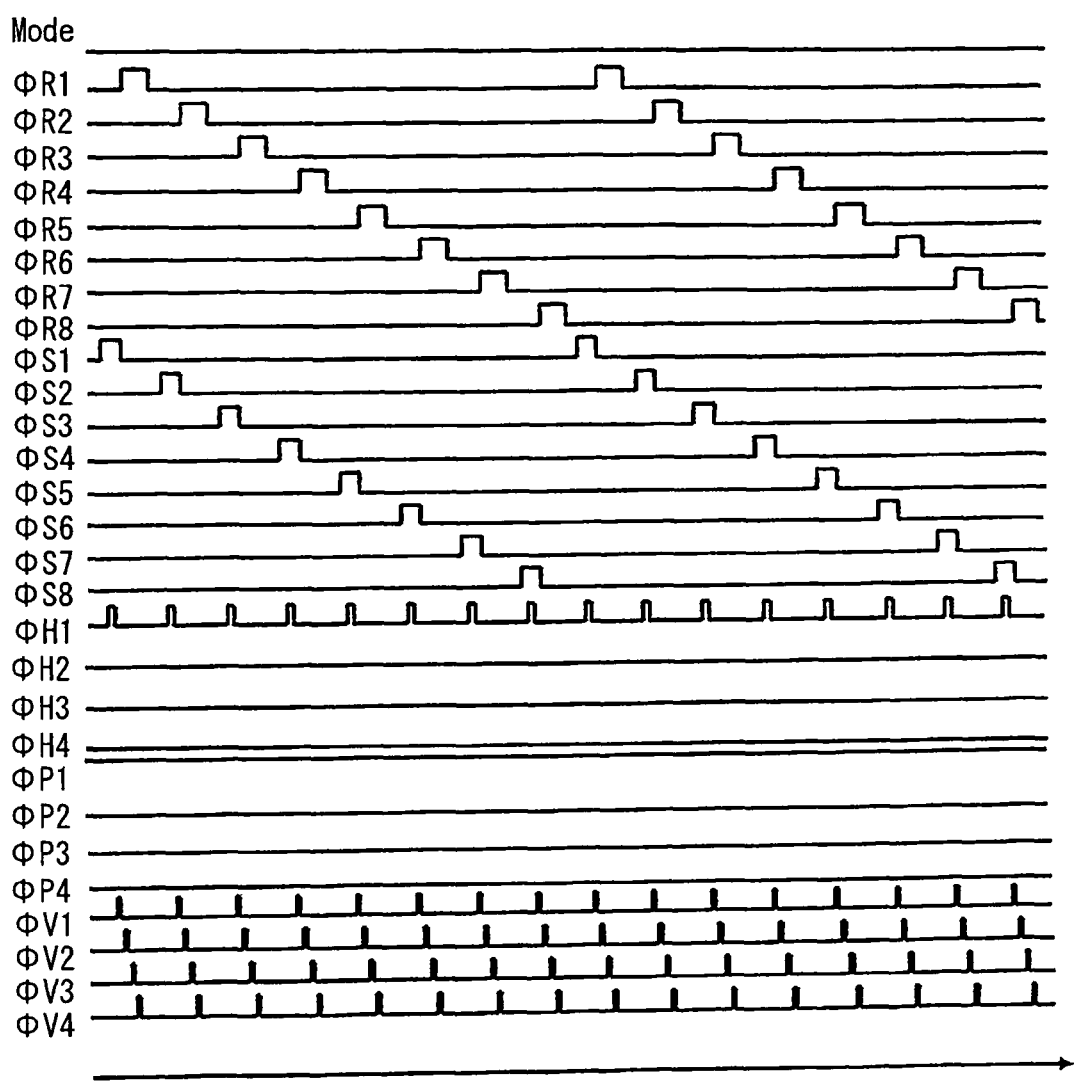
FIG. 28 is an operation timing chart pertaining to the image sensor shown in FIGS. 25 and 27 in an ordinary operation mode.

FIG. 28 presents a timing chart of the operation executed in the image sensors 212C shown in FIGS. 25 and 27 in an addition output mode. When the external signal Mode is at the low level, an ordinary operation mode (non-addition output mode) is set. In response to this, the control signal ΦP1 is always at the high level, so that the control signals ΦH2 through ΦH4 and ΦP2 through ΦP4 are always at the low level.

The imaging pixels 310 in the first row are selected by the control signal ΦS1 generated by the vertical scanning circuit 505C and the pixel signals from the selected imaging pixels 310 are output to the vertical signal lines 501. The pixel signals from the imaging pixels 310 in the first row, having been output to the vertical signal lines 501, are temporarily held in the line memories 320 based upon the control signal ΦH1 generated in synchronization with the control signal ΦS1. The pixel signals from the imaging pixels 310 in the first row held by the line memories 320 are transferred to the output circuit 330 in response to the control signals ΦV1 to ΦV4 sequentially generated by the horizontal scanning circuit 507. They are then amplified to the specific preset extent at the output circuit 330 and output to the outside.

As the transfer of the pixel signals at the imaging pixels 310 in the first row to the line memories 320 ends, the imaging pixels 310 in the first row are reset in response to the control signal ΦR1 generated by the reset circuit 506, and the subsequent charge storage starts at the imaging pixels 310 in the first row at the trailing edge of the control signal ΦR1. As the output of the added signals of the pixel signals from the imaging pixels 310 in the first row ends, the imaging pixels 310 in the second row are selected by the control signal ΦS2 generated by the vertical scanning circuit 505C and the pixel signals from the selected imaging pixels 310 are output to the vertical signal lines 501.

Subsequently, similarly to the above, the pixel signals from the imaging pixels 310 in the second row are held, the imaging pixels 310 are reset, the pixel signals from the imaging pixels 310 are output, and next charge storage is started. Subsequently, the pixel signals are held, the imaging pixels 310 are reset, the pixel signals from the imaging pixels 310 and the focus detection pixels 313 and 314 are output, and next charge storage is started in the order of the imaging pixels 310 in the third and fourth rows, the focus detection pixels 313 and 314 in the fifth row, the imaging pixels 310 in the sixth row, the focus detection pixels 313 and 314 in the seventh row, and the imaging pixels 310 in the eighth row. When output of the pixel signals from all the pixels ends, the operation is returned to the first row and the operations described above are repeated periodically.

By adjusting the pulse width of the control signals ΦR1 through ΦR8, the charge storage time (exposure time) at the imaging pixels 310 and the focus detection pixels 313 and 314 can be controlled. FIG. 28 presents a timing chart according to which electric charge storage and pixel signal output from the first row to the eighth row are periodically repeated. However, only one cycle of electric charge storage and pixel signal output may be performed one-time. Such an ordinary operation mode (non-addition output mode) is executed upon imaging.

Figure 29:
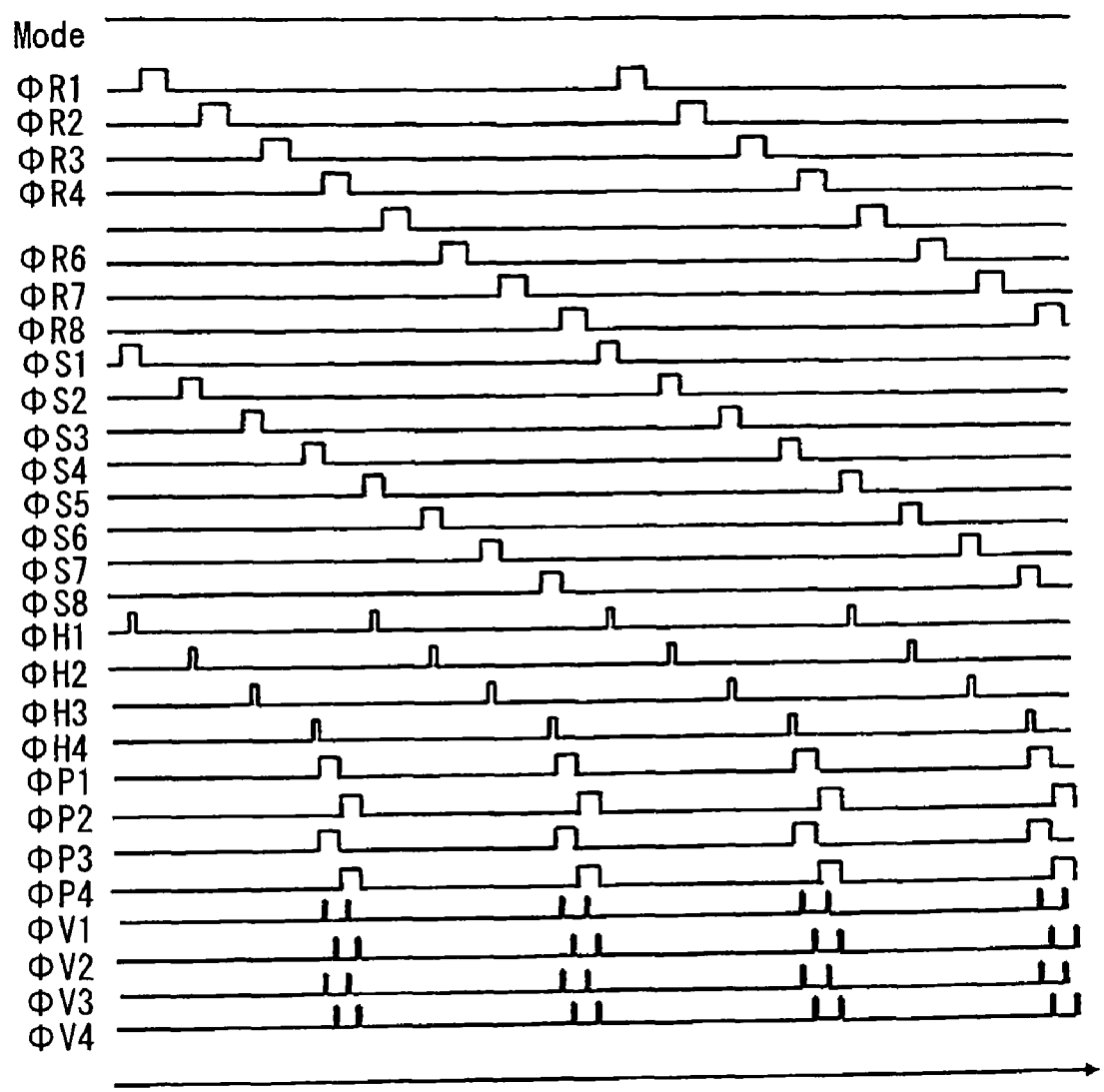
FIG. 29 is an operation timing chart pertaining to the image sensor shown in FIGS. 25 and 27 in an addition output mode.

FIG. 29 presents a timing chart of the operation executed in the image sensor 212C shown in FIGS. 25 and 27 in an addition output mode. When the external signal Mode is at the high level, the addition output mode is executed. In this addition output mode, the control signals ΦV1 through ΦV4 and ΦP1 through ΦP4 are generated in specific predetermined patterns in synchronization with each other.

The pixel signals of the imaging pixels 310 in the first row are selected by the control signal ΦS1 generated by the vertical scanning circuit 505C and the pixel signals from the selected imaging pixels 310 are output via the vertical signal lines 501. The pixel signals from the imaging pixels 310 in the first row, having been output to the vertical signal lines 501 in response to the control signal ΦH1 generated in synchronization with the control signal ΦS1 are temporarily held in the line memories 320. Then, the pixel signals of the imaging pixels 310 in the second row are selected by the control signal ΦS2 generated by the vertical scanning circuit 505C and the pixel signals from the selected imaging pixels 310 are output via the vertical signal lines 501. The pixel signals from the imaging pixels 310 in the second row, having been output to the vertical signal lines 501 in response to the control signal ΦH2 generated in synchronization with the control signal ΦS2 are temporarily held in the line memories 321.

The pixel signals of the imaging pixels 310 in the third row are selected by the control signal ΦS3 generated by the vertical scanning circuit 505C and the pixel signals from the selected imaging pixels 310 are output via the vertical signal lines 501. The pixel signals from the imaging pixels 310 in the third row, having been output to the vertical signal lines 501 in response to the control signal ΦH3 generated in synchronization with the control signal ΦS3 are temporarily held in the line memories 322. The pixel signals of the imaging pixels 310 in the fourth row are selected by the control signal ΦS4 generated by the vertical scanning circuit 505C and the pixel signals from the selected imaging pixels 310 are output via the vertical signal lines 501. The pixel signals from the imaging pixels 310 in the fourth row, having been output to the vertical signal lines 501 in response to the control signal ΦH4 generated in synchronization with the control signal ΦS4 are temporarily held in the line memories 323.

Subsequently, the control signals ΦP1 and ΦP3 are turned to the high level in synchronization with each other and the pixel signals from the imaging pixels 310 in the first row held in the line memories 320 and the pixel signals from the imaging pixels 310 in the third row held in the line memories 321 are added via the signal lines 502. At the same time, among the pixels signals from the first row and the pixel signals from the third row, those pixel signals from the first and third columns are further added to each other via the signal lines 502 in response to the control signals ΦV1 and ΦV3 generated by the horizontal scanning circuits 507 in synchronization with each other. The resultant pixel signals are transferred to the output circuit 330. In the output circuit 330, the transferred signals are then amplified at a predetermined to a specific preset degree at the output circuit 330, from which they are output to the outside. Then, among the pixels signals from the first row and the pixel signals from the third row, those pixel signals from the second and fourth columns are further added via the signal lines 502 to the obtained added signals in response to the control signals ΦV2 and ΦV4 generated by the horizontal scanning circuits 507 in synchronization with each other. The resultant pixel signals are transferred to the output circuit 330. In the output circuit 330, the transferred signals are then amplified at a predetermined to a specific preset degree at the output circuit 330, from which they are output to the outside.

Then, the control signals ΦP1 and ΦP3 are turned to the low level synchronously and subsequently, the control signals ΦP2 and ΦP4 are turned to the high level in synchronization with each other. As a result, the pixel signals from the imaging pixels 310 in the second row held in the line memories 321 and the pixel signals from the imaging pixels 310 in the fourth row held in the line memories 323 are added via the signal lines 502. At the same time, among the pixels signals from the second row and the pixel signals from the fourth row, those pixel signals from the first and third columns are further added to each other via the signal lines 502 to the obtained added signals in response to the control signals ΦV1 and ΦV3 generated by the horizontal scanning circuits 507 in synchronization with each other. The resultant pixel signals are transferred to the output circuit 330. In the output circuit 330, the transferred signals are then amplified at a specific preset degree at the output circuit 330, from which they are output to the outside. Then, among the pixels signals from the second row and the pixel signals from the fourth row, those pixel signals from the second and fourth columns are further added to each other via the signal lines 502 in response to the control signals ΦV2 and ΦV4 generated by the horizontal scanning circuits 507 in synchronization with each other. Thereafter, the control signals ΦP2 and ΦP4 are turned to the low level.

By the above operations, in the first to fourth rows of the image sensor 212C shown in FIG. 27, first the four pixel signals from the blue pixels indicated by the white square marks are added to each other and output and then the four pixel signals from the green pixels indicated by the black square marks are added to each other and output. Then, the four pixel signals from the green pixels indicated by the white square marks each with a small black circle mark therein are added and output and further the four pixel signals from the red pixels indicated by the black square marks each with a small white circle mark therein are added and output.

As the transfer of the pixel signals at the imaging pixels 310 in the first row to the line memories 320 ends, the imaging pixels 310 in the first row are reset in response to the control signal ΦR1 generated by the reset circuit 506, and the subsequent charge storage starts at the imaging pixels 310 in the first row at the trailing edge of the control signal ΦR1. As the transfer of the pixel signals at the imaging pixels 310 in the second row to the line memories 321 ends, the imaging pixels 310 in the second row are reset by the control signal ΦR2 generated by the reset circuit 506 and the subsequent charge storage starts at the imaging pixels 310 in the second row at the trailing edge of the control signal ΦR2.

Similarly, as the transfer of the pixel signals at the imaging pixels 310 in the third row to the line memories 322 ends, the imaging pixels 310 in the third row are reset in response to the control signal ΦR3 generated by the reset circuit 506, and the subsequent charge storage starts at the imaging pixels 310 in the third row at the trailing edge of the control signal ΦR3. Further, as the transfer of the pixel signals at the imaging pixels 310 in the fourth row to the line memories 321 ends, the imaging pixels 310 in the fourth row are reset by the control signal ΦR4 generated by the reset circuit 506 and the subsequent charge storage starts at the imaging pixels 310 in the fourth row at the trailing edge of the control signal ΦR4.

As the output from the output circuit 330 of the added signals of the pixel signals from the imaging pixels 310 in the first to fourth rows ends, the focus detection pixels 313 and 314 in the fifth row are selected by the control signal ΦS5 generated by the vertical scanning circuit 505C and the pixel signals from the selected focus detection pixels 313 and 314 are output to the vertical signal lines 501. The pixel signals from the fifth row, having been output to the vertical signal lines 501, are temporarily held in the line memories 320 based upon the control signal ΦH1 generated in synchronization with the control signal ΦS5. Then, the imaging pixels 310 in the sixth row are selected by the control signal ΦS6 generated by the vertical scanning circuit 505C, and the pixel signals of the selected imaging pixels 310 are output to the signal lines 501. The pixel signals from the sixth row output to the vertical signal line 501 are temporarily held by the line memories 321 in response to the control signal ΦH2 generated in synchronization with the control signal ΦS6.

The focus detection pixels 313 and 314 in the seventh row are selected by the control signal ΦS7 generated by the vertical scanning circuit 505C and the pixel signals from the selected focus detection pixels 313 and 314 are output to the vertical signal lines 501. The pixel signals from the seventh row, having been output to the vertical signal lines 501, are temporarily held in the line memories 322 based upon the control signal ΦH3 generated in synchronization with the control signal ΦS7. Further, the focus detection pixels 313 and 314 in the eighth row are selected by the control signal ΦS8 generated by the vertical scanning circuit 505C and the pixel signals from the selected focus detection pixels 313 and 314 are output to the vertical signal lines 501. The pixel signals from the eighth row, having been output to the vertical signal lines 501, are temporarily held in the line memories 323 based upon the control signal ΦH4 generated in synchronization with the control-signal ΦS8.

Subsequently, the control signals ΦP1 and ΦP3 are turned to the high level in synchronization with each other and the pixel signals from the focus detection pixels 313 and 314 in the fifth row held in the line memories 320 and the pixel signals from the focus detection pixels 313 and 314 in the seventh row held in the line memories 322 are added via the signal lines 502. At the same time, among the pixels signals from the fifth row and the pixel signals from the seventh row, those pixel signals from the focus detection pixels 313 at the first and third columns are further added to each other via the signal lines 502 in response to the control signals ΦV1 and ΦV3 generated by the horizontal scanning circuits 507 in synchronization with each other. The resultant pixel signals are transferred to the output circuit 330. In the output circuit 330, the transferred signals are then amplified to a specific preset degree at the output circuit 330, from which they are output to the outside. Then, among the pixels signals from the fifth row and the pixel signals from the seventh row, those pixel signals from the focus detection pixels 314 at the second and fourth columns are further added to each other via the signal lines 502 in response to the control signals ΦV2 and ΦV4 generated by the horizontal scanning circuits 507 in synchronization with each other. The resultant pixel signals are transferred to the output circuit 330. In the output circuit 330, the transferred signals are then amplified to a specific preset degree at the output circuit 330, from which they are output to the outside.

Thereafter, the control signals ΦP1 and ΦP3 are turned to the low level in synchronization with each other and subsequently the control signals ΦP2 and ΦP4 are turned to the high level in synchronization with each other. As a result, the pixel signals from the imaging pixels 310 in the sixth row held in the line memories 321 and the pixel signals from the imaging pixels 310 in the eighth row held in the line memories 323 are added via the signal lines 502. At the same time, among the pixels signals from the sixth row and the pixel signals from the eighth row, those pixel signals from the first and third columns are further added to each other via the signal lines 502 in response to the control signals ΦV1 and ΦV3 generated by the horizontal scanning circuits 507 in synchronization with each other. The resultant pixel signals are transferred to the output circuit 330. In the output circuit 330, the transferred signals are then amplified at a specific preset degree at the output circuit 330, from which they are output to the outside. Then, among the pixels signals from the sixth row and the pixel signals from the eighth row, those pixel signals from the second and fourth columns are further added to each other via the signal lines 502 in response to the control signals ΦV2 and ΦV4 generated by the horizontal scanning circuits 507 in synchronization with each other. Thereafter, the control signals ΦP2 and ΦP4 are turned to the low level.

By the above operations, in the fifth to eighth rows of the image sensor 212C shown in FIG. 27, first the four pixel signals from the focus detection pixels 313 indicated by the white circle marks are added to each other and output and then the four pixel signals from the focus detection pixels 314 indicated by the black circle marks are added to each other and output similarly, the four pixel signals from the green pixels indicated by the white square marks each with a small black circle mark therein are added to each other and output and further the four pixel signals from the red pixels indicated by the black square marks each with a small white circle mark therein are added to each other and output.

As the transfer of the pixel signals at the focus detection pixels 313 and 314 in the fifth row to the line memories 320 ends, the focus detection pixels 313 and 314 in the fifth row are reset in response to the control signal ΦR5 generated by the reset circuit 506, and the subsequent charge storage starts at the focus detection pixels 313 and 314 in the fifth row at the trailing edge of the control signal ΦR5. As the transfer of the pixel signals at the imaging pixels 310 in the sixth row to the line memories 321 ends, the imaging pixels 310 in the sixth row are reset by the control signal ΦR6 generated by the reset circuit 506 and the subsequent charge storage starts at the focus detection pixels 313 and 314 in the sixth row at the trailing edge of the control signal ΦR6.

As the transfer of the pixel signals at the focus detection pixels 313 and 314 in the seventh row to the line memories 322 ends, the focus detection pixels 313 and 314 in the seventh row are reset in response to the control signal ΦR7 generated by the reset circuit 506, and the subsequent charge storage starts at the focus detection pixels 313 and 314 in the seventh row at the trailing edge of the control signal ΦR7. Further, as the transfer of the pixel signals at the imaging pixels 310 in the eighth row to the line memories 323 ends, the imaging pixels 310 in the eighth row are reset by the control signal ΦR8 generated by the reset circuit 506 and the subsequent charge storage starts at the imaging pixels 310 in the eighth row at the trailing edge of the control signal ΦR8. When output of the pixel signals from all the pixels ends, the operation is returned to the first row and the operations described above are repeated periodically.

As described above, pixel signals from four pixels disposed alternately along the direction of row and along the direction of column are added before they can be output in the addition output mode. Therefore, even in the image sensor in which red pixels, blue pixels, and green pixels are disposed in a Bayer array, the pixel signals from the imaging pixels 310 of different types or the pixel signals from the focus detection pixels 313 and 314 do not mix with each other or two types of the pixel signals from the focus detection pixels 313 and 314 do not mix with each other upon addition processing. Further, focus detection can be executed by using the added signals from the focus detection pixels 313 and 314 and also an image can be displayed on the liquid crystal display element 216 by using the outputs from the imaging pixels 310 being added to each other.

As described above, color mixing in an image upon addition processing can be prevented by matching the arrangement pattern of the color pixels in the imaging pixels 310, the arrangement pattern of the focus detection pixels 313 and 314, and the pixel addition pattern upon addition processing one another. That is, according to the above-mentioned embodiments of the present invention, live view display and focus detection can be simultaneously executed by using imaging output from the image sensor in which the imaging pixels and the focus detection pixels are disposed in a two-dimensional array.

The detailed structure of the image sensor shown in FIG. 3 corresponds to a part of the image sensor. The circuit structure of the image sensor shown in FIG. 10 corresponds to the rectangular area A shown in FIG. 3. In the operation of the image sensor in the addition output mode shown in FIG. 13, addition processing is executed in units of four pixels along the horizontal direction. Therefore, the image sensor is configured such that the pixel signals of the imaging pixels and the focus detection pixels are neither added nor mixed with each other at a boundary at which the type of the pixels is changed from the imaging pixels and the focus detection pixels in a row containing focus detection pixels (i.e., between the third and fourth pixels from the left in FIG. 3). Explanation will be made below on the operation of the image sensor at the boundary at which the type of the pixels disposed changes from the imaging pixels to the focus detection pixels in the row containing the focus detection pixels.

Figure 30:
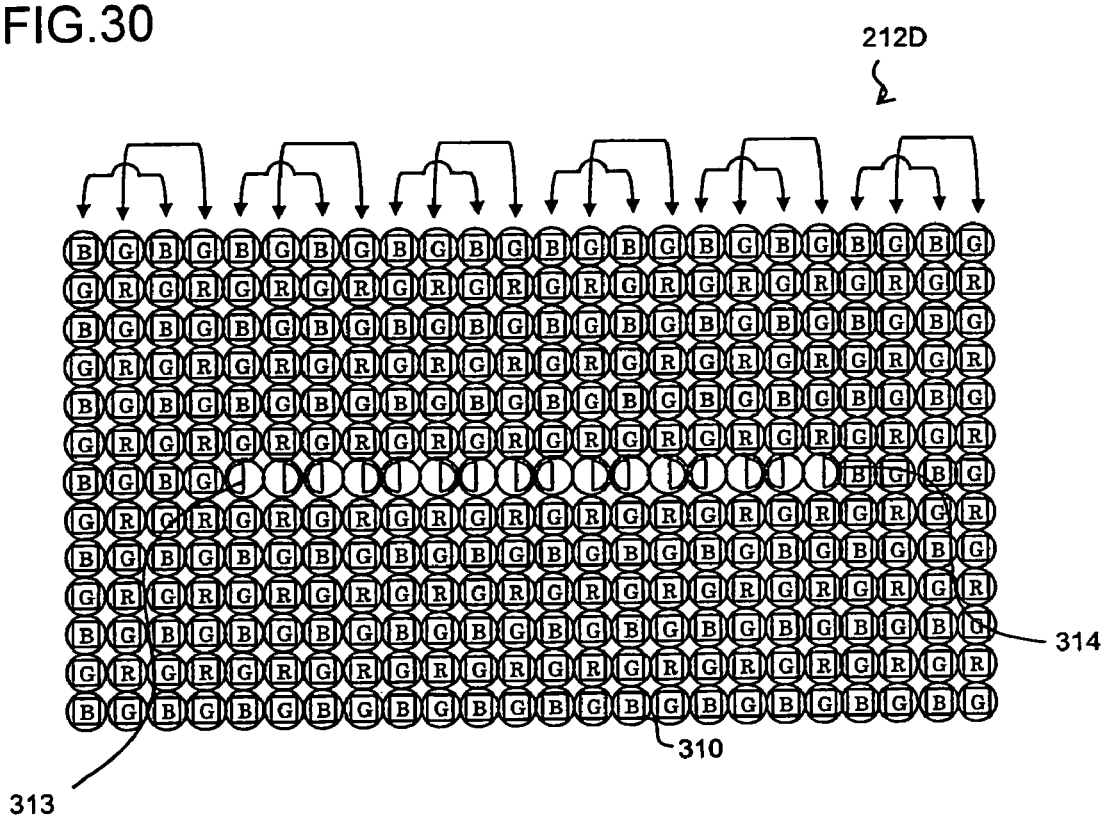
FIG. 30 is a detailed front view of the structure of an image sensor achieved in another variation.

FIG. 30 is a front view showing in detail the structure adopted in an image sensor 212D achieved in yet another variation. It is to be noted that FIG. 30 shows the vicinity of the focus detection area 100 set on the image sensor 212D. The image sensor 212D includes the imaging pixels 310 and the focus detection pixels 313 and 314. The imaging pixels 310 are disposed in a two-dimensional rectangular array along the horizontal and vertical directions. The imaging pixels 310 each include three types of pixels, i.e., a red pixel (R), a green pixel (G), and a blue pixel (B) equipped with respective color filters (red, green, and blue) having the spectral sensitivity characteristics shown in FIG. 26. The three types of pixels are disposed in a Bayer array. The focus detection pixels 313 and 314 are alternately disposed along the horizontal direction in the rows at the points that would otherwise be occupied by the blue pixels and green pixels of the imaging pixels 310.

Figure 31:
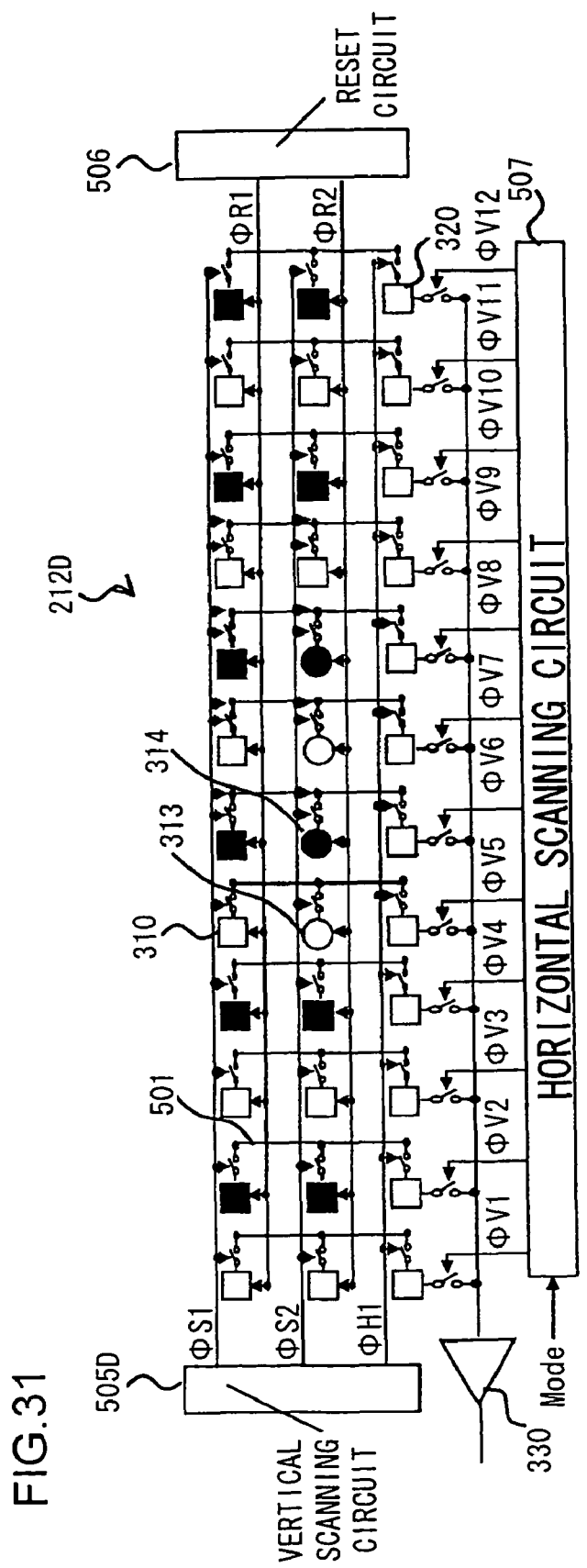
FIG. 31 is a conceptual diagram of the circuit structure adopted in the image sensor in the variation shown in FIG. 30.

FIG. 31 is a conceptual diagram showing the circuit structure adopted in the image sensor 212D shown in FIG. 30. The image sensor 212D is constituted as a CMOS image sensor. To make the explanation of the circuit structure simpler, the circuit structure of the image sensor 212D is illustrated to be of a layout of twelve pixels along the horizontal direction by two pixels along the vertical direction. As shown in FIG. 31, the imaging pixels 310 (indicated by white square marks) are disposed in all the columns in the first row, the first to fourth columns and the ninth to twelfth columns in the second row. The focus detection pixels 313 (white circle marks) and the focus detection pixels 314 (black circle marks) are alternately disposed at the fifth to eighth columns in the second row.

In FIG. 31, the line memories 320 include buffers that temporarily hold pixel signals for one row. In the buffers, the pixel signals from the pixels in a given row are temporarily held, after the pixel signals output to vertical signal lines 501 are latched in response to control signal ΦH1 generated by the vertical scanning circuit 505D.

Electrical charge storage at the imaging pixels 310 and at the focus detection pixels 313 and 314 is controlled in units of the individual rows independently of one another based upon control signals (ΦR1 and ΦR2) generated by the reset circuit 506. Output of the pixel signals from the imaging pixels 310 and the focus detection pixels 313 and 314 is controlled in units of the individual rows independently of one another based upon the control signals (ΦS1 and ΦS2) generated by the vertical scanning circuit 505D. The pixel signals selected based upon control signals ΦS1 and ΦS2 are output to the corresponding vertical signal lines 501.

The pixel signals held by the line memories 320 are sequentially output to the output circuit 330 in response to control signals (ΦV1, . . . , ΦV12) generated by the horizontal scanning circuit 507 and the transferred signals are then amplified to a specific preset degree at the output circuit 330, from which they are output to the outside. Mode signals for switching the operation modes are supplied to the horizontal scanning circuit 507 from the outside to change pixel selection patterns of the control signals (ΦH1, . . . , ΦH12) in response to the signal level (high level or low level) of the Mode signals, thus switching the modes between an ordinary pixel signal output operation and an operation in which the pixel signals are added and output from one to another.

Figure 32:
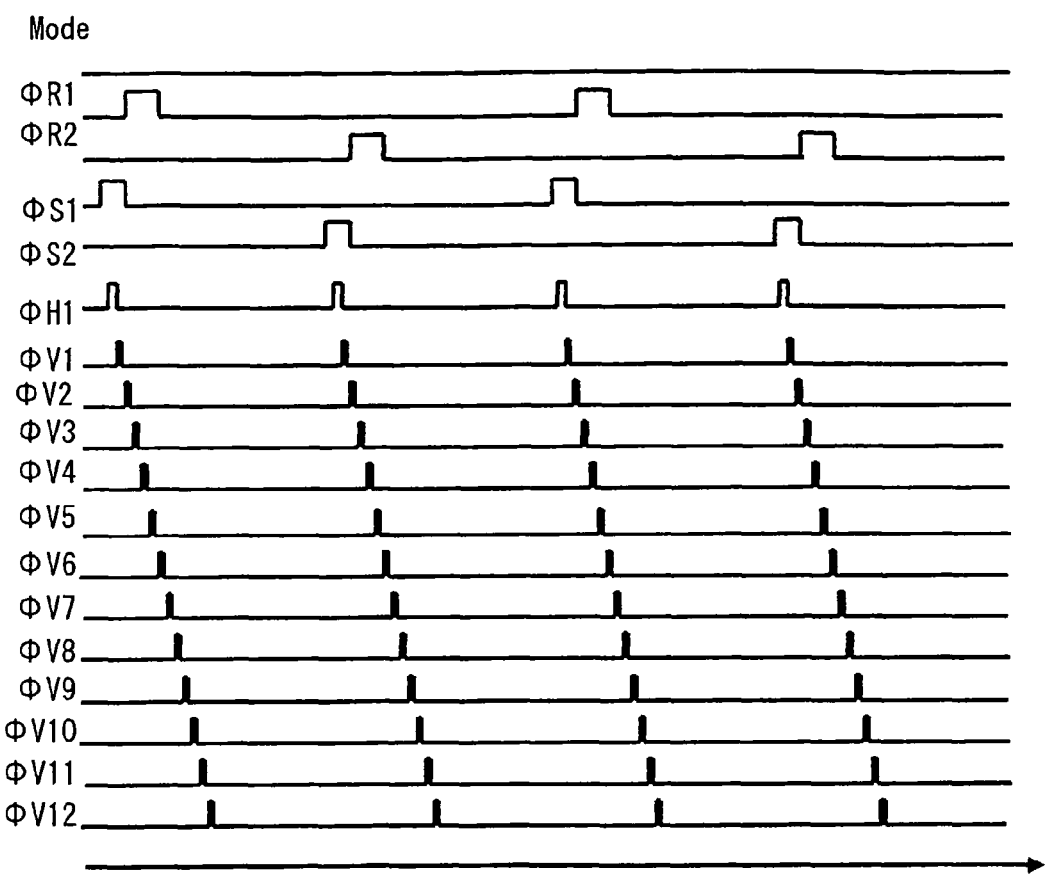
FIG. 32 is an operation timing chart pertaining to the image sensor shown in FIGS. 30 and 31 in an ordinary operation mode.

FIG. 32 presents a timing chart of the operation executed in the image sensors 212D in an ordinary operation mode. When the external signal Mode is at the low level, the operation in the ordinary operation mode (non-addition output mode) is executed. The imaging pixels 310 in the first row are selected by the control signal ΦS1 generated by the vertical scanning circuit 505D and the pixel signals from the selected imaging pixels 310 are output to the vertical signal lines 501. The pixel signals from the imaging pixels 310 in the first row, having been output to the vertical signal lines 501, are temporarily held in the line memories 320 based upon the control signal ΦH1 generated in synchronization with the control signal ΦS1. The pixel signals from the imaging pixels 310 in the first row held by the line memories 320 are transferred to the output circuit 330 in response to the control signals ΦV1 to ΦV12 sequentially generated by the horizontal scanning circuit 507. They are then amplified to the specific preset extent at the output circuit 330 and output to the outside.

As the transfer of the pixel signals at the imaging pixels 310 in the first row to the line memories 320 ends, the imaging pixels 310 in the first row are reset in response to the control signal ΦR1 generated by the reset circuit 506, and the subsequent charge storage starts at the imaging pixels 310 in the first row at the trailing edge of the control signal ΦR1. As the output of the added signals of the pixel signals from the imaging pixels 310 in the first row ends, the imaging pixels 310 and the focus detection pixels 313 and 314 in the second row are selected based on the control signal ΦS2 generated by the vertical scanning circuit 505D and the pixel signals from the selected imaging pixels 310 are output to the vertical-signal lines 501.

The pixel signals from the imaging pixels 310 in the second row, having been output to the vertical signal lines 501, are temporarily held in the line memories 320 based upon the control signal ΦH1 generated in synchronization with the control signal ΦS2. The pixel signals from the imaging pixels and the focus detection pixels in the second row held in the line memories 320 are transferred to the output circuit 330 in response to the control signals ΦV1 through ΦV12 sequentially generated by the horizontal scanning circuit 507. In the output circuit 330, the transferred signals are then amplified to a specific preset degree at the output circuit 330, from which they are output to the outside As the transfer of the pixel signals at the imaging pixels 310 and the focus detection pixels 313 and 314 in the second row to the line memories 320 ends, the imaging pixels 310 and the focus detection pixels 313 and 314 in the second row are reset in response to the control signal ΦR2 generated by the reset circuit 506, and the subsequent charge storage starts at the imaging pixels 310 and the focus detection pixels 313 and 314 in the second row at the trailing edge of the control signal ΦR2. As the output of the pixel signals from the imaging pixels 310 and the focus detection pixels 313 and 314 in the second row ends, the process returns to the firs row and the above-mentioned operations are repeated periodically.

By changing the pulse width of the control signals ΦR1 and ΦR2, the charge storage time (exposure time) at the imaging pixels 310 and the focus detection pixels 313 and 314 can be controlled.

Figure 33:
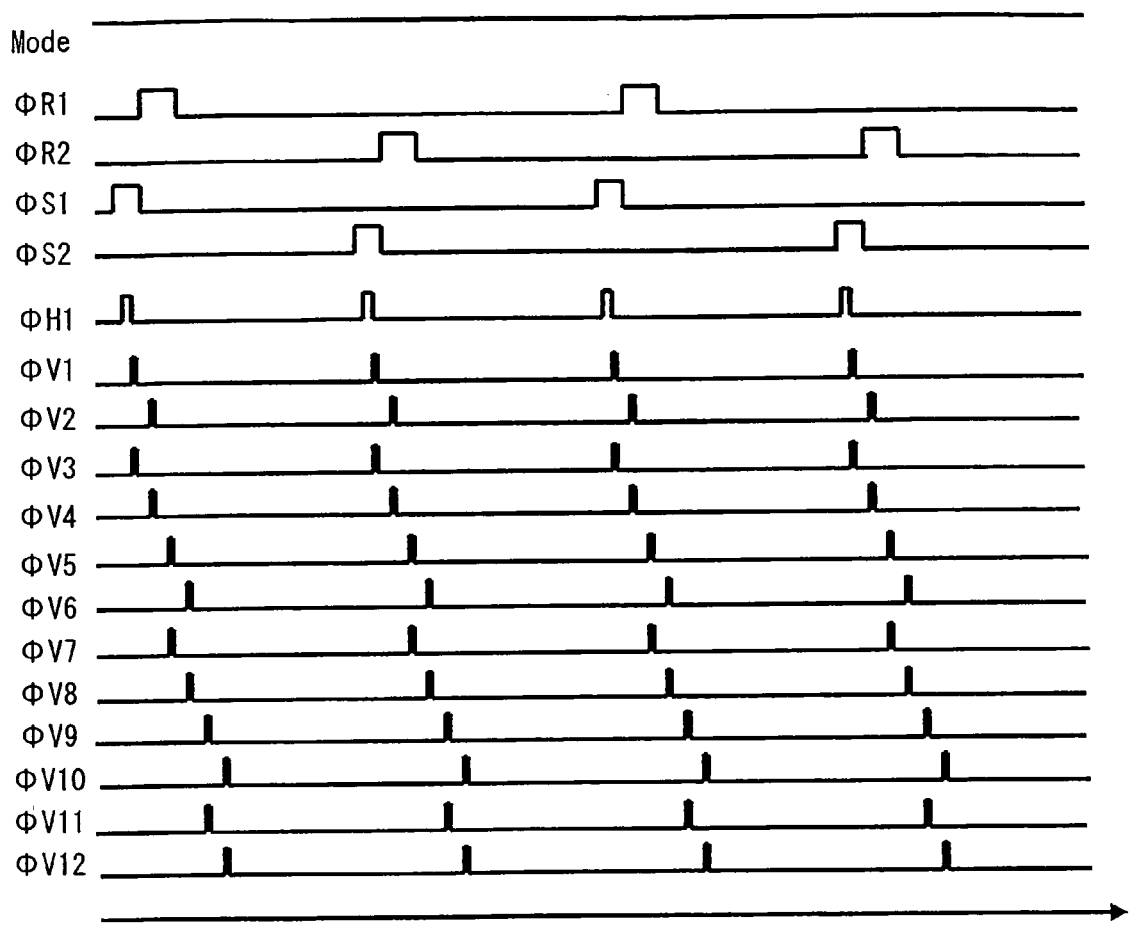
FIG. 33 is an operation timing chart pertaining to the image sensor shown in FIGS. 30 and 31 in an addition output mode.

FIG. 33 presents a timing chart of the operation executed in the image sensor 212D in the addition output mode. When the external signal Mode is at the high level, the addition output mode is executed. The imaging pixels 310 in the first row are selected by the control signal ΦS1 generated by the vertical scanning circuit 505D and the pixel signals from the selected imaging pixels 310 are output to the vertical signal lines 501. The pixel signals from the imaging pixels in the first row, having been output to the vertical signal lines 501, are temporarily held in the line memories 320 based upon the control signal ΦH1 generated in synchronization with the control signal ΦS1. The pixel signals from the imaging pixels 310 in the first row held in the line memories 320 are transferred to the output circuit 330 in response to the control signals ΦV1 through ΦV12 generated sequentially from the horizontal scanning circuit 507. They are then amplified to the specific preset extent at the output circuit 330 before they are output to the outside.

In the addition output mode, the control signals ΦV1 and ΦV3 are first generated simultaneously and subsequently the control signals ΦV2 and V4, ΦV2 and ΦV4, ΦV5 and ΦV7, ΦV6 and ΦV8, ΦV9 and ΦV11, and ΦV10 and ΦV12, respectively, are generated simultaneously. As a result, the signals held by the line memories 320 at the first row and the third row (output signals from the imaging pixels 31 indicated by white square marks in FIG. 31) are added to each other and output to the output circuit 330. Then the signals held by the line memories 320 at the second row and the fourth row (signals from the imaging pixels 310 indicated by black square marks in FIG. 31) are added to each other and output to the output circuit 330. Similarly, the signals held in the line memories 320 at the fifth and seventh columns, the sixth and eighth columns, the ninth and eleventh columns, and the tenth and twelfth columns, respectively, are added to each other and the respective added signals are output to the output circuit 330.

As the transfer of the pixel signals at the imaging pixels 310 in the first row to the line memories 320 ends, the imaging pixels 310 in the first row are reset in response to the control signal ΦR1 generated by the reset circuit 506, and the subsequent charge storage starts at the imaging pixels 310 in the first row at the trailing edge of the control signal ΦR1. As the output of the pixel signals from the imaging pixels 310 in the first row from the output circuit 330 ends, the imaging pixels 310 in the second row are selected by the control signal ΦS2 generated by the vertical scanning circuit 505D and the pixel signals from the selected imaging pixels 310 are output to the vertical signal lines 501.

The pixel signals from the imaging pixels 310 in the second row, having been output to the vertical signal lines 501, are temporarily held in the line memories 320 based upon the control signal ΦH1 generated in synchronization with the control signal ΦS2. The pixel signals from the imaging pixels 310 and the focus detection pixels 313 and 314 held in the line memories 320 are transferred to the output circuit 330 in response to the control signals ΦV1 through ΦV12 sequentially generated by the horizontal scanning circuit 507. In the output circuit 330, the transferred signals are then amplified to a specific preset degree at the output circuit 330, from which they are output to the outside.

In the addition output mode, the control signals ΦV1 and ΦV3 are first generated simultaneously and subsequently the control signals ΦV2 and ΦV4, ΦV5 and ΦV7, ΦV6 and ΦV8, ΦV9 and ΦV11, and ΦV10 and ΦV12, respectively, are generated simultaneously. As a result, the signals held by the line memories 320 at the first row and the third row (output signals from the imaging pixels 31 indicated by white square marks in FIG. 31) are added to each other and output to the output circuit 330. Then the signals held by the line memories 320 at the second row and the fourth row (signals from the imaging pixels 310 indicated by black square marks in FIG. 31) are added to each other and output to the output circuit 330.

Subsequently, the signals held in the line memories 320 at the fifth and seventh columns (output signals from the focus detection pixels 313 indicated by the white circle marks in FIG. 31) are added to each other and the respective added signals are output to the output circuit 330. Then, the signals held in the line memories 320 at the sixth and eighth columns (signals from the focus detection pixels indicated by the black circle marks in FIG. 31) are added to each other and the respective added signals are output to the output circuit 330

Subsequently, the signals held in the line memories 320 at the ninth and eleventh columns (output signals from the focus detection pixels 313 indicated by the white square marks in FIG. 31) are added to each other and the respective added signals are output to the output circuit 330. Then, the signals held in the line memories 320 at the tenth and twelfth columns (signals from the focus detection pixels indicated by the black square marks in FIG. 31) are added to each other and the respective added signals are output to the output circuit 330.

As the output of the pixel signals from all the pixels in the second row ends, the process returns to the first row again and the above-mentioned operations are repeated periodically.

In the above-mentioned example, pixel signals of the pixels in the odd number columns are added to each other and pixel signals of even number columns are added to each other for (4q+1)th to (4q+4)th columns where q=0, 1, 2, . . . , and the added signals are output, respectively, in each row. For example, when signals from two sets of pixels on four pixels at the first to fourth columns for q=0, are added and output, and then, similarly two sets of pixels on four pixels at the fifth to eighth columns for q=1 are added to each other and output. That is, in the above-mentioned example, an addition pattern that for a given value of q, addition output is executed in units of pixels at the (4q+1)th to (4q+4)th columns, which is repeated every time when q is incremented. According to the addition pattern, a pixel signal at each column in each row is read out. The imaging pixels and the focus detection pixels are disposed such that the boundary between the imaging pixels and the focus detection pixels does not extend over two of the addition patterns. Therefore, even in rows where there are disposed both the imaging pixels and the focus detection pixels, the pixel signals from the imaging pixels are added to each other and the pixel signals from the focus detection pixels are added to each other whereas the pixel signals from the imaging pixels and the pixel signals from the focus detection pixels are not added to each other. For this purpose, in FIG. 30, the image sensor 212D consists of twenty four pixels per row. In the row where the focus detection pixels are disposed, four imaging pixels are disposed from the left side edge and then the focus detection pixels 313 and 314 are alternately disposed so as to consist of sixteen pixels in total, followed by four imaging pixels up to the right edge. To make the explanation simpler, it is assumed that the image sensor 212D shown in FIG. 30 constitutes the total area of the rectangular photographic image plane 100.

In the structure of the image sensor 212D shown in FIG. 30, the operation of the image sensor 212D in the row where the focus detection pixels are disposed in the addition output mode is as follows.

First, blue pixel signals from the first and third pixels, which constitute the imaging pixels 310, are added to each other and output. Then, green pixel signals from the second and fourth pixels, which constitute the imaging pixels 310, are added to each other and output. Subsequently, pixel signals from the fifth and seventh pixels, which constitute the focus detection pixels 313, are added to each other and output. Then, pixel signals from the sixth and eighth pixels, which constitute the focus detection pixels 314, are added to each other and output. Similarly, for up to twentieth pixels, pixel signals from the focus detection pixels 313 or the focus detection pixels 314 are added to each other and output. Further, blue pixel signals from the twenty first and twenty third pixels, which constitute the imaging pixels 310, are added to each other and output. Finally, green pixel signals from the twenty second and twenty fourth pixels, which constitute the imaging pixels 310, are added to each other and output, to end the output of the added pixel signals in this row.

Since pixel signals are added to each other and output by similar operation to the above also in rows where only the imaging pixels are disposed, pixel signals from imaging pixels of the same color are added to each other, so that it is prevented that pixel signals from the imaging pixels of the same color are added to each other or pixel signals from the imaging pixels of different colors are added to each other.

In the operation of the camera shown in FIGS. 14 to 17; the image sensor is operated periodically in the addition output mode until a shutter release operation is executed in order to enable display and focus detection to be executed simultaneously based on the added pixel signals read out at the same point in time. Further, the focus detection and the focus adjustment are executed based on non-added pixel signals read out by operating the image sensor in a single-shot fashion in the ordinary operation mode after the shutter release operation and a pixel signal is obtained by operating the image sensor in the ordinary operation mode again in a single-shot fashion after the focus adjustment based on the read out non-added pixel signals. However, the focus adjustment after the shutter release operation may be omitted.

The image sensor may be configured such that the field brightness is measured by a photometering device and the image sensor is operated in the addition output mode only when the brightness is low before the shutter release operation in order to increase the level of pixel signals.

The arrangement of the focus detection area in the image sensor is not limited to the arrangement shown in FIG. 2 and the focus detection area may be disposed in other area than the central part of the screen. Also it is possible to dispose the focus detection area in the horizontal direction and in the vertical direction at a position along the diagonal direction or in other positions. In such a case, the pixel addition pattern at the time of addition processing is adjusted according to the pattern of disposition of the focus detection pixels.

The disposition pattern of the focus detection pixels and the addition pattern of imaging pixels are not limited to the above-mentioned embodiments. However, it is preferred that the addition pattern of the imaging pixels corresponds to the disposition pattern of the focus detection pixels. Explanation will be made thereon with reference to FIGS. 34 to 36.

Figure 34:
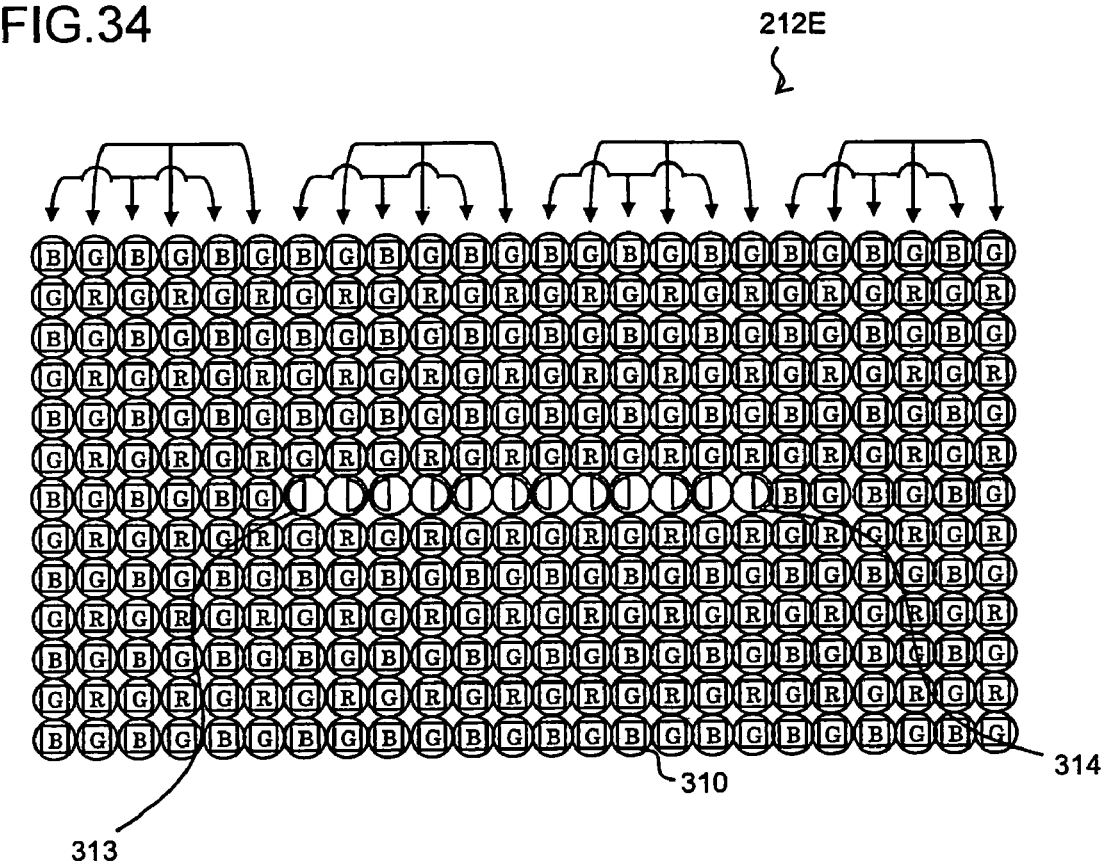
FIGS. 34 through 37 are each a detailed front view of the structure of an image sensor achieved in another variation.

In FIG. 34, the focus detection pixels 313 and 314 are disposed alternately and along the horizontal direction at the pixel positions that would otherwise be occupied by the blue pixels and the green pixels in the imaging pixels 310 in the same manner as shown in FIG. 25. The addition pattern for the imaging pixels 310 includes sets of three pixels at positions indicated by arrows each having trifurcated ends in each row. For example, the pixel signal from the left uppermost blue pixel (B), the pixel signal from the blue pixel (B) disposed in the same row adjacent but one pixel to the left uppermost one, and the pixel signal from the blue pixel (B) positioned in the same row adjacent but three pixels to the left uppermost pixel are added to each other and output.

Figure 35:
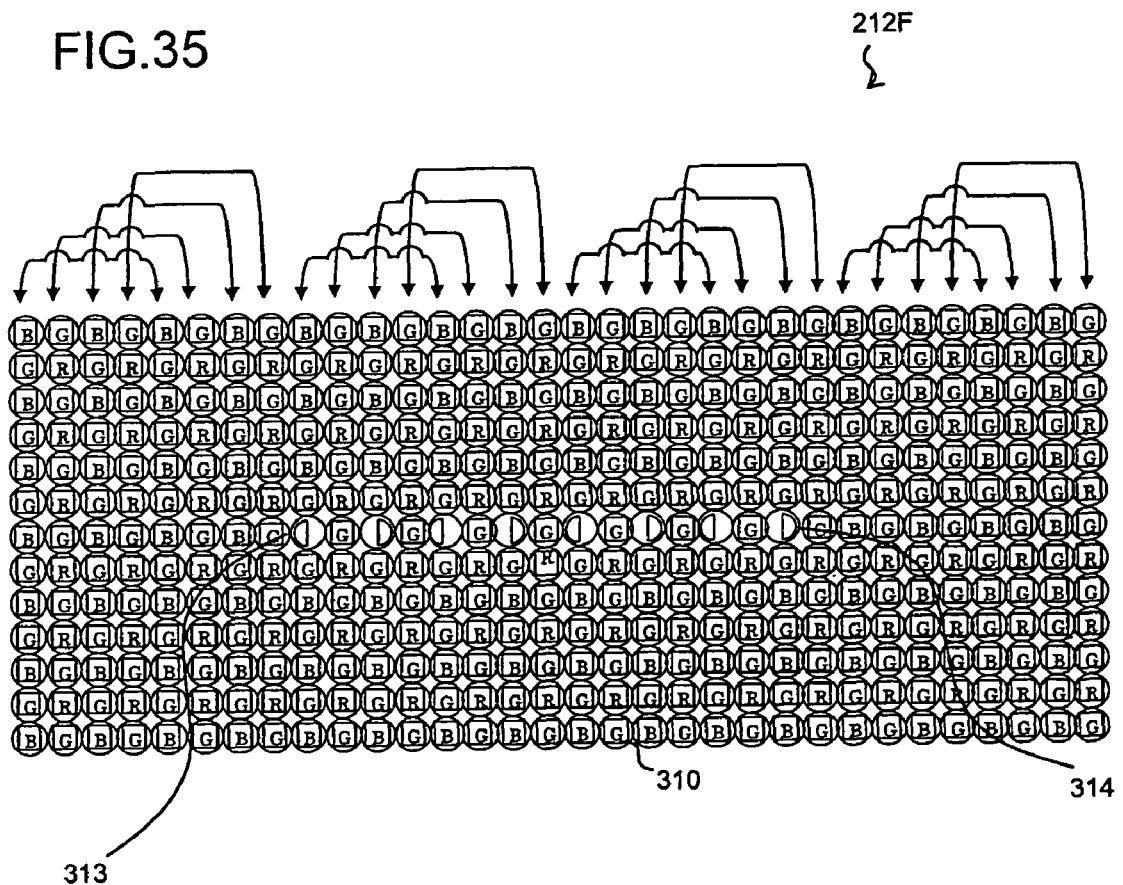

In FIG. 35, the focus detection pixels 313 and 314 are disposed alternately and along the horizontal direction in the rows that would otherwise be occupied by the blue pixels and the green pixels in the imaging pixels 310 at the position of the blue pixels. The addition pattern of the imaging pixels 310 includes sets of two pixels at positions indicated by arrows each having bifurcated ends in each row. For example, the pixel signal from the left uppermost blue pixel (B) and the pixel signal from the blue pixel (B) positioned in the same row adjacent but three pixels to the left uppermost pixel are added to each other and output.

Figure 36:
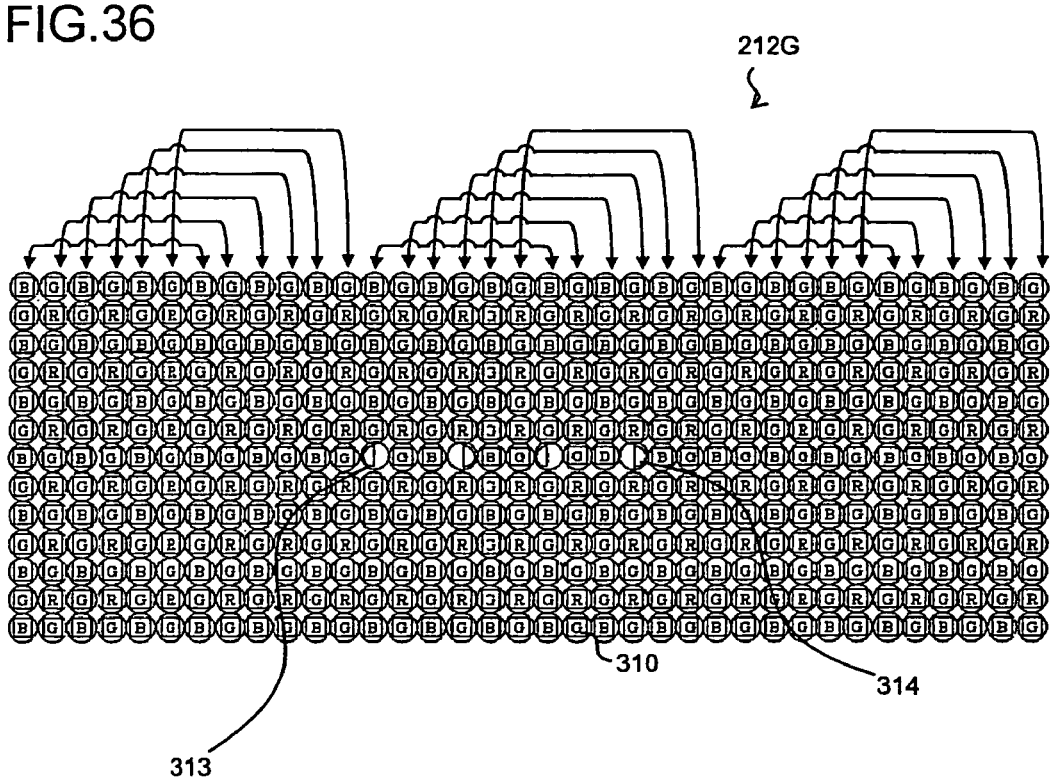

In FIG. 36, the focus detection pixels 313 and 314 are disposed alternately and along the horizontal direction in the row that would otherwise be occupied by the blue pixels and the green pixels in the imaging pixels 310 at the positions where they sandwich a set of the blue and green pixels. The addition pattern for the imaging pixels 310 includes sets of two pixels at positions indicated by arrows each having bifurcated ends in each row. For example, the pixel signal from the left uppermost blue pixel (B) and the pixel signal from the blue pixel (B) positioned in the same row adjacent but five pixels to the left uppermost pixel are added to each other and output.

Figure 37:
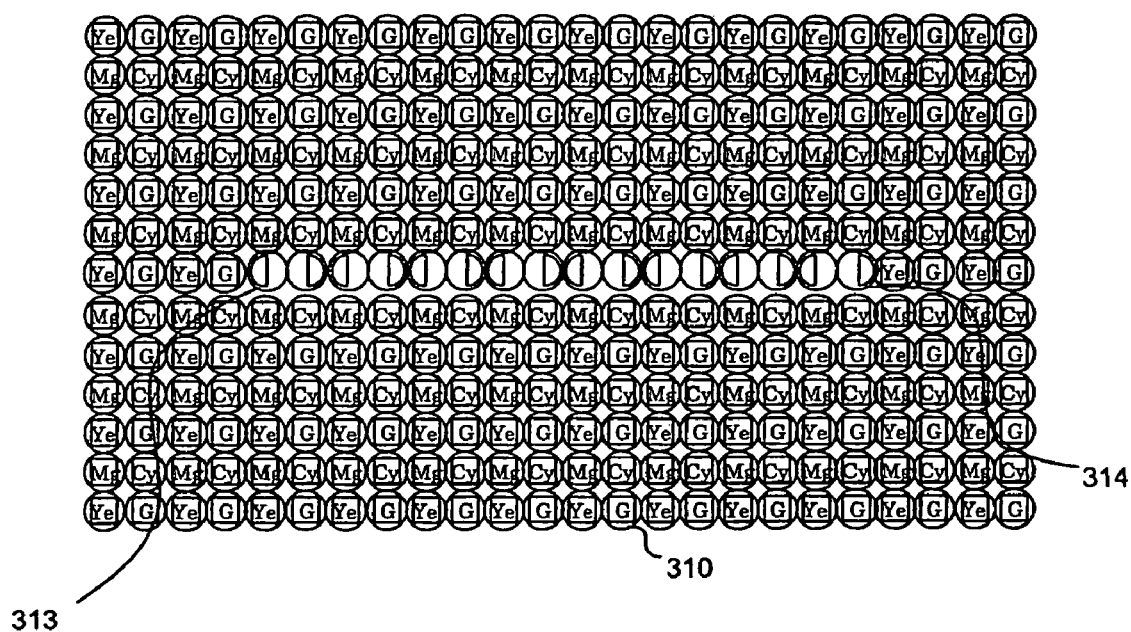

The example of the imaging sensor 212C shown in FIG. 25 includes the imaging pixels provided with color filters in a Bayer array. However, the configuration and disposition of the color filters is not limited to this example. For example, the disposition of the complementary filter (green: G, yellow: Ye, magenta: Mg, cyan: Cy) as shown in FIG. 37 may be adopted.

The example of the imaging sensor 212C shown in FIG. 25 is provided with no color filters in the focus detection pixels 313 and 314. However, the present invention is also applicable to the case where the focus detection pixels 313 and 314 are provided with, among the color filters having the same colors as that of the image sensor 310, one color filter (for example, green filter).

FIG. 5 shows the examples of the focus detection pixels 313 and 314 with photoelectric converters 13 and 14 each having a shape of a half circle. However, the shape of the photoelectric converters 13 and 14 is not limited to this but may assume other shapes. For example, the shape of the photoelectric converters of the focus detection pixels may be elliptical, rectangular or polygonal.

FIG. 3 shows the example of the image sensor 212, in which the imaging pixels 310 and the focus detection pixels 313 and 314 are disposed in a dense square lattice array. However, they may be disposed in a dense hexagonal array.

The present invention is also applicable to the case where the focus detection pixels 313 and 314 are disposed in the vertical direction. For example, while the focus detection pixels 313 are continuously disposed along the vertical direction in FIG. 22, the present invention is applicable to the case where additional focus detection pixels 314 are disposed continuously along the vertical direction in the adjacent row. In this case, the circuit structure of the image sensor as shown in FIG. 23 may be used to adapt the operation timing chart of the image sensor in the addition output mode as shown in FIG. 24 to the pixel addition pattern.

The imaging apparatus according to the present invention may be embodied as an apparatus other than a digital still camera or a film still camera mounted with an exchangeable lens. The present invention may also be adopted in a digital still camera or a film still camera with an integrated lens. It may also be adopted in a compact camera module built into a portable telephone or the like, a surveillance camera, a visual recognition device for robots, or the like as well. The present invention may be further adopted in a focus detection device installed in a device other than a camera, a range-finding device or a stereo range-finding device.

The above described embodiments are examples and various modifications can be made without departing from the scope of the invention.

What is claimed is:
1. An image-capturing device comprising:
   a plurality of imaging pixels for image generation, disposed along a first direction in a first row, each of the plurality of imaging pixels receiving a light flux corresponding to an image formed by an optical system on the image-capturing device;
   a plurality of focus detection pixels for a focus detection, which include a plurality of first focus detection pixels and a plurality of second focus detection pixels, disposed along the first direction in a second row in parallel to the first row, each of the plurality of first focus detection pixels receiving one of a pair of light fluxes passing through the optical system and each of the plurality of second focus detection pixels receiving an other of the pair of light fluxes; and
   an adder that adds a plurality of imaging outputs provided by a plurality of selected imaging pixels disposed according to a predetermined positional relationship with each other in the first row, selected from the plurality of imaging pixels to each other, a plurality of first focus detection outputs provided by a plurality of selected first focus detection pixels disposed according to a same positional relationship with each other in the second row as the predetermined positional relationship, selected from the plurality of first focus detection pixels to each other and a plurality of second focus detection outputs provided by a plurality of selected second focus detection pixels disposed according to the same positional relationship with each other in the second row, selected from the plurality of second focus detection pixels to each other, wherein
   the plurality of imaging outputs are each provided based upon the light flux received by each of the plurality of selected imaging pixels, and
   the plurality of first focus detection outputs and the plurality of second focus detection outputs are provided based upon the pair of light fluxes received by the plurality of selected first focus detection pixels and the plurality of selected second focus detection pixels.

2. An image-capturing device according to claim 1, wherein
   the plurality of imaging pixels includes a plurality of types of pixels having spectral sensitivity characteristics different from each other, and
   the adder selects only pixels of the same type from among the plurality of types of pixels as the plurality of selected imaging pixels and adds the plurality of outputs provided by the plurality of selected imaging pixels to each other.

3. An image-capturing device according to claim 1, wherein
the plurality of imaging pixels and the plurality of focus detection pixels are disposed in the second row; and
the adder adds the plurality of imaging outputs provided by the plurality of selected imaging pixels disposed according to the same positional relationship with each other in the second row.

4. An image-capturing device according to claim 1, wherein
the imaging pixels each include a first micro-lens and a first photoelectric converter disposed corresponding to the first micro-lens;
the focus detection pixels each include a second micro-lens and a second photoelectric converter disposed corresponding to the second micro-lens, the second photoelectric converter being different from the first photoelectric converter;
the first photoelectric converter receives the light flux corresponding to the image formed by the optical system;
the second photoelectric converter included in the first focus detection pixel receives the one of the pair of light fluxes; and
the second photoelectric converter included in the second focus detection pixel receives the other of the pair of light fluxes.

5. An image-capturing device according to claim 1, wherein
the plurality of imaging outputs, the plurality of first focus detection outputs and the plurality of second focus detection outputs are output row by row for a set of outputs.

6. A camera comprising:
an image-capturing device according to claim 1 that receives the light flux and the pair of light fluxes through the optical system;
a display device that displays the image formed by the optical system based on the plurality of imaging outputs provided by the plurality of selected imaging pixels via the image generation; and
a focus detector that detects a focus adjusting state of the optical system based on the plurality of first focus detection outputs provided by the plurality of selected first focus detection pixels and the plurality of second focus detection outputs provided by the plurality of selected second focus detection pixels via the focus detection.

7. A camera according to claim 6, further comprising:
a controller that periodically controls an addition operation by the adder and updates display of the image by the display device and detection of the focus adjusting state by the focus detector in synchronization with each other.

8. A camera according to claim 6, further comprising:
a controller that prohibits an addition operation by the adder and causes outputs provided by the plurality of imaging pixels to be output to the image-capturing device.

9. A camera according to claim 6, further comprising:
a focus adjuster that performs focus adjustment of the optical system based on a result of detection by the focus detector.

10. A camera according to claim 6, further comprising:
an interpolator that obtains by interpolation outputs that correspond to outputs of the plurality of imaging pixels at positions of the plurality of focus detection pixels based on the outputs provided by the plurality of imaging pixels.

11. A method for constructing an image-capturing device, the method comprising:
providing an image sensor including a plurality of imaging pixels disposed for image generation, along a first direction in a first row, each of the plurality of imaging pixels receiving a light flux corresponding to an image formed by an optical system on the image-capturing device, and a plurality of focus detection pixels for a focus detection, which include a plurality of first focus detection pixels and a plurality of second focus detection pixels, disposed along the first direction in a second row in parallel to the first row, each of the plurality of first focus detection pixels receiving one of a pair of light fluxes passing through the optical system and each of the plurality of second focus detection pixels receiving an other of the pair of light fluxes; and
providing an adder that adds a plurality of imaging outputs provided by a plurality of selected imaging pixels disposed according to a predetermined positional relationship with each other in the first row, selected from the plurality of imaging pixels to each other, a plurality of first focus detection outputs provided by a plurality of selected first focus detection pixels disposed according to a same positional relationship with each other in the second row as the predetermined positional relationship, selected from the plurality of first focus detection pixels to each other and a plurality of second focus detection outputs provided by a plurality of selected second focus detection pixels disposed according to the same position relationship with each other in the second row, selected from the plurality of second focus detection pixels to each other, wherein
the plurality of imaging outputs are each provided based upon the light flux received by each of the plurality of selected imaging pixels, and
the plurality of first focus detection outputs and the plurality of second focus detection outputs are provided based upon the pair of light fluxes received by the plurality of selected first focus detection pixels and the plurality of selected second focus detection pixels.

12. A method for constructing an image-capturing device according to claim 11, the method further comprising:
providing as the plurality of imaging pixels a plurality of types of pixels having spectral sensitivity characteristics different from each other, and
selecting only pixels of the same type from among the plurality of types of pixels as the plurality of selected imaging pixels.

13. A method for constructing an image-capturing device according to claim 11, wherein
the plurality of imaging pixels and the plurality of focus detection pixels are disposed in the second row,
the method further comprising:
adding the plurality of imaging outputs provided by the plurality of selected imaging pixels in the second row.

14. A method for constructing an image-capturing device according to claim 11, the method further comprising:
providing in each of the imaging pixels a first micro-lens and a first photoelectric converter disposed corresponding to the first micro-lens;
providing in each of the focus detection pixels a second micro-lens and a second photoelectric converter disposed corresponding to the second micro-lens, the second photoelectric converter being different from the first photoelectric converter;

providing the first photoelectric converter receiving the light flux corresponding to the image formed by the optical system;

providing in the first focus detection pixel the second photoelectric converter receiving the one of the pair of light fluxes; and providing in the second focus detection pixel the second photoelectric converter receiving the other of the pair of light fluxes.

15. A method for constructing a image-capturing device according to claim 11, wherein the plurality of imaging outputs, the plurality of first focus detection outputs and the plurality of second focus detection outputs are output row by row for a set of outputs.

16. An imaging method comprising:

receiving the light flux and the pair of light fluxes through the optical system by an image-capturing device according to claim 1;

displaying the image formed by the optical system based on the plurality of imaging outputs provided by the plurality of selected imaging pixels via the image generation; and detecting a focus adjusting state of the optical system based on the plurality of first focus detection outputs provided by the plurality of selected first focus detection pixels and the plurality of second focus detection outputs provided by the plurality of selected second focus detection pixels via the focus detection.

17. An imaging method according to claim 16, further comprising:

periodically performing an operation of addition of outputs provided by the plurality of imaging pixels and the plurality of focus detection pixels to update display of the image by the display device and detection of the focus adjusting state in synchronization with each other.

18. An imaging method according to claim 16, further comprising:

prohibiting an operation of addition of outputs provided by the plurality of imaging pixels and outputs provided by the plurality of focus detection pixels and outputting the outputs provided by the plurality of imaging pixels.

19. An imaging method according to claim 16, further comprising:

performing focus adjustment of the optical system based on a result of detection of the focus adjusting state.

20. An imaging method according to claim 16, further comprising:

obtaining by interpolation outputs that correspond to outputs of the plurality of imaging pixels at positions of the plurality of focus detection pixels based on the outputs provided by the plurality of imaging pixels.

21. An image-capturing device comprising:

a plurality of imaging pixels for image generation, disposed along a first direction;

a plurality of focus detection pixels for a focus detection, which include a plurality of first focus detection pixels and a plurality of second focus detection pixels, disposed along the first direction in admixture with the plurality of imaging pixels; and an adder that adds a plurality of imaging outputs provided by a plurality of selected imaging pixels selected from the plurality of imaging pixels to each other, a plurality of first focus detection outputs provided by a plurality of selected first focus detection pixels selected from the plurality of first focus detection pixels to each other and a plurality of second focus detection outputs provided by a plurality of selected second focus detection pixels selected from the plurality of second focus detection pixels to each other, wherein disposition of the plurality of first focus detection pixels and disposition of the plurality of second focus detection pixels both conform to a positional relationship of the plurality of selected imaging pixels selected from the plurality of imaging pixels.

* * * * *